(12) United States Patent
Menchik et al.

(10) Patent No.: US 11,897,186 B2
(45) Date of Patent: Feb. 13, 2024

(54) METHOD AND SYSTEM FOR ROTATIONAL 3D PRINTING

(71) Applicant: Stratasys Ltd., Rehovot (IL)

(72) Inventors: Guy Menchik, RaAnana (IL); Andrew James Carlson, Hopkins, MN (US); Kevin Ready Campion, Minnetonka, MN (US); Robert Earl Simon, Plymouth, MN (US); Nathaniel Michael Peterson, Champlin, MN (US)

(73) Assignee: Stratasys Ltd., Rehovot (IL)

( * ) Notice: Subject to any disclaimer, the term of this patent is extended or adjusted under 35 U.S.C. 154(b) by 568 days.

(21) Appl. No.: 16/840,514

(22) Filed: Apr. 6, 2020

(65) Prior Publication Data

US 2020/0230938 A1    Jul. 23, 2020

Related U.S. Application Data

(63) Continuation of application No. 15/325,760, filed as application No. PCT/IL2015/050722 on Jul. 13, 2015, now Pat. No. 10,611,136.

(Continued)

(51) Int. Cl.
*B29C 64/112* (2017.01)
*B29C 64/241* (2017.01)
(Continued)

(52) U.S. Cl.
CPC ........... *B29C 64/112* (2017.08); *B29C 64/20* (2017.08); *B29C 64/241* (2017.08); *B29C 64/245* (2017.08); *B29C 64/314* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/112; B29C 64/20; B29C 64/241; B29C 64/245; B29C 64/393; B29C 64/171; B29C 64/209; B41J 2/1752
See application file for complete search history.

(56) References Cited

U.S. PATENT DOCUMENTS 5,837,960 A    11/1998    Lewis et al.
6,259,962 B1    7/2001    Gothait
(Continued)

FOREIGN PATENT DOCUMENTS

CN    1832847    9/2006
CN    103118859    5/2013
(Continued)

OTHER PUBLICATIONS

Office Action dated May 23, 2021 From the Israel Patent Office Re. Application No. 256866 and Its Translation Into English. (11 Pages).
(Continued)

*Primary Examiner* — Jerzi H Moreno Hernandez
*Assistant Examiner* — Mohamed K Ahmed Ali

(57) ABSTRACT

A system for three-dimensional printing is disclosed. The system comprises: a rotary tray configured to rotate about a vertical axis; a printing head, each having a plurality of separated nozzles; and a controller configured for controlling the inkjet printing head to dispense, during the rotation, droplets of building material in layers, such as to print a three-dimensional object on the tray.

19 Claims, 32 Drawing Sheets

Related U.S. Application Data

(60) Provisional application No. 62/023,897, filed on Jul. 13, 2014.

(51) Int. Cl.
*B29C 64/314* (2017.01)
*B29C 64/20* (2017.01)
*B29C 64/245* (2017.01)
*B29C 64/393* (2017.01)
*B33Y 30/00* (2015.01)
*B33Y 10/00* (2015.01)
*B33Y 50/02* (2015.01)

(56) References Cited

U.S. PATENT DOCUMENTS

| | | |
|---|---|---|
| 6,569,373 B2 | 5/2003 | Napadensky |
| 6,658,314 B1 | 12/2003 | Gothait |
| 6,850,334 B1 | 2/2005 | Gothait |
| 6,902,248 B2 | 6/2005 | Koguchi |
| 7,183,335 B2 | 2/2007 | Napadensky |
| 7,209,797 B2 | 4/2007 | Kritchman et al. |
| 7,225,045 B2 | 5/2007 | Gothait et al. |
| 7,291,002 B2 | 11/2007 | Russell et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,658,976 B2 | 2/2010 | Kritchman |
| 7,962,237 B2 | 6/2011 | Kritchman |
| 8,172,562 B2 | 5/2012 | Mattes |
| 9,002,496 B2 | 4/2015 | Elsey |
| 9,364,995 B2 | 6/2016 | Roberts, IV et al. |
| 9,849,631 B1 | 12/2017 | Goss et al. |
| 2001/0035886 A1 | 11/2001 | Bradshaw et al. |
| 2004/0265413 A1 | 12/2004 | Russell et al. |
| 2005/0015175 A1 | 1/2005 | Huang |
| 2005/0104241 A1 | 5/2005 | Kritchman et al. |
| 2006/0061618 A1 | 3/2006 | Hernandez et al. |
| 2006/0127153 A1 | 6/2006 | Menchik et al. |
| 2007/0002114 A1* | 1/2007 | Sanekata ............ H01L 21/288 257/E21.174 |
| 2007/0075461 A1 | 4/2007 | Hunter et al. |
| 2007/0257055 A1 | 11/2007 | Scott et al. |
| 2008/0018689 A1 | 1/2008 | Ito et al. |
| 2008/0042321 A1 | 2/2008 | Russell et al. |
| 2008/0109102 A1 | 5/2008 | Sutcliffe |
| 2008/0138454 A1 | 6/2008 | Perret et al. |
| 2009/0025638 A1 | 1/2009 | Inoue |
| 2009/0109274 A1 | 4/2009 | Hori et al. |
| 2009/0141106 A1 | 6/2009 | Takagi |
| 2009/0231374 A1 | 9/2009 | Van de Wynckel et al. |
| 2010/0140852 A1 | 6/2010 | Kritchman et al. |
| 2010/0191360 A1 | 7/2010 | Napadensky et al. |
| 2013/0126657 A1 | 5/2013 | Stroik, Jr. |
| 2013/0155157 A1 | 6/2013 | Harvey et al. |
| 2013/0189435 A1 | 7/2013 | Mackie et al. |
| 2013/0242317 A1 | 9/2013 | Leavitt et al. |
| 2015/0017272 A1 | 1/2015 | Donaldson et al. |
| 2015/0183163 A1 | 7/2015 | Beak et al. |
| 2016/0339724 A1 | 11/2016 | Munenaka et al. |
| 2017/0100898 A1 | 4/2017 | Cofler et al. |
| 2017/0173886 A1 | 6/2017 | Menchik et al. |
| 2017/0232680 A1 | 8/2017 | Skogsrud et al. |
| 2017/0348902 A1 | 12/2017 | Ohara et al. |
| 2018/0085995 A1 | 3/2018 | Davis |
| 2018/0111322 A1 | 4/2018 | Mathea |
| 2018/0141267 A1 | 5/2018 | Dudley |
| 2018/0200956 A1 | 7/2018 | Grach et al. |
| 2018/0201021 A1 | 7/2018 | Beaver et al. |
| 2018/0207875 A1 | 7/2018 | Menchik |
| 2018/0370133 A1 | 12/2018 | Provencher |
| 2019/0084239 A1 | 3/2019 | Carlson et al. |

FOREIGN PATENT DOCUMENTS

| | | |
|---|---|---|
| CN | 2014-533627 | 12/2014 |
| CN | 104210108 | 12/2014 |
| EP | 0604068 | 6/1994 |
| EP | 0860283 | 8/1998 |
| EP | 2835249 | 2/2015 |
| EP | 2883708 | 6/2015 |
| JP | 60-151056 | 8/1985 |
| JP | 06-198746 | 7/1994 |
| JP | 2002-512140 | 4/2002 |
| JP | 2005-133120 | 5/2005 |
| JP | 2006-526524 | 11/2006 |
| JP | 2007-503342 | 2/2007 |
| JP | 2007-145021 | 6/2007 |
| JP | 2007-296854 | 11/2007 |
| JP | 2008-047272 | 2/2008 |
| JP | 2008-513199 | 5/2008 |
| JP | 2009-066882 | 4/2009 |
| JP | 2009-083326 | 4/2009 |
| JP | 2012-228793 | 11/2012 |
| JP | 2012-526687 | 11/2012 |
| JP | 2013-169705 | 9/2013 |
| JP | 5492345 | 3/2014 |
| JP | 2014-514193 | 6/2014 |
| JP | 2014-136217 | 7/2014 |
| JP | 2016-074205 | 5/2016 |
| WO | WO 99/54141 | 10/1999 |
| WO | WO 2004/024447 | 3/2004 |
| WO | WO 2004/106041 | 12/2004 |
| WO | WO 2004/108398 | 12/2004 |
| WO | WO 2007/114142 | 10/2007 |
| WO | WO 2008/107866 | 9/2008 |
| WO | WO 2009//041707 | 4/2009 |
| WO | WO 2010/132392 | 11/2010 |
| WO | WO 2012/143923 | 10/2012 |
| WO | WO 2014/092651 | 6/2014 |
| WO | WO 2015/026847 | 2/2015 |
| WO | WO 2016/009426 | 1/2016 |
| WO | WO 2017/009830 | 1/2017 |

OTHER PUBLICATIONS

English Translation dated Dec. 27, 2021 of Ground(s) of Reason of Rejection dated Dec. 13, 2021 From the Korean Intellectual Property Office Re. Application No. 2021-7004849. (6 Pages).

Ground(s) of Reason of Rejection dated Dec. 13, 2021 From the Korean Intellectual Property Office Re. Application No. 2021-7004849. (9 Pages).

Notification of Office Action and Search Report dated Feb. 24, 2022 From the State Intellectual Property Office of the People's Republic of China Re. Application No. 202011277875.8. (5 Pages).

Notice of Reasons for Rejection dated Nov. 4, 2020 From the Japan Patent Office Re. Application No. 2019-172733 and Its Translation Into English. (13 Pages).

Grounds for Rejection dated Jul. 22, 2020 From the Korean Intellectual Property Office Re. Application No. 10-2017-7003591 and Its Translation Into English. (5 Pages).

Notice of Reasons for Rejection dated Aug. 2, 2022 From the Japan Patent Office Re. Application No. 2021-094444 and Its Translation Into English. (4 Pages).

Communication Pursuant to Article 94(3) EPC dated Sep. 4, 2020 From the European Patent Office Re. Application No. 16741396.2. (5 Pages).

English Translation dated Apr. 7, 2022 of Notification of Office Action and Search Report dated Feb. 24, 2022 From the State Intellectual Property Office of the People's Republic of China Re. Application No. 202011277875.8. (5 Pages).

Final Official Action dated Feb. 23, 2021 From the US Patent and Trademark Office Re. U.S. Appl. No. 15/742,967. (28 Pages).

Official Action dated May 6, 2020 from the US Patent and Trademark Office Re. U.S. Appl. No. 15/742,967. (29 pages).

Communication Pursuant to Article 94(3) EPC dated Jan. 20, 2020 From the European Patent Office Re. Application No. 16741396.2. (3 Pages).

(56) References Cited

OTHER PUBLICATIONS

Communication Relating to the Results of the Partial International Search dated Oct. 6, 2016 From the International Searching Authority Re. Application No. PCT/TL2016/050751.
European Search Report and the European Search Opinion dated Jun. 18, 2019 From the European Patent Office Re. Application No. 19167262.5. (9 Pages).
International Preliminary Report on Patentability dated Jan. 25, 2018 From the International Bureau of WIPO Re. Application No. PCT/IL2016/050751. (11 Pages).
International Preliminary Report on Patentability dated Jan. 26, 2017 From the International Bureau of WIPO Re. Application No. PCT/IL2015/050722.
International Search Report and the Written Opinion dated Nov. 16, 2015 From the International Searching Authority Re. Application No. PCT/IL2015/050722.
International Search Report and the Written Opinion dated Dec. 19, 2016 From the International Searching Authority Re. Application No. PCT/IL2016/050751. (18 Pages).
Notice of Reason for Rejection dated Mar. 13, 2020 From the Japan Patent Office Re. Application No. 2018-501977 and Its Translation Into English. (5 Pages).
Notification of Office Action and Search Report dated Apr. 11, 2019 From the State Intellectual Property Office of the People's Republic of China Re. Application No. 201680040695.3. (7 Pages).
Notification of Office Action dated Sep. 4, 2019 From the State Intellectual Property Office of the People's Republic of China Re. Application No. 201680040695.3. (3 Pages).
Notification of Office Action dated Apr. 8, 2020 From the State Intellectual Property Office of the People's Republic of China Re. Application No. 201580049088.9 and Its Translation Into English. (4 Pages).
Notification of Office Action dated Jul. 19, 2019 From the State Intellectual Property Office of the People's Republic of China Re. Application No. 201580049088.9. (8 Pages).
Notification of Reasons for Rejection dated Oct. 2, 2018 From the Japan Patent Office Re. Application No. 2017-501655 and Its Translation Into English. (10 Pages).
Official Action dated Aug. 5, 2019 From the US Patent and Trademark Office Re. U.S. Appl. No. 15/325,760 (29 pages).
Official Action dated Jan. 24, 2019 From the US Patent and Trademark Office Re. U.S. Appl. No. 15/325,760. (29 Pages).
Restriction Official Action dated Oct. 24, 2019 From the US Patent and Trademark Office Re. U.S. Appl. No. 151742,967. (7 pages).
Supplementary European Search Report and the European Search Opinion dated Feb. 9, 2018 From the European Patent Office Re. Application No. 15821817.2. (6 Pages).
Translation dated Sep. 12, 2019 of Notification of Office Action dated Sep. 4, 2019 From the State Intellectual Property Office of the People's Republic of China Re. Application No. 201680040695.3. (4 Pages).
Translation dated Apr. 17, 2019 of Notification of Office Action dated Apr. 11, 2019 From the State Intellectual Property Office of the People's Republic of China Re. Application No. 201680040695. 3. (3 Pages).
Translation dated Jul. 25, 2019 of Notification of Office Action dated Jul. 19, 2019 From the State Intellectual Property Office of the People's Republic of China Re. Application No. 201580049088.9. (11 Pages).
3Ders "Rotary 3D Printers Under Development", 3D Printer News & 3D Printing News, Product Description, 3Ders, 8 P., Dec. 27, 2013.
Dudley et al. "Orange Maker™. High-Resolution 3D Printing Technology", Orange Maker, Product Description, 8 P., Jun. 30, 2014.
European Search Report and the European Search Opinion dated Jun. 4, 2021 From the European Patent Office Re. Application No. 21160273.5. (8 Pages).
Office Action dated Oct. 19, 2021 From the Israel Patent Office Re. Application No. 282005 and Its Translation Into English. (9 Pages).
Office Action dated Aug. 26, 2020 From the Israel Patent Office Re. Application No. 250096 and Its Translation Into English. (8 Pages).
Notice of Reasons for Rejection dated Apr. 5, 2022 From the Japan Patent Office Re. Application No. 2021-094444 and Its Translation Into English. (8 Pages).
Translation dated Jul. 28, 2021 of Ground(s) of Reason of Rejection dated Jul. 20, 2021 From the Korean Intellectual Property Office Re. Application No. 2010-7029927. (3 Pages).
Ground(s) of Reason of Rejection dated Jul. 20, 2021 From the Korean Intellectual Property Office Re. Application No. 2018-7004017. (3 Pages).
European Search Report and the European Search Opinion dated Mar. 15, 2023 From the European Patent Office Re. Application No. 22217392.4. (7 Pages).
European Search Report and the European Search Opinion dated Apr. 20, 2023 From the European Patent Office Re. Application No. 222173398.1. (8 Pages).
Translation dated Jan. 23, 2023 of Office Action dated Jan. 10, 2023 From the Israel Patent Office Re. Application No. 282005. (6 Pages).
Office Action dated Jan. 10, 2023 From the Israel Patent Office Re. Application No. 282005. (7 Pages).
Notice of Reason(s) for Rejection dated Oct. 24, 2023 From the Japan Patent Office Re. Application No. 2022-199568 and Its Translation Into English. (9 Pages).
Offica Action dated Nov. 23, 2023 From the Israel Patent Office Re. Application No. 282005. (3 Pages).
Translation dated Dec. 4, 2023 of Office Action dated Nov. 23, 2023 From the Israel Patent Office Re. Application No. 282005. (3 Pages).

\* cited by examiner

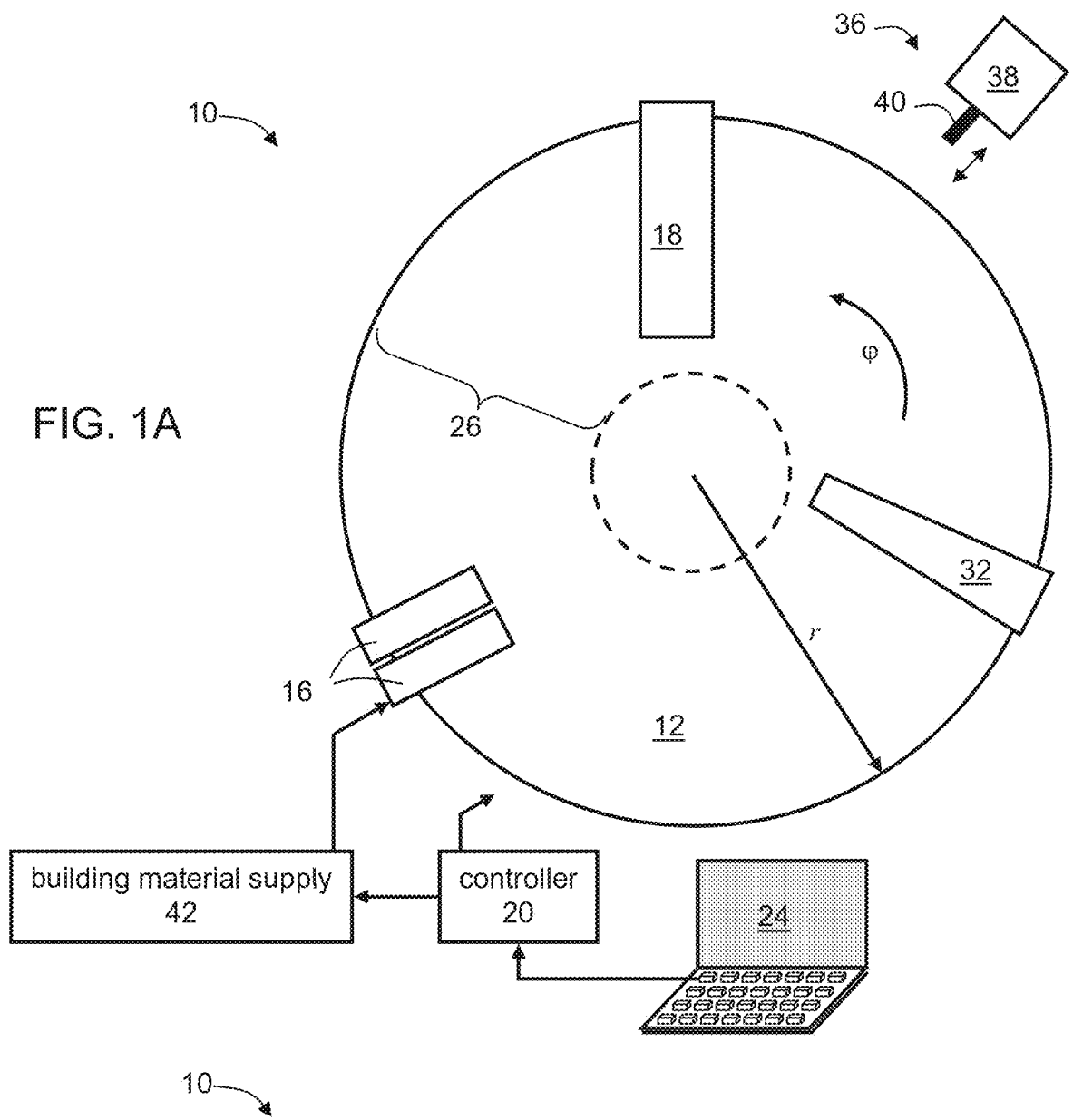
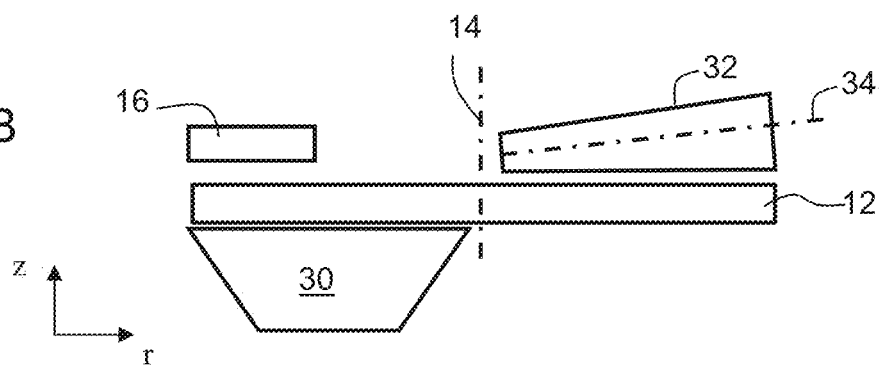

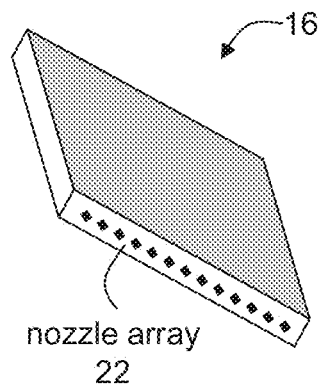
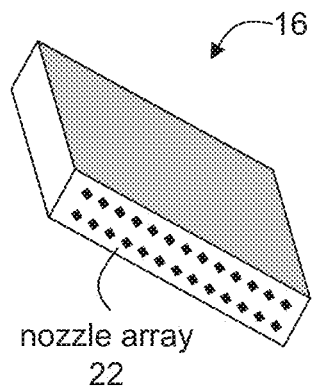
FIG. 2A    FIG. 2B
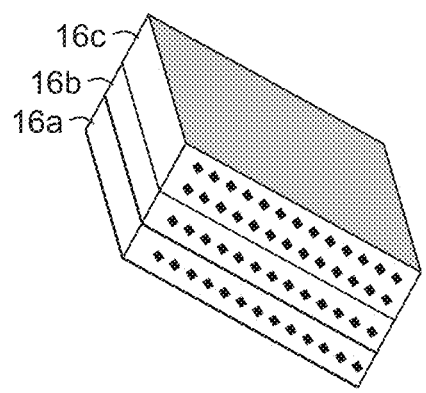
FIG. 2C

FIG. 14B
FIG. 14C
FIG. 14D
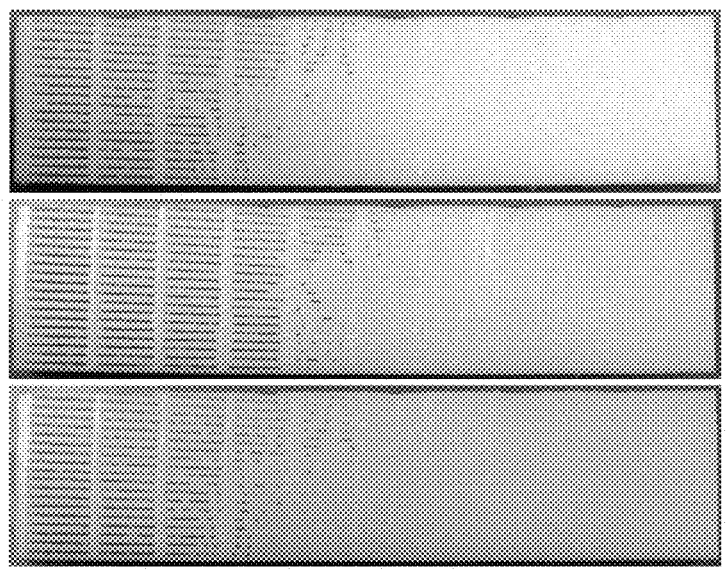
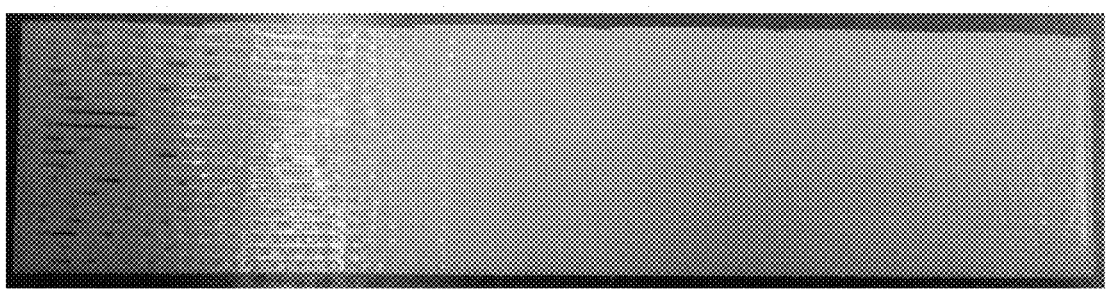
FIG. 14E
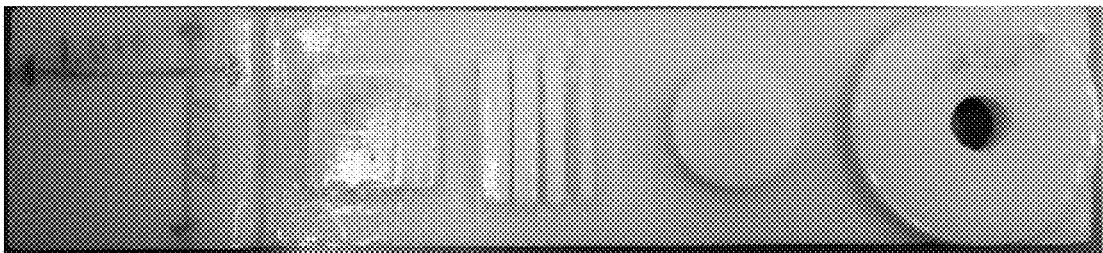
FIG. 14F

FIG. 14G
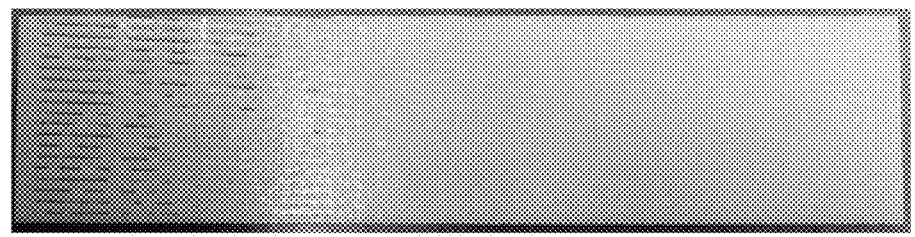
FIG. 14H
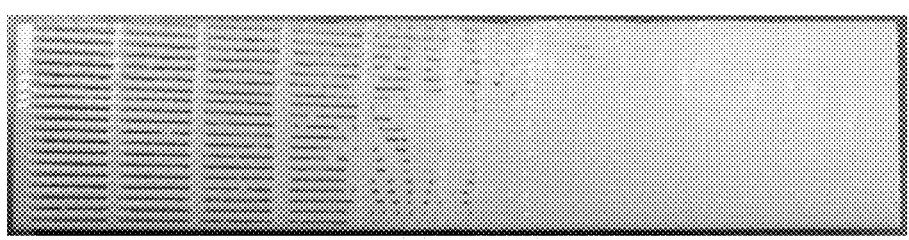
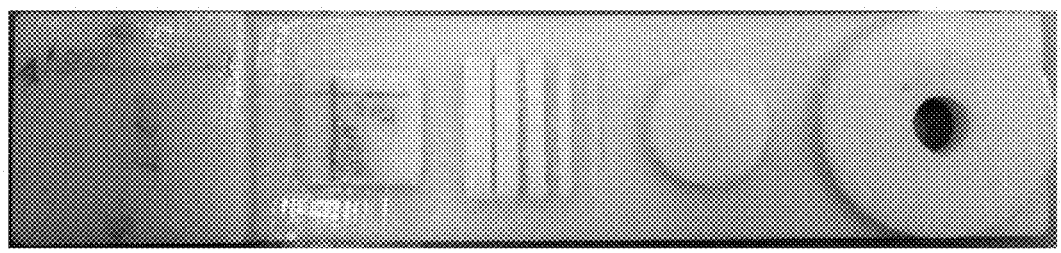
FIG. 14I

METHOD AND SYSTEM FOR ROTATIONAL 3D PRINTING

RELATED APPLICATIONS

This application is a continuation of U.S. patent application Ser. No. 15/325,760 filed on Jan. 12, 2017, which is a National Phase of PCT Patent Application No. PCT/IL2015/050722 having International Filing Date of Jul. 13, 2015, which claims the benefit of priority of U.S. Provisional Patent Application No. 62/023,897 filed on Jul. 13, 2014. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to rotational three-dimensional printing.

Additive manufacturing (AM) is generally a process in which a three-dimensional (3D) object is manufactured utilizing a computer model of the objects. Such a process is used in various fields, such as design related fields for purposes of visualization, demonstration and mechanical prototyping, as well as for rapid manufacturing.

The basic operation of any additive manufacturing system consists of slicing a three-dimensional computer model into thin cross sections, translating the result into two-dimensional position data and feeding the data to control equipment which manufacture a three-dimensional structure in a layerwise manner.

Additive manufacturing entails many different approaches to the method of fabrication, including three-dimensional printing, e.g., three-dimensional inkjet printing, laminated object manufacturing, fused deposition modeling and others.

In three-dimensional printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,364,686, 7,500,846, 7,658,976, 7,962,237, and 9,031,680, and U.S. Published Application No. US 20130040091, all of the same Assignee, the contents of which are hereby incorporated by reference.

For example, U.S. Pat. No. 9,031,680 discloses a system which comprises an additive manufacturing apparatus having a plurality of dispensing heads, a building material supply apparatus configured to supply a plurality of building materials to the fabrication apparatus, and a controller configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

U.S. Pat. No. 7,291,002 discloses apparatus for fabricating a three-dimensional object. A rotary annular build drum receives successive layers of a powder build material, and a print head is disposed above the annular build drum and is configured for selectively dispensing droplets of a liquid binder onto the powder.

U.S. Pat. No. 8,172,562 discloses apparatus for manufacturing a three-dimensional object. This apparatus includes a building container, a support in the building container, and a stationary material application device that applies layers of a building material onto the support. A drive generates a movement of the container around an axis of rotation, and a vertical drive generates a vertical movement of the support.

U.S. Published Application No. 20080109102 discloses apparatus for manufacturing three dimensional items. The apparatus of this disclosure includes a computer controller, a build platform for carrying an item under manufacture, and a build station for forming upon the item a layer of material. Either of the build station and the build platform is mounted and driven such as to rotate about an axis, so that the surface of the item under manufacture is repeatedly presented to the build station.

SUMMARY OF THE INVENTION

According to an aspect of some embodiments of the present invention there is provided a system for three-dimensional printing. The system comprises: a rotary tray configured to rotate about a vertical axis; a printing head, each having a plurality of separated nozzles; and a controller configured for controlling the inkjet printing heads to dispense, during the rotation, droplets of building material in layers, such as to print a three-dimensional object on the tray.

According to some embodiments of the invention, different nozzles of at least one head are at different distances from the axis and dispense the building material at different dispensing rates.

According to some embodiments of the invention, at least one of the tray and the inkjet printing heads is configured to move along a vertical direction parallel to the vertical axis so as to vary a vertical distance between the tray and the inkjet printing heads, and wherein the controller is configured to continue the dispensing during the motion along the vertical direction.

According to some embodiments of the invention the inkjet printing head is configured to reciprocally move relative to the tray along a radial direction.

According to some embodiments of the invention the system wherein the motion along the radial direction is by a screw.

According to some embodiments of the invention the controller is configured to compensate for errors of a radial location of the head according to a compensation function.

According to some embodiments of the invention the screw is a dual supported screw and the function is a linear function.

According to some embodiments of the invention the screw is a cantilever screw and the function is a non-linear function.

According to some embodiments of the invention for at least two of the inkjet printing heads, the reciprocally motion along the radial direction is independent and at a different azimuthal angle.

According to some embodiments of the invention the controller is configured to cease the dispensing during the reciprocal motion.

According to some embodiments of the invention the controller is configured to resume the dispensing, following the reciprocal motion, at an azimuthal coordinate which is offset relative to an azimuthal coordinate at which the dispensing was ceased.

According to some embodiments of the invention the controller is configured to resume the dispensing, following the reciprocal motion, at the same azimuthal coordinate at which the dispensing was ceased.

According to some embodiments of the invention the controller is configured to continue the dispensing during the reciprocal motion, while adjusting printing data responsively to the reciprocal motion.

According to an aspect of some embodiments of the present invention there is provided a system for three-dimensional printing. The system comprises: a rotary tray configured to rotate about a vertical axis at a rotation speed; a printing head, each having a plurality of separated nozzles; and a controller configured for controlling the inkjet printing heads to dispense, during the rotation, droplets of building material in layers, such as to print a three-dimensional object on the tray, and for controlling the inkjet printing heads to reciprocally move relative to the tray along a radial direction.

According to some embodiments of the invention, the controller is configured for varying the rotation speed responsively to the radial motion.

According to some embodiments of the invention, the controller is configured for ceasing the dispensing during the reciprocal motion; and for resuming the dispensing, following the reciprocal motion, at an azimuthal coordinate which is offset relative to an azimuthal coordinate at which the dispensing was ceased.

According to some embodiments of the invention, the controller is configured for continuing the dispensing during the reciprocal motion, while adjusting printing data responsively to the reciprocal motion.

According to some embodiments of the invention, the controller is configured for controlling the inkjet printing heads to dispense, during the rotation, droplets of building material in layers, such that an azimuthal distance between sequentially dispensed droplets varies as a function of a position of the inkjet printing heads along the radial direction.

According to some embodiments of the invention, the variation of azimuthal distance is based on a probabilistic function of said position along said radial direction.

According to an aspect of some embodiments of the present invention there is provided a system for three-dimensional printing. The system comprises: a rotary tray configured to rotate about a vertical axis; a printing head, each having a plurality of separated nozzles; and a controller configured for automatically determining a plurality of locations on the tray, and for controlling the inkjet printing heads to dispense, during the rotation, layers of building material droplets such as to three-dimensionally print a plurality of objects on the tray, respectively at the plurality of locations; wherein the automatically determining is according to a predetermined criterion or set of criteria selected from the group consisting of: a first criterion according to which the objects are arranged so as to balance the tray, and a second criterion according to which more objects are printed far from the axis than close to the axis.

According to an aspect of some embodiments of the present invention there is provided a system for three-dimensional printing, comprising: a rotary tray configured to rotate about a vertical axis; a printing head, each having a plurality of separated nozzles; a controller configured for controlling the inkjet printing head to dispense, during the rotation, droplets of building material in layers, such as to print a three-dimensional object on the tray; and a pre-heater element for heating the building material before entering the printing head, the pre-heater element being spaced apart from the head, and is in fluid communication with the head via a conduit.

According to an aspect of some embodiments of the present invention there is provided a system for three-dimensional printing, comprising: a rotary tray configured to rotate about a vertical axis; a printing head, each having a plurality of separated nozzles; a controller configured for controlling the inkjet printing head to dispense, during the rotation, droplets of building material in layers, such as to print a three-dimensional object on the tray; and a radiation source configured to reciprocally move relative to the tray along a radial direction, wherein the printing head is also configured to reciprocally move relative to the tray along the radial direction, non-simultaneously with the radiation source.

According to an aspect of some embodiments of the present invention there is provided a system for three-dimensional printing, comprising: a rotary tray configured to rotate about a vertical axis; a printing head, each having a plurality of separated nozzles; a controller configured for controlling the inkjet printing head to dispense, during the rotation, droplets of building material in layers, such as to print a three-dimensional object on the tray; and a radiation source configured to irradiate the layers such that energy at different rates is delivered to locations that are at difference distances from a center of the tray.

According to an aspect of some embodiments of the present invention there is provided a system for three-dimensional printing, comprising: a rotary tray configured to rotate about a vertical axis; a printing head, each having a plurality of separated nozzles; a controller configured for controlling the inkjet printing head to dispense, during the rotation, droplets of building material in layers, such as to print a three-dimensional object on the tray; and a radiation source, wherein an azimuthal separation between the radiation source and the head is from about $0.3\omega$ radians and about $0.75\omega$ radians, $\omega$ being an average angular velocity of the tray relative to the head and the radiation source.

According to an aspect of some embodiments of the present invention there is provided a system for three-dimensional printing, comprising: a rotary tray configured to rotate about a vertical axis; a printing head, each having a plurality of separated nozzles; and a controller configured for controlling the inkjet printing head to dispense, during the rotation, droplets of building material in layers, such as to print a three-dimensional object on the tray; wherein the controller is further configured for terminating any dispensing of the building material when the head is above a predetermined region of the tray, and for signaling the head to move relative to the tray along a radial direction, while the head is above the predetermined region.

According to some embodiments of the invention the system wherein the controller is configured for signaling at least one of the tray and the inkjet printing head to move along a vertical direction parallel to the vertical axis so as to vary a vertical distance between the tray and the inkjet printing head, while the head is above the predetermined region.

According to some embodiments of the invention the controller is configured to control at least one of the inkjet printing heads to dispense the droplets such that an azimuthal distance between sequentially dispensed droplets varies as a function of a position of the printing head along the radial direction.

According to some embodiments of the invention the controller is configured to execute interlaced dispensing of the droplets during at least one rotation of the tray.

According to some embodiments of the invention an interlace level of the interlaced dispensing varies as a function of the position of the printing head along the radial direction.

According to some embodiments of the invention an interlace level of the interlaced dispensing varies as a function of a position of the printing head along the radial direction.

According to some embodiments of the invention the controller is access a computer readable medium storing a bitmap mask, and to obtain printing data pertaining to a shape of the object only for locations on the tray that are not masked by the bitmap mask.

According to some embodiments of the invention the system comprises a conical roller for straightening dispensed building material.

According to some embodiments of the invention the tray rotates continuously in the same direction throughout the formation of the object.

According to some embodiments of the invention at least one of the tray and the inkjet printing heads is configured to move along a vertical direction parallel to the vertical axis so as to vary a vertical distance between the tray and the inkjet printing heads, and wherein the controller is configured to continue the dispensing during the motion along the vertical direction.

According to some embodiments of the invention the motion along the vertical direction is executed such that the tray and the inkjet printing heads experience at least two different vertical distances therebetween during a single rotation of the tray.

According to some embodiments of the invention the motion along the vertical direction is executed such that during a single rotation of the tray, the vertical distance is increased by an amount that approximately equals a characteristic thickness of a single layer of the building material.

According to some embodiments of the invention the motion along the vertical direction is executed generally continuously.

According to some embodiments of the invention the plurality of inkjet printing heads comprise at least one support material head for dispensing support material, and at least two modeling material heads for respectively dispensing at least two different modeling materials.

According to some embodiments of the invention the system comprises a support structure positioned below the inkjet printing heads such that the tray is between support structure and the heads, the support structure being in contact with the tray so as prevent or reduce vibrations of the tray.

According to some embodiments of the invention the tray is replaceable.

According to some embodiments of the invention the system comprises a tray replacement device configured for automatically replacing the tray.

According to some embodiments of the invention the head is configured to maintain a vacuum level within a predetermined range of vacuum levels.

According to some embodiments of the invention the system comprises a pre-heater element for heating the building material before entering the printing head.

According to some embodiments of the invention the pre-heater element is spaced apart from the head, and is in fluid communication with the head via a conduit.

According to some embodiments of the invention the system comprises a pump for retracting the building material from the conduit back into the pre-heater element.

According to some embodiments of the invention the system comprises at least one spirit level devices mounted at one or more locations on an enclosure of a chassis of the system, for indicating deviation of the chassis from horizontality.

According to some embodiments of the invention the controller is configured for calculating an amount of building material required for printing the object, comparing the amount to an available amount of building material, and issuing an alert when the amount required for printing the object is larger than the available amount.

According to some embodiments of the invention the system comprises a radiation source configured to reciprocally move relative to the tray along a radial direction, wherein the printing head is also configured to reciprocally move relative to the tray along the radial direction, non-simultaneously with the radiation source.

According to some embodiments of the radiation source is configured to irradiate the layers such that energy at different rates is delivered to locations that are at difference distances from a center of the tray.

According to some embodiments of the invention an azimuthal separation between the radiation source and the head is from about $0.3\omega$ radians and about $0.75\omega$ radians, $\omega$ being an average angular velocity of the tray relative to the head and the radiation source.

According to some embodiments of the invention the controller is configured to calculate an excepted overall printing time of a plurality of objects when printed simultaneously, and to display the calculated time on a display device.

According to some embodiments of the invention the controller is configured to calculate the overall printing time per object and to display the overall printing time per object.

According to some embodiments of the invention the controller is configured for terminating any dispensing of the building material when the head is above a predetermined region of the tray. According to some embodiments of the invention the predetermined region has a shape of a circular sector.

According to some embodiments of the invention the controller is configured for signaling the head to move relative to the tray along a radial direction, while the head is above the predetermined region.

According to some embodiments of the invention the controller is configured for signaling at least one of the tray and the inkjet printing head to move along a vertical direction parallel to the vertical axis so as to vary a vertical distance between the tray and the inkjet printing head, while the head is above the predetermined region.

According to some embodiments of the invention the controller is configured for signaling at least one of the tray and the inkjet printing head to move along a vertical direction parallel to the vertical axis so as to vary a vertical distance between the tray and the inkjet printing head, immediately when the dispensed building material firstly arrives at the roller.

According to some embodiments of the invention the controller is configured for signaling at least one of the tray and the inkjet printing head to move along a vertical direction parallel to the vertical axis so as to vary a vertical distance between the tray and the inkjet printing head, such that the vertical motion is completed immediately when the dispensed building material firstly arrives at the roller.

According to some embodiments of the invention the controller is configured to select a first printing mode in which an azimuthal scan is employed, and a second printing mode in which a vector scan is employed, the vector scan being along a path selected to form at least one structure selected from the group consisting of (i) an elongated structure, (ii) a boundary structure at least partially surrounding an area filled with the first building material, and (iii) an inter-layer connecting structure.

According to some embodiments of the invention the comprises a radiation source configured to irradiate the layers, wherein the controller is configured to control the radiation source to ensure that, for at least one layer, the irradiation is initiated at least t seconds after commencement of curing of a layer immediately preceding the at least one layer, the t being longer than an overall time required for the formation.

According to some embodiments of the invention according to an aspect of some embodiments of the present invention there is provided apparatus comprising: a cartridge configured to contain building material to be selectively dispensed by an additive manufacturing system, the cartridge including a front end and a back end, wherein the back end includes a fluidic connection for connecting the cartridge to a dispensing unit of the AM system; and a cartridge nest for storing the cartridge, wherein the cartridge is configured to be mounted in the nest at an angle such that the front end of the cartridge is elevated with respect the back end.

According to some embodiments of the invention the apparatus wherein the cartridge includes a lock spring and wherein the lock spring is configured to lock into the cartridge nest at the angle.

According to some embodiments of the invention the cartridge includes a well in proximity to the fluidic connection configured to accumulate a portion of the building material contained in the cartridge.

According to some embodiments of the invention the angle is 2-5 degrees.

According to some embodiments of the invention the cartridge nest is configured for storing a plurality of cartridges.

According to an aspect of some embodiments of the present invention there is provided a system for three-dimensional printing, comprising the as delineated above and optionally as further detailed below.

According to an aspect of some embodiments of the present invention there is provided a method of fabricating an object. The method comprises receiving three-dimensional printing data corresponding to the shape of the object, feeding the data to a system for three-dimensional printing, and operating the system to print the object based on the data, wherein the system is as delineated above and optionally as further detailed below.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-1D are schematic illustrations of a top view (FIGS. 1A and 1D), a side view (FIG. 1B) and an isometric view (FIG. 1C) of a system for three-dimensional printing, according to some embodiments of the present invention;

FIGS. 2A-2C are schematic illustrations of printing heads according to some embodiments of the present invention;

FIGS. 14A-14I show experimental results obtained during experiments performed according to some embodiments of the present invention;

DESCRIPTION OF SPECIFIC EMBODIMENTS OF THE INVENTION

Figure 1C:
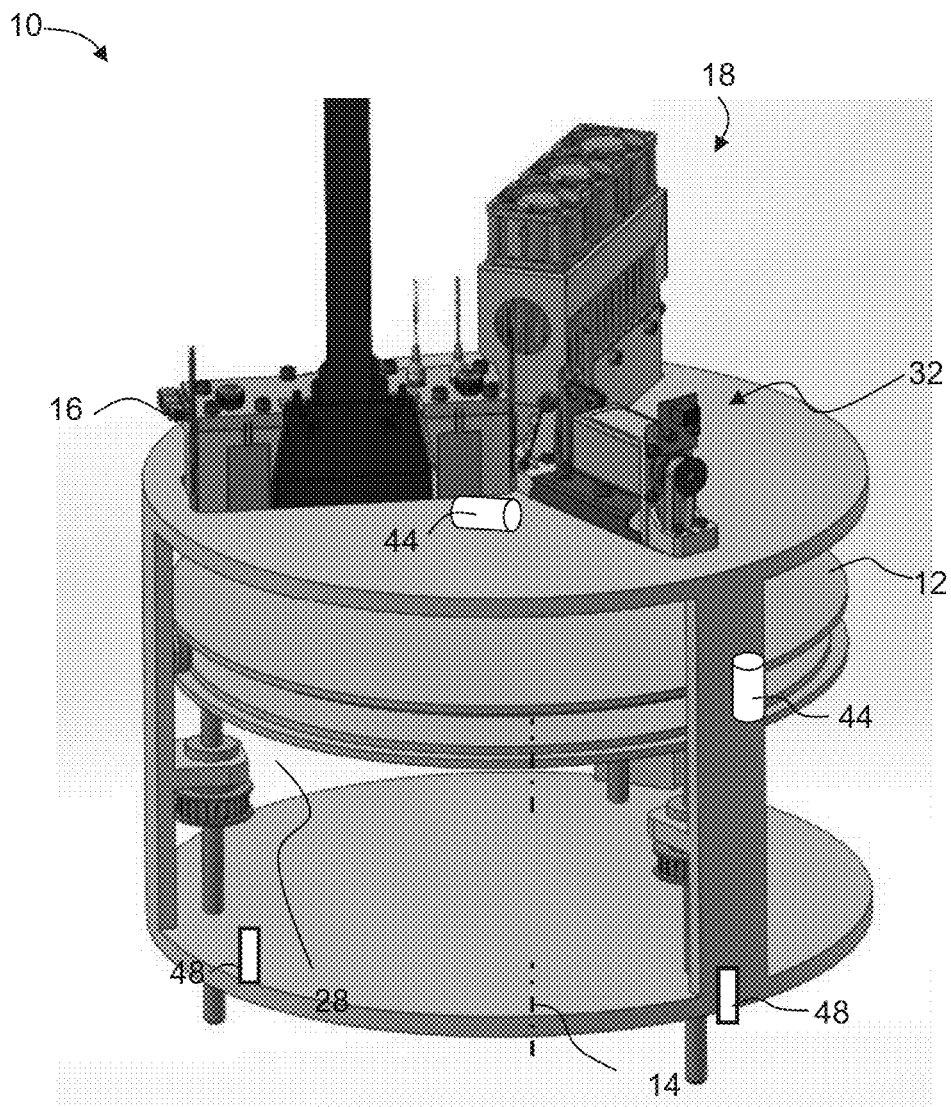

The present invention, in some embodiments thereof, relates to three-dimensional printing and, more particularly, but not exclusively, to rotational three-dimensional printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIGS. 1A-1D illustrate a top view (FIGS. 1A and 1D), a side view (FIG. 1B) and an isometric view (FIG. 1C) of a system 10 for three-dimensional printing, according to some embodiments of the present invention. System 10 comprises a tray 12 and a plurality of inkjet printing heads 16, each having a plurality of separated nozzles. The material used for the three-dimensional printing is supplied to heads 16 by a building material supply system 42. Typically, a nozzle dispenses a drop of building material in response to an activation pulse at sufficient activation energy. A nozzle receiving an activation pulse of energy that insufficient to dispenses a drop is referred to as "tickled". Tray 12 can have a shape of a disk or it can be annular. Non-round shapes are also contemplated, provided they can be rotated about a vertical axis.

Tray 12 and heads 16 are mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersects the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1A tray replacement device 36 is illustrated as a drive 38 with a movable arm 40 configured to pull tray 12, but other types of tray replacement devices are also contemplated.

Figure 1D:
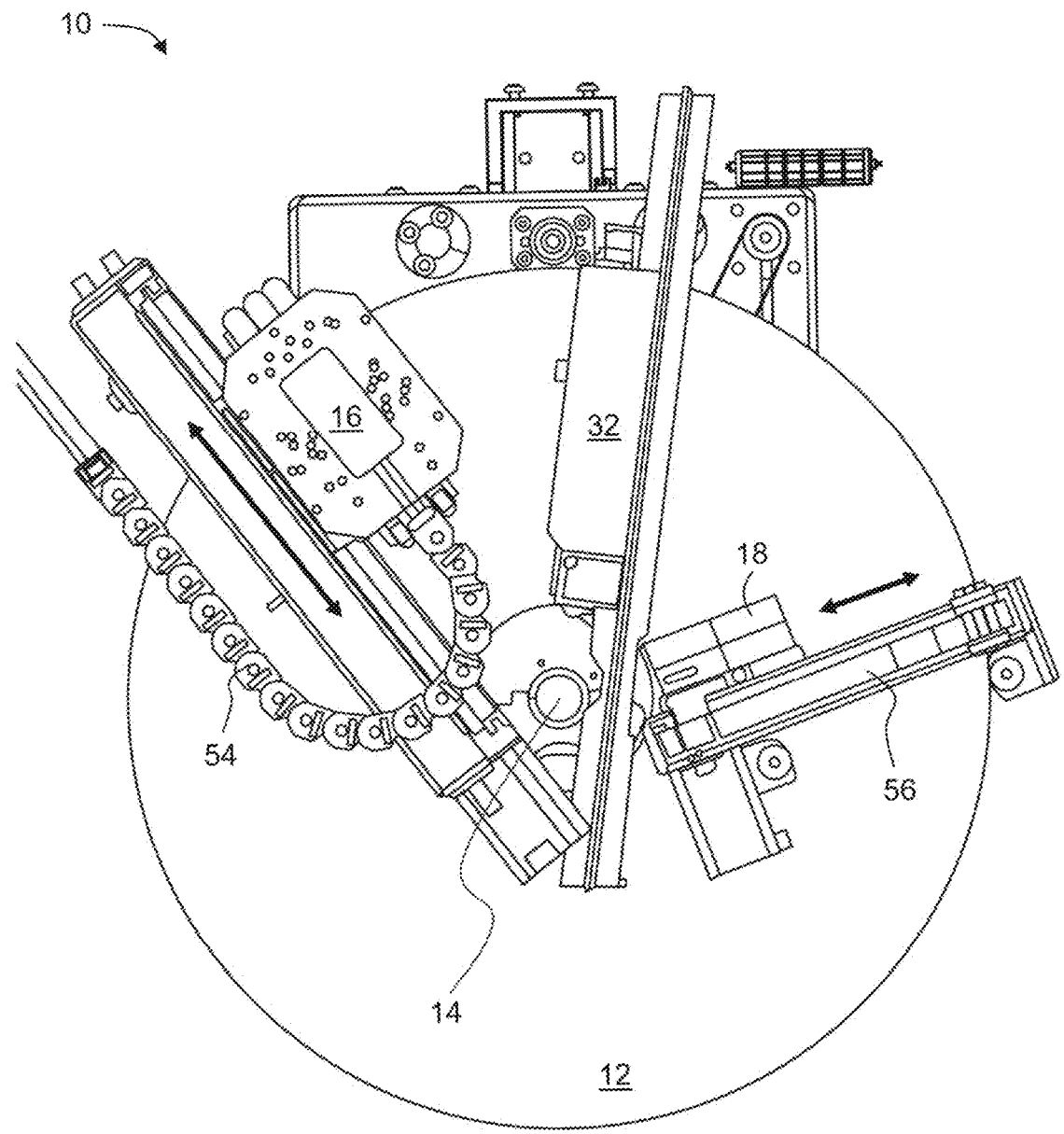

In some embodiments of the present invention heads 16 are configured to reciprocally move relative to tray along the radial direction r. These embodiments are useful when the lengths of the nozzle arrays of heads 16 are shorter than the width along the radial direction of the working area 26 on tray 12. The motion of heads 16 along the radial direction is optionally and preferably controlled by controller 20. A representative illustration of a mechanism suitable for moving heads 16 along the radial direction is illustrated in FIG. 1D. Shown in FIG. 1D, is a head 16 mounted on a stage 52 (FIG. 10) arranged to establish reciprocal motion of head 16 along the radial direction. Head 16 can communicate with supply 42 and controller 20 (not shown in FIG. 1D) via a flexible communication line shown at 54.

Exemplified embodiments for printing head 16 are illustrated in FIGS. 2A and 2C, showing a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

Typically, but not necessarily, all printing heads 16 are oriented radially (parallel to the radial direction) with their azimuthal positions being offset to one another. Thus, in these embodiments, the nozzle arrays of different printing head is not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments of the present invention, a predetermined sub-atmospheric pressure of the air is maintained above the liquid level in head 16. To prevent gravitational leakage from the nozzles, a certain vacuum level relative to the surrounding atmosphere, for example −60 mm water pressure, may be continually maintained within head 16. In practice, the mechanisms for the maintenance of the pressure difference may afford a tolerance of for example ±5%. In another example, the mechanisms for the maintenance of the pressure difference may afford a tolerance of ±5 mm water pressure.

In order to maintain the required vacuum level, a bidirectional pump (not shown) may be placed between the material chamber of head 16 and the atmosphere. The pump can move air from the chamber of head 16 to the atmosphere, thereby increasing the vacuum within the head. Conversely, the bidirectional pump can move air from the atmosphere into head 16, thereby increasing the pressure within the head, i.e. reducing the vacuum there. Preferably, head 16 comprises a pressure sensor (not shown) that measures the pressure difference between the inside of head 16 and the outside atmosphere. Controller 20 receives a current pressure data from the pressure sensor, and can actuate the pump to maintain a predetermined level of vacuum within the head.

In operation, the pressure difference between the pressure within the head and a reference ambient pressure of atmosphere is measured. The pressure difference is optionally and preferably compared with a desired relative pressure or pressure range. The comparison may be carried out, for example, by controller 20. If the measured pressure difference is lower than the desired relative pressure, or a desired pressure difference range, the pump is preferably activated to add air to the chamber. If the measured pressure difference is higher than the desired relative pressure, or a desired pressure difference range, then the pump may be activated to remove air from the chamber. If the measured pressure difference is found to be equal or sufficiently close (within a predetermined pressure difference range) to the desired relative pressure, then the pump is optionally and preferably kept inoperative, thereby effectively causing the pump to act as a valve that blocks passage of air between the ambient atmosphere and the inside of the head.

Figure 12:
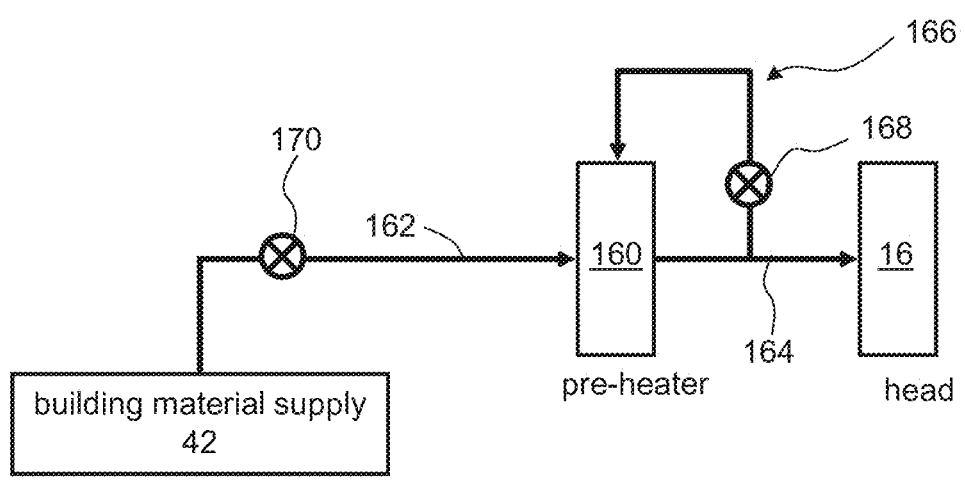
FIG. 12 is a schematic illustration of a pre-heater element positioned at a fluid path between a material supply and a printing head, according to some embodiments of the present invention.

In some embodiments of the present invention the building material is pre-heated before entering the printing head to a working temperature that is suitable for the building material and the printing head. The pre-heating is preferably in addition to the heating effected within the printing heads, as known in the art. The pre-heating can be achieved by a pre-heater element 160 positioned at the fluid path between material supply 42 and head 16 as illustrated in FIG. 12. Pre-heater element 160 is preferably spaced apart from head 16, and is in fluid communication with supply 42 via conduit 162 and with head 16 via conduit 164. This is unlike conventional 3D printing systems in which the pre-heater is mounted on the printing head. Conduit 162 is optionally and preferably provided with a pump 170 configured for generating a flow of building material from supply 42 into pre-heater 160 and also from pre-heater 160 into head 16. Pump 170 is preferably controlled by controller 20.

In various exemplary embodiments of the invention pre-heater element 160 is static, namely it is not allowed to move, for example, together with head 16. Pre-heater element 160 can employ any type of heating technique, including, without limitation, resistive heating, irradiative heating and convective heating. Preferably system 10 comprises a fluid retraction loop 166 for controllably allowing building material to retract from conduit 164 and optionally and preferably also from head 16 back into pre-heater element 160 or supply 42. Fluid retraction loop 166 can comprise a pump 168 for controlling the flow within loop 166. Pump 168 is preferably controlled by controller 20. Alternatively, pump 170 can be a bidirectional pump, in which case retraction of building material back into pre-heater element 160 can be effected by reversing the operation of pump 170. In these embodiments it is not necessary for system 10 to include pump 168.

FIG. 12 illustrates fluid retraction loop 166 as having a conduit that is separated from conduit 164. In these embodiments, when the building material flows back in loop 166, entry of building material into pre-heater element 160 is preferably prevented, for example, by a controllable valve (not shown), that can be mounted on conduit 164, e.g., at the outlet port 172 of pre-heater 160. However, in some embodiments, it may not be necessary for the building material to be retracted by a separate conduit. For example, when pump 170 is bidirectional, loop 166 can be realized as a reversed flow in conduit 164. In this embodiment, it is not necessary to have a separate conduit for the retraction and it is not necessary to have a valve mounted on conduit 164.

When head 16 is operative, pump 170 (or pump 168, if employed) typically does not allow building material to retract from conduit 164. When pump 170 is inoperative, for example, when the operator or controller 20 temporarily interrupts the printing process (e.g., for the purpose of replacing material cartridge), head 16 is idle. If the idle time interval is sufficiently long, the building material already in conduit 164 may lose heat to the environment resulting in a decrease of the building material's temperature below the aforementioned working temperature. At the end of the idle time interval, and prior to the re-activation of head 16, controller 20 preferably activates pump 168 or reverses the operation direction of pump 170 to retract the building material from conduit 164 into pre-heater 160. The retracted building material is reheated in pre-heater 160. The retraction process preferably continues until no building material remains in conduit 164. Thereafter, controller 20 can reverse again the operation direction of pump 170 (or resume its operation and terminate the operation of pump 168, if the retraction is made by pump 168) and the reheated building material is fed into head 16 via conduit 164.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

In operation, system 10 is preferably placed on a surface such that tray 12 is substantially horizontal (e.g., with deviation of less than 10°, or less than 5°, or less than 4°, or less than 3°, or less than 2°, or less than 1°, or less than 0.5°, or less, from the horizontal direction). In some embodiments, system 10 comprises one or more spirit level device 44 mounted at one or more locations on the enclosure of chassis 46 of system 10. Optionally and preferably, spirit level device(s) 44 is an electronic device that communicates with controller 20. In these embodiments, controller 20 can issue an alert signal when the deviation of the enclosure or chassis 46 from the horizontal direction is above a predetermined threshold. Also contemplated, are embodiments in which controller 20 transmits signals to a drive 48 responsively to signals received from spirit level device(s) 44, so as to automatically level the enclosure or chassis 46 when deviation from the horizontal direction is detected.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

When system 10 prints two or more objects (or two or more separated parts of the same object) on tray 12, computer 24 or the circuit of controller 20 can, in some embodiments of the invention, automatically determine a plurality of locations on tray 12. Controller 20 can then signal printing heads 16 to print the objects at the determined locations. The locations on tray 12 at which the objects are printed can be determined by executing an optimization procedure that simulates different arrangements of the objects on tray 12 and chooses one of the arrangements (typically the best possible arrangement), according to a predetermined criterion or set of criteria.

For example, according to one criterion the objects are arranged on tray 12 so as to balance the tray. This criterion is particularly applicable when the objects to be printed are relatively heavy so that their weight can affect the balance of tray 12. As representative examples, when system 10 prints two objects that are relatively heavy and have similar weights, controller 20 or computer 24 can determine that their locations are generally antipodal relative to the center of the tray, and generally at the same radial positions (namely at similar distances from axis 14) preferably close to the periphery of the working area; and when system 10 prints three objects that are relatively heavy and have similar weights, controller 20 or computer 24 can determine that their locations are at three azimuthal positions that are about 120° apart from each other, and generally at the same radial positions, preferably close to the periphery of the working area.

According to another criterion, more objects are printed far from axis 14 than close to axis 14. This criterion is particularly applicable when the number of objects to be printed is greater than two, but can also be applied for the case of two objects. As representative examples, when system 10 prints n objects, the controller or computer first tries to arrange all the objects on the periphery of the working area without overlaps and with sufficient distance between adjacent objects. If not all the objects can occupy the periphery of the working area with sufficient distance between adjacent objects, the controller or computer tries to arrange n−1 objects on the periphery of the working area (again, without overlaps and with sufficient distance between adjacent objects) and 1 object closer to axis 14, and so on.

The optimization procedure can optionally and preferably assign one or more optimization weights (not to be confused with physical weights due to gravity) to each object, simulate different arrangements of the objects, calculate an overall optimization score for each simulated arrangement, and selects an arrangement based on its optimization score. Typically, but not necessarily, the weights have numerical values that quantify the preference for a particular object to be printed at the periphery of the working area. For each particular arrangement, an object optimization score can be calculated for each object and then all the object optimization scores can be combined (e.g., summed, multiplied). An optimization score for the particular arrangement can be calculated based, at least in part, on the combined object optimization scores, and optionally also on other criterion (e.g., spatial relations among locations of different objects).

The object optimization score can be calculated by combining (e.g., summing, multiplying) the numerical weight of the respective object with a parameter that represents the distance of the object from axis 14, for the particular arrangement. Thus, when in some simulated arrangement an object that has a high weight (indicating that it is desired to print the object at the periphery of the working area) is placed at the periphery of the working area, the object optimization score for this object is high. On the other hand, when in some simulated arrangement an object that has a high weight is not placed at the periphery of the working area, the object optimization score for this object is low.

Computer 24 or the circuit of controller 20 can, in some embodiments of the invention, also execute an optimization procedure that receives data pertaining to the overall building material that exists in system (e.g., in supply 42), and calculates the amount of material that is required for printing the object. When the amount of material that is required for printing the object is larger than the amount of material that exists in supply 42, controller 20 of the present embodiments issues an alert.

Figure 3A:
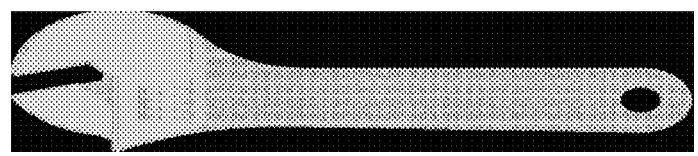
FIGS. 3A-3F are schematic illustrations demonstrating coordinate transformations according to some embodiments of the present invention.
Figure 3B:
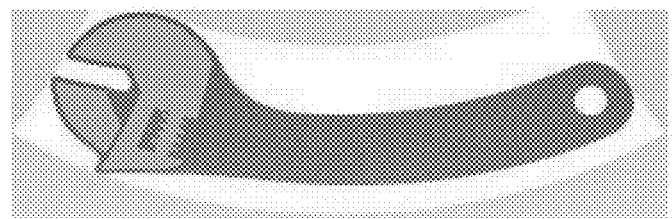
Figure 3C:
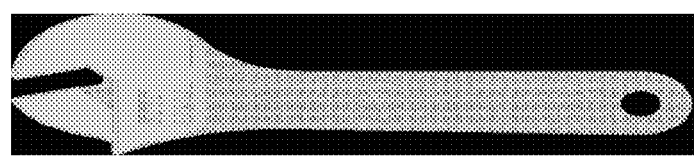
Figure 3D:
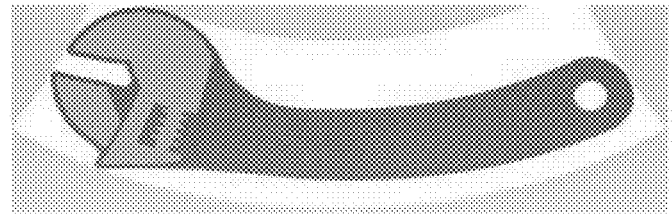
Figure 3E:
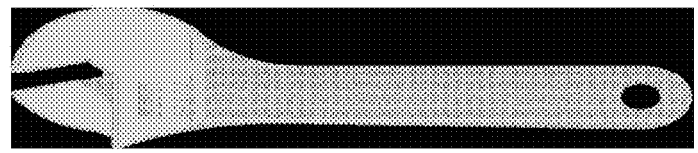
Figure 3F:
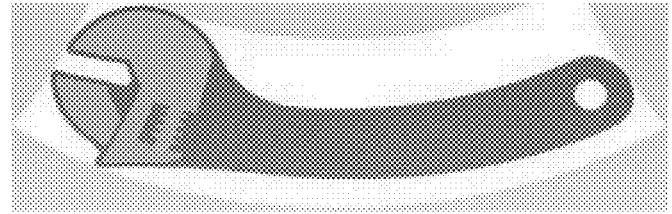

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 at the same time. The transformation of coordinates is optionally and preferably executed so as to ensure equal amounts of excess material at different radial positions. Representative examples of coordinate transformations according to some embodiments of the present invention are provided in FIGS. 3A-F, showing three slices of an object (each slice corresponds to fabrication instructions of a different layer of the objects), where FIGS. 3A, 3C and 3E illustrate slices in a Cartesian system of coordinates and FIGS. 3B, 3D and 3F illustrate the same slices following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

The inkjet printing heads dispense layers of building material via inkjet technology. Each of the printing heads can be configured to dispense a different building material. When a particular printing head comprises two or more nozzle arrays, each nozzle array can be configured to dispense a different building material. Thus, different target locations can be occupied by different building materials. The types of building materials can be categorized into two major categories: modeling material and support material.

The support material serves as a supporting matrix for supporting the object or object parts during the fabrication process and/or other purposes, e.g., providing hollow or porous objects. The support material is preferably water dispersible to facilitate its removal once the buildup of object is completed. The support material is preferably dispensed in liquid form and is curable by radiation, such as, but not limited to, electromagnetic radiation (e.g., ultraviolet radiation, visible light radiation, infrared radiation), and electron beam radiation. Also contemplated are support materials which comprise a wax component, and, optionally, also a viscosity modifying component. These types of support materials are in liquid form at the inkjet printing temperatures of system 10, solidify once cooled after being dispensed, and do not require curing by radiation.

The modeling material is generally a composition which is formulated for use in inkjet technology and which is able to form a three-dimensional object on its own, i.e., without having to be mixed or combined with any other substance. The modeling material is preferably dispensed in liquid form and is curable by radiation, such as, but not limited to, electromagnetic radiation (e.g., ultraviolet radiation, visible light radiation, infrared radiation), and electron beam radiation.

In some embodiments of the invention both the support and the modeling materials are curable using the same type of radiation.

The final three-dimensional object that is fabricated by system 10 is made of the modeling material or a combination of modeling and support material or modification thereof (e.g., following curing).

Preferably, but not obligatorily, the overall number of dispensing nozzles or nozzle arrays is selected such that half of the dispensing nozzles are designated to dispense support material and half of the dispensing nozzles are designated to dispense modeling material. In the representative example of FIG. 2C, each of heads 16a and 16b has one nozzle array, while head 16c has two nozzle arrays. In this Example, heads 16a and 16b can be designated for modeling material and head 16c can be designated for support material. Thus, head 16a can dispense a first modeling material, head 16b can dispense a second modeling material and head 16c can dispense support material. In an alternative embodiment, head 16c, for example, may comprise 2 physically separate structures, each having a single nozzle array. In this embodiment each of the two structures can physically be similar to heads 16a and 16b.

Generally, the number of modeling heads, the number of support heads and the number of nozzles in each head are selected such as to provide a predetermined ratio, $\alpha$, between the maximal dispensing rate of the support material and the maximal dispensing rate of modeling material. The value of the predetermined ratio, $\alpha$, is preferably selected to ensure that at each fabricated layer, the height of modeling material equals the height of support material. Typical values for $\alpha$ is from about 0.6 to about 1.5.

For example, for $\alpha=1$, the overall dispensing rate of support material is generally the same as the overall dispensing rate of the modeling material when all modeling heads and support heads operate.

In a preferred embodiment, there are M model heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature controller and a material level sensor of its own, and receives an individually controlled voltage for its operation.

The type of material that is conveyed to each nozzle array of each printing head for dispensing is optionally and preferably controlled by controller 20. For example, controller 20 can signal a building material supply system 42 to supply a first modeling material to one nozzle array of a first head and a support material to another nozzle array of the first head. Controller 20 can also signal system 42 to supply the first modeling material to one nozzle array of the first head, the support material to another nozzle array of the first head, and a second modeling material to one nozzle array of a second head. Alternatively, controller 20 can signal system 42 to supply the support material to a nozzle array of another head. Controller 20 can also signal system 42 to supply the first modeling material to one nozzle array of the first head, the support material to another nozzle array of the first head, the second modeling material to one nozzle array of the second head, and a third modeling material to another nozzle array of the second head, and so on.

Tray 12 and/or printing heads 16 is configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The system of the present embodiments enables selection of modeling materials from a given number of modeling materials and/or materials intended to comprise part of the object being fabricated, to define desired combinations of the selected materials and define the 'spatial location' of their deposition (combined or separate) within the layer, thus enabling the formation of a broad range of materials (i.e., material combinations), having a range of material attributes or properties, and enabling the fabrication of an object which may consist of multiple different combinations of modeling materials, in different parts of the object, according to the properties desired to characterize each part of the object.

A three-dimensional object may be created by using suitable software such as CAD software, which exports the virtual object to system 10 by a portable file format, suitable for CAD, as further detailed hereinabove. The user can divide or split the virtual object to be fabricated into a number of separate parts or regions. A region in the object is thus a sub-volume of the object confined in one or more close surfaces which do not intersect with each other.

Division of the virtual object is done in order to enable assigning of different modeling materials or modeling material combinations or structures to the different regions. In some embodiments, the different regions are saved as different data files or different parts of a data file, all files or parts of files referring to the same axes system and origin. The process of division into separate regions and their conversion to data files may be carried out generally as known in the art, for example, generally as described in U.S. Pat. No. 5,768,134, assigned to Materialise N. V. A group of regions or data files may therefore make up a whole object or whole part thereof.

In some embodiments of the present invention, deposition of the modeling material(s) is determined according to the thus defined regions, e.g., the specific modeling materials to be used, and their combination and/or spatial deposition within the region are defined in the software, as well as the spatial definition of the regions themselves within the object layer, all according to the pre-defined properties desired for each part of the final object. Typically, definition of region attributes, e.g., types of modeling material and their combination in a given region may be defined by the software at or after the time of division of the virtual object into regions. In a preferred embodiment, for any given region, a user or operator of system 10 may introduce definitions, e.g., via a user interface. For example, the operator may select a specific region and select modeling materials and/or material combinations for the thus defined region, according to the properties desired for each respective region. An example of this is defining one modeling material or material combination for the periphery or boundary of the region and a different material or material combination for the remainder. A useful example of this is printing objects with hard material in the bulk but soft material on the skin.

Combinations of different modeling materials having different properties may be selected to be deposited in different regions, to create a composite material having properties different to those of the dispensed material, or that exhibit a combination of their properties. The resulting properties may differ according to the combination and/or relative amounts of the materials dispensed. The materials to be used in different combinations as well as the structure, e.g., spatial/relative deposition, of their combinations are predetermined according to the properties desired to be achieved in the final composite material forming the object or parts of the object.

A resulting object, according to some embodiments of the present invention, can thus have properties which differ within the object itself, e.g., a property which increases or decreases from one side of the object to another, or alternating properties within the object. For example, selecting one modeling material which is rigid after curing and another which is flexible or elastic after curing, can result in a composite material object in which some parts of the object are more rigid than others, some more flexible than others, or the object may be rigid, e.g., on the outside and in the center, but flexible everywhere else. If, for example, a greater amount of rigid material is dispensed than the amount of flexible material, the fabricated object material is less rigid than the selected rigid material, but not as flexible as the selected flexible material. Different regions of the fabricated object can thus have differing material properties, where a region can be a layer, part of a layer or a number of layers, e.g., a horizontal block of layers, or other structural arrangements, and thus the material properties may vary within a layer or between different blocks of layers. A composite material may also have colors that differ throughout the composite material, depending on relative amounts and spatial dispensing of a number of different colored materials.

The different types of modeling materials may remain separate and distinct within the fabricated object or they may be mixed during the fabrication process. In the single material mode, if, for example, two modeling materials are used, the materials themselves may combine into a single material, or they may be deposited such that each material remains distinct, however their uniform deposition in droplets of material next to one another forms a uniform, homogenous mix. In multi material modes, two or more modeling materials may be selected to be dispensed individually in parts or regions, and/or combined in others, where the combination may be made by dispensing relative amounts of each material in different specified target locations or groups of target locations, or by dispensing two or more types of modeling materials within the same group of target locations.

The relative amounts of different modeling materials which are dispensed per layer or a portion thereof can be dynamically varied by controller 20 during the fabrication of the object, particularly when it is desired to fabricate an object having nonuniform or anisotropic properties. Controller 20 preferably receives from computer 24 digital data describing the relative amounts and controls the dispensing rate of the individual dispensing rate according to the data. The variation of relative amounts can be made either in continuous or discrete manner.

The ability of the system of the present embodiments to utilize two or more different modeling materials, makes it is possible to use many more and more varied materials in solid free fabrication than has been possible to date in conventional solid freeform fabrication techniques as well as providing many different possibilities for combining multiple materials, according to the final object and/or object properties desired to be obtained.

For example, building materials which have a greater tendency to shrink as a result of the polymerization process are not usually suitable for use in traditional solid freeform fabrication apparatus. The system of the present embodiments usefully provides a solution to this problem. For example, the system of the present embodiments can fabricate parts or objects in which the outside surfaces of the part or object are made of one material, while the rest of the part or object comprises a different material. In this example, the internal regions may be fabricated of a material which lacks mechanical strength, such as a gel or liquid, but having other desirable properties such as being easily removable, e.g., in order to create a hollow object, or easily burnt without leaving ash or other traces.

In some embodiments of the invention, two or more modeling materials may be dispensed, where one or both of the materials may not have the properties required to allow the building of the desired object. The combination of the two materials can provide a functional modeling material. For example, one of the materials may not solidify during the fabrication process, but remain in liquid, gel, paste or other non-solid or semi-solid form, while the other material does solidify during the fabrication process. The solidified material can "contain" the non-solidified material, or, alternatively, the non-solidified material can be drained, burnt out or otherwise removed once the process is complete so as to provide a model which is hollow or porous.

In some embodiments of the invention, two or more modeling materials may be dispensed where one material may have too low reactivity to be used as a modeling material in a specific system, as if used alone it would produce an object having poor definition and low printing quality, while another material has the appropriate reactivity. In this example, it may be noted that one of the basic properties of a UV curable formulation is its reactivity to UV radiation. Reactivity is generally obtained by a suitable combination of monomers, oligomers, photoinitiator and photoinitiator concentration. Acrylic monomers and oligomers (as opposed to methacrylic) are especially appropriate due to their relatively high intrinsic reactivity, meaning that acrylic formulations can use relatively low concentrations of photoinitiator. Due to the relatively low intrinsic reactivity of methacrylic components, it is rather difficult to use them in the preparation of formulations. The lack of reactivity of a formulation directly affects its printing quality. The use of a formulation with low reactivity would produce an object with undefined and inexact edges and/or surfaces.

Methacrylic components generally have valuable properties such as a lower shrinkage ratio and higher Tg (glass transition temperature) than acrylic components, however they have lower reactivity than acrylic components. This problem may be solved using the system of the present invention, wherein one modeling material is used which has high reactivity, e.g., an acrylic formulation, and another modeling material which has low reactivity, e.g., methacrylic formulation. The high reactivity formulation may be used to surround the low reactivity formulation in each layer and thus the object's surfaces would consist of the reactive formulation and the core of the object of the low reactivity formulation. As a consequence the quality of the periphery of the object is assured; since this characteristic requires high reactivity (the quality of periphery comprises wall smoothness and edge sharpness). The accuracy of the object is assured too since deformation of the bulk, which is brought about by shrinkage, is minimized. In this way, the valuable properties of low reactivity components can be exploited. Other types of low reactivity formulations may be used, including, for example, UV cationically initiated polymerizable formulations.

In some embodiments of the present invention the nozzle array of one or more of the printing heads is configured such that nozzles that are at different distances for axis 14 dispense the building material at difference dispensing rates. Preferably, nozzles that are more close to axis 14 (or to the center of tray 12) dispense the building material at lower dispensing rate than nozzles that are farther from axis 14. This configuration is advantageous since it reduces or eliminates the effect of different linear speeds at different distances from axis 14.

The different dispensing rates can be ensured in more than one way.

In some embodiments of the present invention the diameters of the apertures the nozzles differ among different nozzles of the same nozzle array. For example, the diameter of the aperture of the nozzle can be an increasing function of the distance of the nozzle from axis 14, so that for any pair of nozzles of the same array, the aperture of the nozzle that is closer to axis 14 is smaller than that of the nozzle that is farther from axis 14.

In some embodiments of the present invention the diameters of the apertures the nozzles are the same for all nozzles of the same nozzle array, but the nozzles are individually controlled by controller 20. In these embodiments, controller 20 applies different voltage levels to different nozzles of the same array, so as to ensure different dispensing rates for different nozzles in the same array. Preferably, controller 20 selects the applied voltage such that nozzles that are more close to axis 14 dispense the building material at lower dispensing rate than nozzles that are farther from axis 14.

In some embodiments of the present invention the diameters of the apertures of the nozzles differ among different nozzles of the same nozzle array, and the nozzles are individually controlled by controller 20. In these embodiments, the different dispensing rates, is ensured by the different sizes of apertures and is further ensured by judicious selection of the voltage applied by controller 20.

The present Inventors have also devised a technique that solves problems associated with constant dispensing rate when the relative motion between the priming head and the tray is not along straight lines. The technique described below can be employed when all the nozzles of heads 16 dispense the building material at the same dispensing rate, but it may be employed when the printing rates vary. The technique can be employed for any printing scenario in which the nozzles follow trajectories that are not along a straight line, particularly in situations in which operating all the nozzles of a printing head at the same frequency results in non-uniform resolution. The technique includes data masking as will now explained in greater detail.

Each slice in the computer object data is typically, but not necessarily, in the form of a binary bitmap. Alternatively, the slice data can be calculated on the fly from a three-dimensional computer representation of the object (e.g., a 3D mesh).

While the embodiments below are described with a particular emphasis to use a bitmap, it is to be understood that the operation of reading information from a bitmap can be substituted by an operation of calculating a value at a certain location within a three-dimensional computer representation of the object, and that both are contemplated according to various exemplary embodiments of the invention.

From the bitmap of the computer object data a nozzle activation bitmap is typically calculated. Each bitmap element (e.g., pixel) in the nozzle activation bitmap corresponds to a target location on the respective layer wherein the value of the bitmap element determines whether or not a respective nozzle arriving at the respective physical location is activated. For example, "1"s represent locations which are to be occupied by building material in the final layer and "0"s represent voids in the final layer.

Figure 9A:
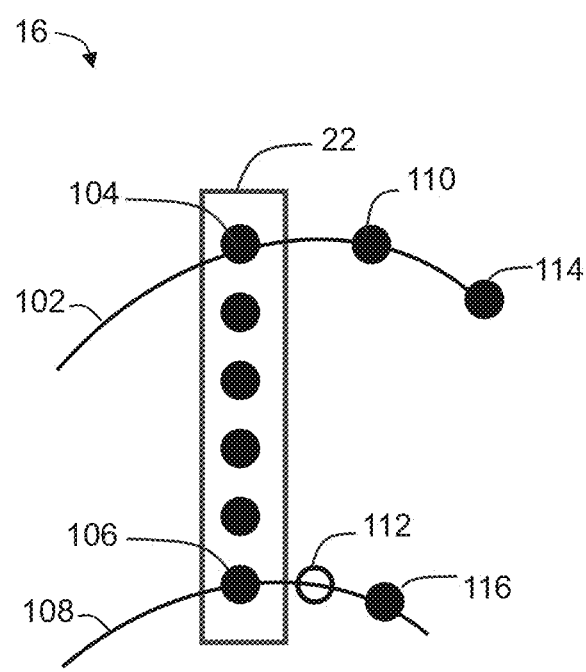
FIGS. 9A-9C are schematic illustrations demonstrating a technique suitable for reducing or eliminating variations in resolution along an azimuthal direction as a function of the radial coordinate, according to some embodiments of the present invention.

According to the present embodiments, the operating bitmap is masked such that the resolution along the azimuthal direction of all nozzles is the same regardless of their position in the head and the trajectory of the head. A representative example of such masking is shown in FIG. 9A, that illustrates nozzle array 22 of head 16. The first nozzle (farthest from axis 14) is denoted as nozzle 104 and the last nozzle (closest to axis 14) is denoted as nozzle 106. FIG. 9A also illustrates two exemplified curved trajectories 102 and 108 respectively followed by nozzles 104 and 106 during the relative motions of head 16 and tray 12. Six nozzles are illustrated in array 22, but array 22 can have any number of nozzles. The shown locations of nozzles 104 and 106 over trajectories 102 and 108 correspond to a time instance referred to as $T_1$. At a further time instance $T_1+dT$ nozzle 104 arrives at position 110 along trajectory 102 and nozzle 106 arrives at position 112 along trajectory 108. At a yet further time instance $T_1+2dT$, nozzle 104 arrives at position 114 along trajectory 102 and nozzle 106 arrives at position 116 along trajectory 108.

Nozzles 104 and 106 cover different arc lengths over trajectories 102 and 108 over the same time interval. Specifically, the three locations visited by nozzle 104 at time instances $T_1$, $T_1+dT$ and $T_1+2dT$ are more spaced apart than the three locations visited by nozzle 106 at these time instances. In the example illustrated in FIG. 9A, the arc length covered by nozzle 106 between time instances $T_1$ and $T_1+2dT$ is approximately the same as the arc length covered by nozzle 106 between time instances $T_1$ and $T_1+dT$, or between time instances $T_1+dT$ and $T_1+2dT$. According to some embodiments of the present invention nozzle 106 is activated at time instance $T_1$ and at time instance $T_1+2dT$, but not at time instance $T_1+dT$. In other words, the nozzle activation bitmap that corresponds to the respective layer is masked such that no material is dispensed at location 112 irrespectively whether or not the nozzle activation bitmap or the bitmap of the input computer object data designates location 112 as a location at which a droplet of building material is to be dispensed.

The illustration in FIG. 9A represents an example of a masking ratio of 50% wherein 50% of the locations along trajectory 108 are masked for nozzle 106, so that nozzle 106 does not dispense material upon arriving to these location. It is appreciated that for other pairs of trajectories the masking ratio can be different from 50%. The masking ratio can be calculated for each trajectory of each nozzle, based on the ratio between the arc lengths covered by different nozzles during the same time interval dT, or based on the ratio between the linear speeds of different nozzles. Based on the masking ratio, controller 20 can optionally and preferably decide whether or not to activate a respective nozzle at a respective location. According to some embodiments of the present invention, when a nozzle is masked at a time instance, no print data is read from the input bitmap of nozzle activation bitmap for that nozzle. Alternatively, such input is not calculated. These embodiments can be viewed as data dilution since it reduces the amount of data that is processed at bitmap level. The advantage of this embodiment is that it saves on computation time and resources.

A further saving on computation time and resources can be achieved by considering the arc length of the trajectory covered by a nozzle that belongs to a group of nozzles, e.g., a nozzle array. According to some embodiments of the present invention, a nozzle which covers the longest trajectory segment of the group during a time interval is identified. A binary mask value is then calculated for this nozzle (for example, "0" for masking and "1" otherwise) at a time instance within the time interval. When this nozzle is masked, then all other nozzles of the group are masked, without separately calculating a mask value for each of these nozzles. Optionally and preferably, the nozzle activation bitmap is not accessed for a group of masked nozzles.

Figure 9B:
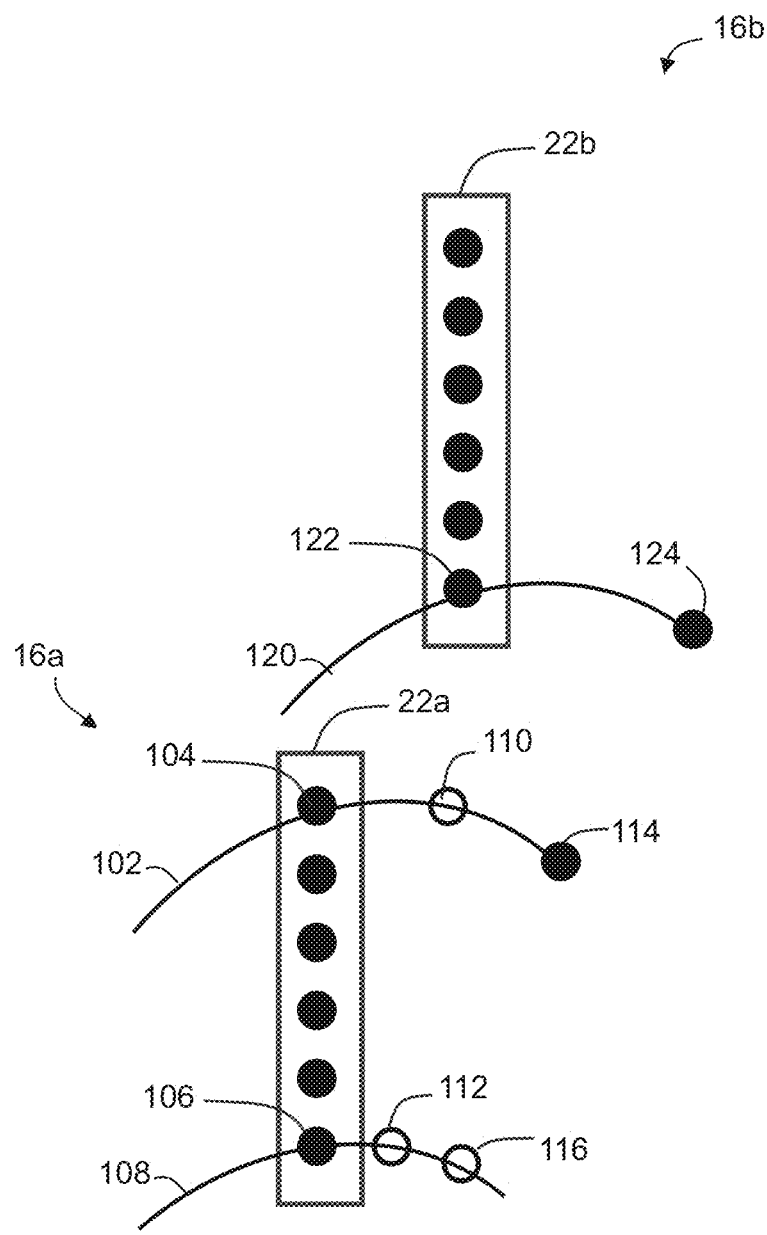

FIG. 9B, schematically shows nozzle arrays 22a and 22b of two heads 16a and 16b, respectively. The notations corresponding to head 16a are the same as for head 16 in FIG. 9A above. The last nozzle in head 16b is denoted 122 and the trajectory followed by that nozzle is denoted 120.

The locations of nozzles 104, 106 and 122 over trajectories 102, 108 and 120 correspond to a time instance referred to as $T_1$. At instance $T_1+dT$ nozzle 104 arrives at position 110 along trajectory 102, nozzle 106 arrives at position 112 along trajectory 108, and nozzle 122 arrives at position 124 along trajectory 120. For a given time-interval (e.g., between time instances $T_1$ and $T_1+dT$), the arc length covered by nozzle 104 is the longest among the arc lengths covered by any other nozzle in array 22a.

In the example illustrated in FIG. 9B, the arc length covered by nozzle 122 between time instances $T_1$ and $T_1+dT$ is approximately the same as the arc length covered by nozzle 104 between time instances $T_1$ and $T_1+2dT$. According to some embodiments of the present invention nozzle 104 is activated at time instance $T_1$ and at time instance $T_1+2dT$, but not at time instance $T_1+dT$, and nozzle 106 is activated at time instance $T_1$ but not at time instances $T_1+dT$ and $T_1+2dT$. Furthermore, since any nozzles of array 22a other than nozzle 104 covers a arc length that is shorter than the arc length covered by nozzle 104 over the same time interval, none of the nozzles of array 22a need to be activated at time instance $T_1+dT$. In other words, the nozzle activation bitmap that corresponds to the respective layer is masked such that no material is dispensed from any nozzle of array 22a at least until the first nozzle 104 arrives at location 114 along trajectory 102. This corresponds, as stated, to a data dilution operation, since it reduces the amount of data that is processed at bitmap level.

It was found by the present inventors that such a procedure significantly reduces the processing time and required computation resources, because there is no need to access the nozzle activation bitmap (or to compute its value) while until the first nozzle 104 arrives at location 114. This saving can be better understood from the illustration provided in FIG. 9C.

Figure 9C:
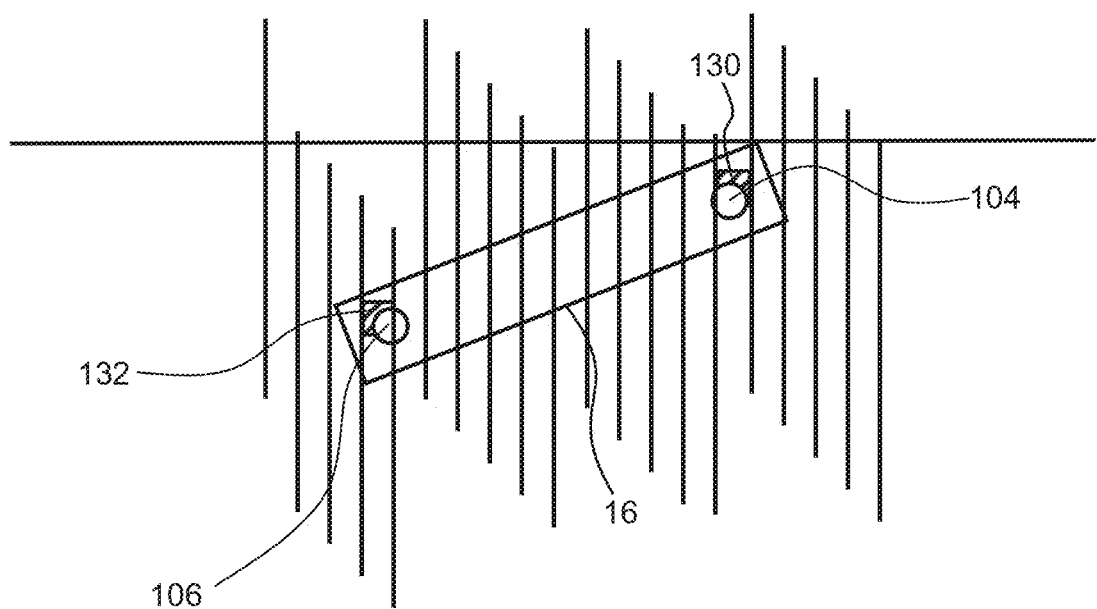

FIG. 9C illustrates nozzle array 22 superimposed on an input bitmap, which, in this example is defined over a rectangular grid. Each location on the grid represents an input bitmap element (e.g., a pixel). Shown in FIG. 9B are bitmap elements 130 and 132. Array 22 is illustrated at time instance $T_1$ at which the first 104 and last 106 nozzles of array 22 approximately superimpose over elements 130 and 132 of the input bitmap. Therefore, the values stored in elements 130 and 132 may result in activation or non-activation of nozzles 104 and 106, at time instance $T_1$.

Conventional printing systems search for the location of the relevant nozzles at a specific time instance ($T_1$, in the present example), search for bitmap elements that are co-located with the nozzles at the specific time instance, obtain information contained in the respective bitmap elements, and decide whether or not to activate the respective nozzles. The present inventors found that at least some of these steps are superfluous and can be skipped by the masking technique of the present embodiments, That is to say, at locations at which the nozzles are masked out, it is not necessary to process the bitmap, hence to save on processing time.

In various exemplary embodiments of the invention controller 20 or data processor 24 accesses a computer readable medium storing a pre-computed mask and apply the mask to the input bitmap or nozzle activation bitmap. The pre-computed mask can be in the form of a rectangular Boolean matrix, indicating locations at which the activation of the nozzles is masked (namely nozzles locations at which the nozzles do not dispense material irrespectively of the value at the respective bitmap element). The dimension of the mask optionally and preferably equals the multiplication of the number of nozzles in a head by the number of dispensable droplets on the longest trajectory over working area 26 (e.g., the outermost perimeter of working area 26, or the outermost perimeter of occupied region 90).

The calculation of the elements of the pre-computed mask is optionally and preferably based on the aforementioned mask ratio. Optionally and preferably the calculation comprises applying a pseudo-random number generator using the mask ratio as input probability. Specifically, each nozzle's location along a trajectory is masked at a probability that equals the masking ratio associated with that location. It was found by the present inventors that such application of the pseudo-random number generator significantly improves the quality of the printed object. Without being bound to any particular theory it is assumed that improved quality when pseudo-random number generator is due a reduced amount of interference events in head 16 and optionally other components of system 10.

When a nozzle covering the longest arc length is identified among a group of nozzles (e.g., a nozzle array) over a time interval, then the pseudo-random number generator is preferably applied only to the trajectory of that nozzle, wherein all the other nozzles of the group are masked for the entire time interval. Referring again to FIG. 9B, according to the present embodiments, the pseudo-random number generator is applied only to trajectory 102 and all other nozzles in array 22a are masked for the entire time interval between time instances $T_1$ and $T_1+dT$. This procedure can be viewed mathematically as masking one nozzle (nozzle 104, in the present example) with probability less than 1, and masking all other nozzles in the group (array 22a in the present example) with probability 1, when given that the one nozzle is masked.

The present inventors also contemplate calculating binary mask values for each of at least some of the nozzle's locations during the three-dimensional printing process. This can be done, for example, based on a predetermined mask function of the arc length of the respective location from axis 14. In various exemplary embodiments of the invention the mask function is selected such that nozzle's locations that are closer to axis 14 are masked more often than nozzle's locations that are far from axis 14. For example, the mask function can calculate a masking ratio that equals the ratio between the linear speeds of different nozzles along different trajectories. Once the masking ratio is calculated, the decision regarding the masking of a particular nozzle location along the trajectory is optionally and preferably made in a probabilistic manner as further detailed hereinabove. When a nozzle covering the longest arc length is identified among a group of nozzles (e.g., a nozzle array) over a time interval, then the decision is made (optionally and preferably made in a probabilistic manner) only to the trajectory of that nozzle, as further detailed hereinabove.

The present inventors also contemplate calculating binary mask values in situations in which the printing is not along circular segments. In these embodiments data pertaining to the trajectory of the nozzles during printing is received, and the masking ratio is calculated based on the received trajectories (e.g., based on arc length ratios as further detailed hereinabove). Each nozzle's location is then masked based on the calculated masking ratio, optionally and preferably in a probabilistic manner as further detailed hereinabove. When a nozzle covering the longest arc length is identified among a group of nozzles (e.g., a nozzle array) over a time interval, then the decision is made (optionally and preferably made in a probabilistic manner) only to the trajectory of that nozzle, as further detailed hereinabove.

In any of the above embodiments, the nozzle activation bitmap is accessed, optionally and preferably only for nozzle locations that are not masked, to determine whether or not to activate the nozzles at these unmasked locations.

In any of the above embodiments, nozzles that are not activated (for example, nozzles that are masked) are optionally and preferably tickled, namely they receive an activation energy that is less than the energy required to activate the nozzles to dispense building material.

It was found by the present inventors that operating the nozzles at certain frequencies may, in some cases, be detrimental to the long term health of the nozzles, as it may cause a nozzle to stop operating or change its operation characteristics such as the weight or rise of the drop emitted. Thus, in some embodiments of the present invention certain frequencies are eliminated from the pseudo-random mask. For example, the highest frequencies may be eliminated from the mask, so that an off-on-off sequence never appears, while an off-on-on-off sequence does appear.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source 18 can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the present invention radiation source 18 is configured to reciprocally move relative to tray along the radial direction r. These embodiments are useful when the length of radiation source 18 is shorter than the width along the radial direction of the working area 26 on tray 12. The motion of radiation source 18 along the radial direction is optionally and preferably controlled by controller 20. A representative illustration of a mechanism suitable for moving radiation source 18 along the radial direction is illustrated in FIG. 1D. Shown in FIG. 1D, is a radiation source 18 mounted on a stage 56 arranged to establish reciprocal motion of radiation source 18 along the radial direction. Thus, the present embodiments contemplate a radiation source and a printing head, each being independently controllable to move in the radial direction along a separate motion stage. This is unlike conventional three-dimensional printing systems in which the printing head and radiation source are mounted on the same printing block and are therefore forced to move simultaneously. In some embodiments of the invention controller 20 is configured to move radiation source 18 and head(s) 18 non-simultaneously along the radial direction during the operation of system 10. In some embodiments of the invention controller 20 is configured to move radiation source 18 and head(s) 18 non-simultaneously independently along the radial direction during the operation of system 10. These embodiments are particularly useful when it is desired to select the time at which curing is initiated, for example, to delay the curing, as further detailed hereinbelow.

Radiation source 18 and/or controller 20 are optionally and preferably configured to ensure that the curing rate of the dispensed building material is generally (e.g., within 20% or within 10% or within 5% or within 1%) the same for droplets dispensed at different radial positions. Typically, this is achieved by configuring or controlling radiation source 18 to deliver energy at different rates to locations that are at difference distances from axis 14. Preferably, the rate at which energy is delivered by source 18 decreases linearly with the distance from axis 14. Specifically, denoting the rate of energy delivered to a location at a distance $r_1$ from axis 14 by $P_1$, and the rate of energy delivered to a location at a distance $r_2$ from axis 14 by $P_2$, the rates $P_1$ and $P_2$ preferably satisfy the relation $P_1/P_2 \approx r_1/r_2$.

Delivery of different energy doses to locations that are at difference distances from axis 14 can be done in more than one way. In some embodiments of the present invention radiation source 18 has a tapered shape, so that its width generally along the azimuthal direction is narrow at its inward end (closer to axis 14) than at its outwardly pointing end (farther from axis 14). In some embodiments of the present invention the radiation emitting elements within radiation source 18 (e.g., LEDs or the like) that are not all characterized by the same emission power. In these embodiments the emitting elements are preferably distributed radially along radiation source 18 such that elements with lower emission power are closer to the inward end and that elements with higher emission power are closer to the outward end. Preferably, the emitting elements are distributed such that the emission power linearly decreases with the distance from the inward end. In some embodiments of the present invention the radiation emitting elements within radiation source 18 (e.g., LEDs or the like) are all characterized by the same emission power, but controller 20 individually controls each radiation emitting element or each group of radiation emitting elements to emit radiation at a different power. This can be done by generating different electric fields within different radiation emitting elements or different groups of radiation emitting elements. Combination of the above embodiments (e.g., tapered source with radiation emitting elements not all emitting at the same emission power) are also contemplated.

It is appreciated by the present Inventors that the time interval between the event at which the building material is dispensed and the event at which the newly dispensed material is exposed to the radiation from source 18 may affect the accuracy, surface finish, and general print quality of the printed object. Generally, shorter time intervals between these events results in less dot-gain and better quality of the printed object. On the other hand, it was found by the present inventors that placing source 18 in close proximity with head(s) 16 can have adverse effects on the jets dispensed from head(s) 16. Without wishing to be bound to any particular theory, it is believed that these effects are due to radiation that is reflected from tray 12 or from the building material on tray 12 in the direction of the nozzles of head(s) 16.

The present Inventors have conducted experiments to determine a preferred geometrical arrangement of source 18 and head(s) 16 such that adequate printing quality is achieved while reducing or minimizing damage to the nozzles. The experiments are described in the examples section that follows. Based on experimental data obtained according to some embodiments of the present invention, adequate print quality was achieved when the time to cure was about 0.5 seconds, and preferably no more than 0.75 seconds. Thus, the azimuthal separation between source 18 and heads(s) 16 is preferably between 0.3ω radians and 0.75ω radians, where ω is the average angular velocity of tray 12 relative to head(s) 16 and source 18. Typically, but not necessarily, the azimuthal separation between head(s) 16 and source 18 is from about 30° to about 120°, more preferably from about 40° to about 110°, more preferably from about 45° to about 100°, more preferably from about 45° to about 90°, more preferably from about 55° to about 90°.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1B).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

Figure 6:
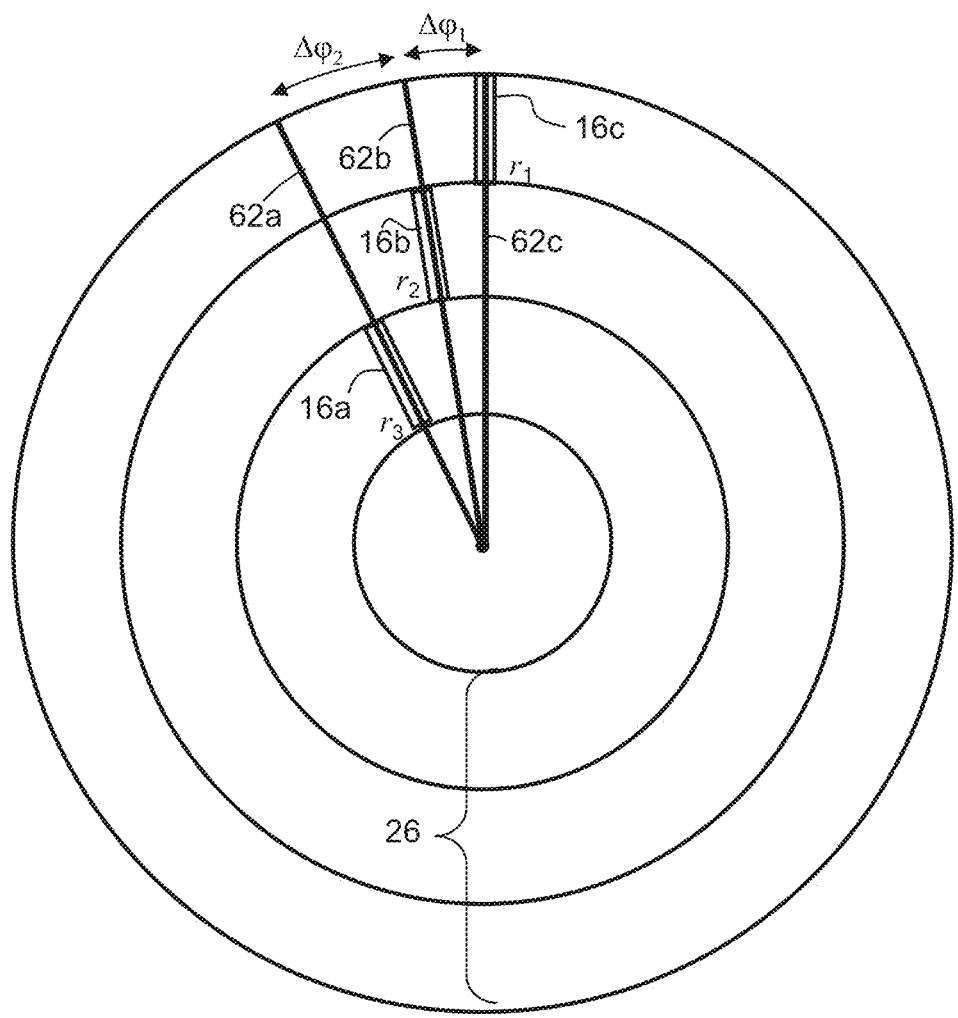
FIG. 6 is a schematic illustration showing printing heads mounted on different radial axes arranged such that there is azimuthal separation angle between adjacent axes.

As stated, heads 16 may reciprocally move relative to tray along the radial direction. In some embodiments of the invention controller 20 controls the motion of heads 16 along the radial direction independently for each of the printing heads. Preferably, each such independent motion is at a different azimuthal angle. For example, two or more of the heads can be mounted on different radial axes arranged such that there is azimuthal separation angle between adjacent axes. This embodiment is illustrated in FIG. 6, showing three heads 16a, 16b and 16c respectively mounted on three radial axes 62a, 62b and 62c. As shown, the azimuthal separation angle between axis 62a and axis 62b is $\Delta\varphi_2$ and the azimuthal separation angle between axis 62b and axis 62c is $\Delta\varphi_1$. Any number of heads and any number of axes can be employed.

It was found by the present inventors that when tray 12 rotates continuously in the same direction, the expected overall printing time increases with the number of passes of heads 16 along the radial direction, and does not necessarily increase with the number of objects being printed.

Figure 8A:
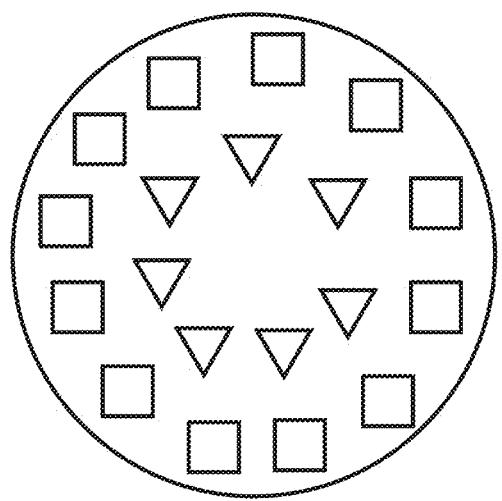
FIGS. 8A and 8B are schematic illustrations of objects arranged on a tray of a system for three-dimensional printing (FIG. 8A), and the expected printing time, as a function of the number of objects (FIG. 8B), according to some embodiments of the present invention.
Figure 8B:
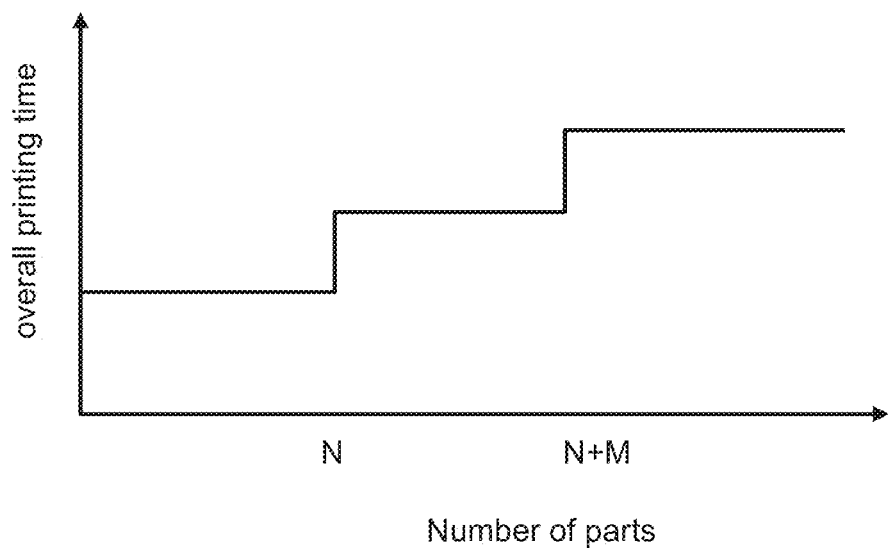

Suppose, for example, that N objects can be printed at similar distances from axis 14 such that heads 16 can form all these objects without moving along the radial direction, e.g., all N objects are printed on the outermost region of tray 12. Suppose further that M additional objects can also be printed at similar distances from axis 14, but the distances of the M objects differ from the distances of the N objects. This scenario is illustrated in FIG. 8A, where the N objects are represented by squares, and the additional M objects are represented by triangles. The expected overall printing time, as a function of the number of objects in this scenario is illustrated in FIG. 8B. For any number of objects that is N or less, the overall printing time is generally the same, since they are printed without moving the head along the radial direction. For any number of objects from N+1 to M, the overall printing time is also generally the same, but is longer than the time required for printing N objects.

In some embodiments, computer 24 or the circuit of controller 20 calculates the expected overall printing time of all the objects, and displays the calculated time on a display device. In various exemplary embodiments of the invention computer 24 or the circuit of controller 20 executes an optimization procedure that calculates the number of objects that can be printed without significantly increasing the overall printing time. The calculated number of objects can be displayed, and system 10 can print the calculated number of objects based on the optimization procedure. In some embodiments of the present invention computer 24 or the circuit of controller 20 calculates the overall printing time per object for several printing scenarios and displays the result of the calculation. The number of objects that are printed can be selected based on the result of the calculation (e.g., by selecting the number for which the overall printing time per object is the shortest). As a representative example, suppose that the expected overall printing time for $N_1$ objects at a certain arrangement is $T_1$, so that the overall printing time per object is $T_1/N_1$. Suppose further that for $N_2 < N_1$ the expected overall printing time is $T_2$. When $T_1/N_1 < T_2/N_2$ system 10 is used for a simultaneous printing of $N_1$ objects and when $T_1/N_1 > T_2/N_2$ system 10 is used for a simultaneous printing of $N_2$ objects.

The optimization procedure that calculates the number of objects to be printed can also receive data pertaining to the overall building material that exists in system (e.g., in supply 42). When the amount of material that is required for printing the objects is larger than the amount of material that exists in supply 42, controller 20 can issue an alert. Alternatively or additionally, controller 20 can generate output regarding a reduced number of objects that can be printed using the material that is available in supply 42, in which case system 10 can be used for printing the reduced number of objects, even if that number is not optimal from the stand point of the exemplified graph shown in FIG. 8B.

It was found by the present Inventors that relocation of the printing head along the radial direction may affect the printing resolution since a relocation of the printing along the radial direction results in a change of the distances between the axis of rotation and each of the nozzles in the nozzle array of the head.

The Inventors of the present invention found more than one solution to this problem.

In some embodiments, controller 20 varies the rotation speed of tray 12 responsively to the radial position of printing head 16. Preferably, when printing head 16 is relocated to be closer to axis 14, controller 20 increases the rotation speed of tray 12, and when printing head 16 is relocated to be farther from axis 14, controller 20 reduces the rotation speed of tray 12. The amount of change in the rotation speed is preferably selected such that when printing head 16 operates at the same dispensing rate, the printing resolution of head 16 before the relocation along the radial direction is the same as the printing resolution of head 16 after the relocation along the radial direction. As a representative example, consider a printing head that initially dispenses building material at a distance $r_1$ from the axis 14, while the rotation speed of tray 12 is $\omega_1$. The printing head is thereafter relocated along the radial direction to dispense building material at a distance $r_2$ from the axis 14, and controller changes the rotation speed of tray 12 to $\omega_2 \neq \omega_1$. In various exemplary embodiments of the invention $\omega_2$ is selected to satisfy the relation $\omega_1/\omega_2 = r_2/r_1$.

In some embodiments, controller 20 varies the dispensing rate of printing head 16 responsively to the radial position of printing head 16. Preferably, when printing head 16 is relocated to be closer to axis 14, controller 20 reduces the dispensing rate, and when printing head 16 is relocated to be farther from axis 14, controller 20 increases the dispensing rate. The amount of change in the dispensing rate is preferably selected such that, the printing resolution of head 16 before the relocation along the radial direction is the same as the printing resolution of head 16 after the relocation along the radial direction.

Figure 4A:
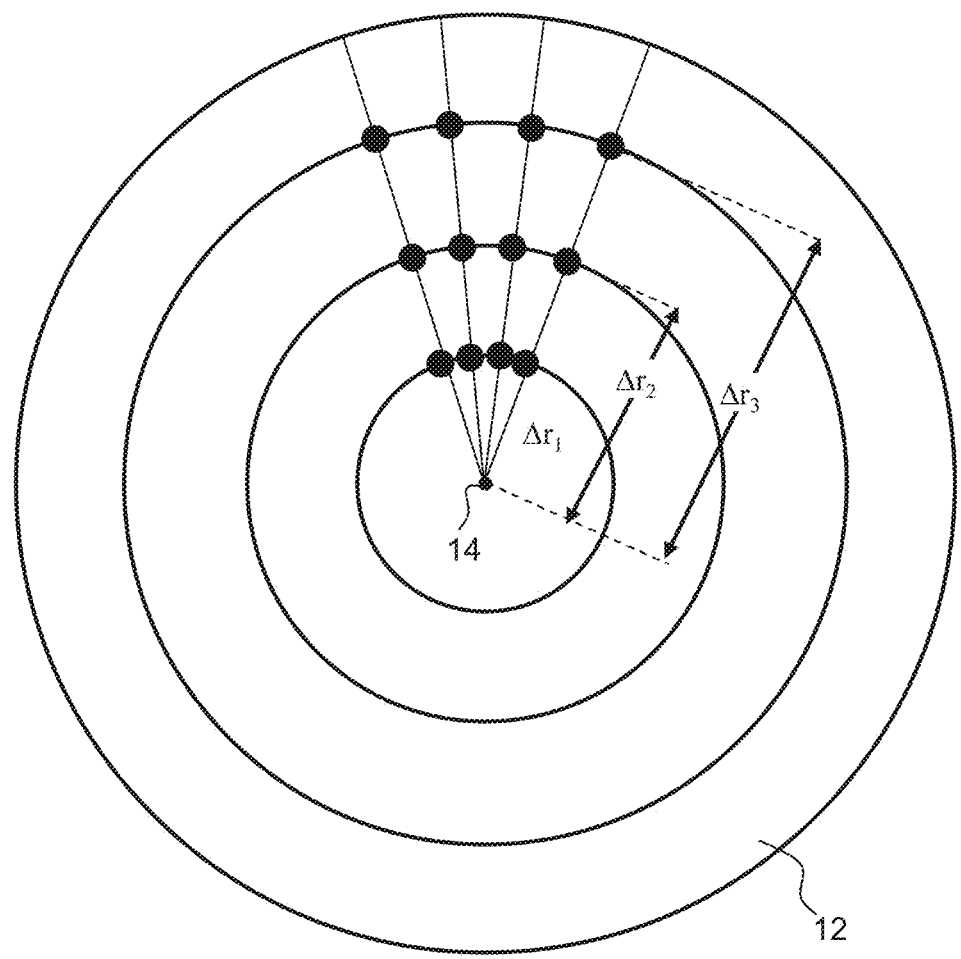
FIGS. 4A and 4B are schematic illustrations describing embodiments of the invention according to which a distance along an azimuthal direction between sequentially dispensed droplets varies as a function of a position of the printing head along a radial direction.
Figure 4B:
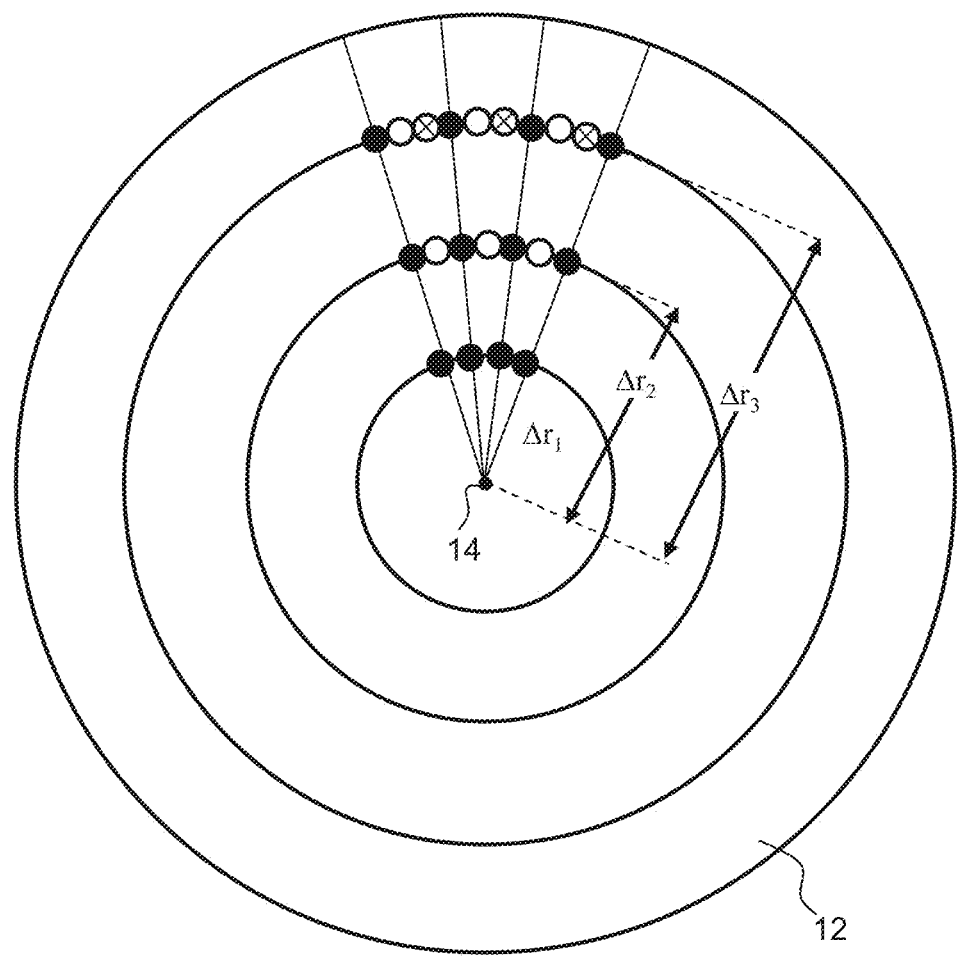

In some embodiments, controller 20 controls one or more of printing heads 16 to dispense droplets such that an azimuthal distance between sequentially dispensed droplets varies as a function of a position of the printing head along radial direction. These embodiments are illustrated in FIGS. 4A and 4B. Shown in FIG. 4A are several droplets (solid circles) dispensed on tray 12 while the printing head (not shown) is at three different distances $\Delta r_1$, $\Delta r_2$ and $\Delta r_3$ from rotation axis 14. Four droplets are illustrated for each distance. At the shortest distance $\Delta r_1$ from axis 14, the droplets are at close distance to each other along the azimuthal direction, at the next-to-shortest distance $\Delta r_2$, the droplets are farther apart from each other along the azimuthal direction, and the longest distance $\Delta r_3$, the droplets are farthest apart from each other along the azimuthal direction. Such a dispensing protocol can be ensured by signaling the printing heads to leave one or more void locations between successive depositions of droplets during the rotation of tray 12.

The above dispensing protocol can be executed in interlaced dispensing. This embodiment is illustrated in FIG. 4B. Shown in FIG. 4B are additional droplets dispensed during additional passes of the tray for the respective locations of the printing heads. The droplets are shown as solid circles, open circles and crossed circles. Some of the droplets are interlaced along the azimuthal direction.

Specifically, FIG. 4B shows additional droplets (open circles) dispensed while the printing head is at distances $\Delta r_2$ and $\Delta r_3$, and further additional droplets (crossed circles) dispensed while the printing head is at distance $\Delta r_3$. When the printing head is at distance $\Delta r_1$ it dispenses all the droplets (solid circles) during a single pass of the tray. When the printing head is at distance $\Delta r_2$ it dispenses first droplets (solid circles) during the first pass of the tray, and second droplets (open circles) during the second pass of the tray. When the printing head is at distance $\Delta r_3$ it dispenses first droplets (solid circles) during the first pass of the tray, second droplets (open circles) during the second pass of the tray, and third droplets (crossed circles) during the third pass of the tray. Thus, in these embodiments the printing head is controlled by controller 20 to execute interlaced dispensing, wherein at least one droplet is dispensed between two previously dispensed droplets and at the same vertical position therewith.

Interlaced dispensing is typically characterized by an interlace level which indicates how many passes are required to fill a contour. In the exemplified embodiment illustrated in FIG. 4B, which is not to be considered as limiting, three contours, each shaped as an arc of a circle, are printed. The contour at distance $\Delta r_1$ is dispensed without interlacing. The contour at distance $\Delta r_2$ is said to be dispensed at a 2-pass interlace level (to indicate that two passes of the tray are required to fill the contour) or, equivalently, 50% interlace level (to indicate that at each pass, 50% of the contour is filled). The contour at distance $\Delta r_3$ is said to be dispensed at a 3-pass interlace level (to indicate that three passes of the tray are required to fill the contour) or, equivalently, 33.33% interlace level (to indicate that at each pass, 33.33% of the contour is filled). Oftentimes, the term "interlaced dispensing" is generalized to encompass also the situation in which the contour is filled during a single pass. With such generalization of the term, the contour at distance $\Delta r_1$ is said to be dispensed at a 1-pass interlace level, or, equivalently, 100% interlace level.

The present embodiments therefore contemplate an interlace level which varies as a function of a position of printing head along the radial direction.

The present embodiments also contemplate interlaced dispensing, wherein the dispensed droplets are interlaced along the radial direction. In these embodiments, the head dispenses droplets such that there is a gap between simultaneously dispensed droplets, wherein the length of the gap along the radial direction (referred to herein as a radial gap) is of at least the diameter of one dispensed droplet, and is preferably an integer multiplication of the diameter of one dispensed droplet. Thereafter, the head is shifted along the radial direction so as in a subsequent pass of the tray, the head dispenses droplets to fill or partially fill the radial gaps. The advantage of interlaced dispensing along the radial direction is that it allows to increase the resolution along the radial direction beyond the resolution dictated by the spacing between the nozzles in the nozzle array of the head.

Figure 7:
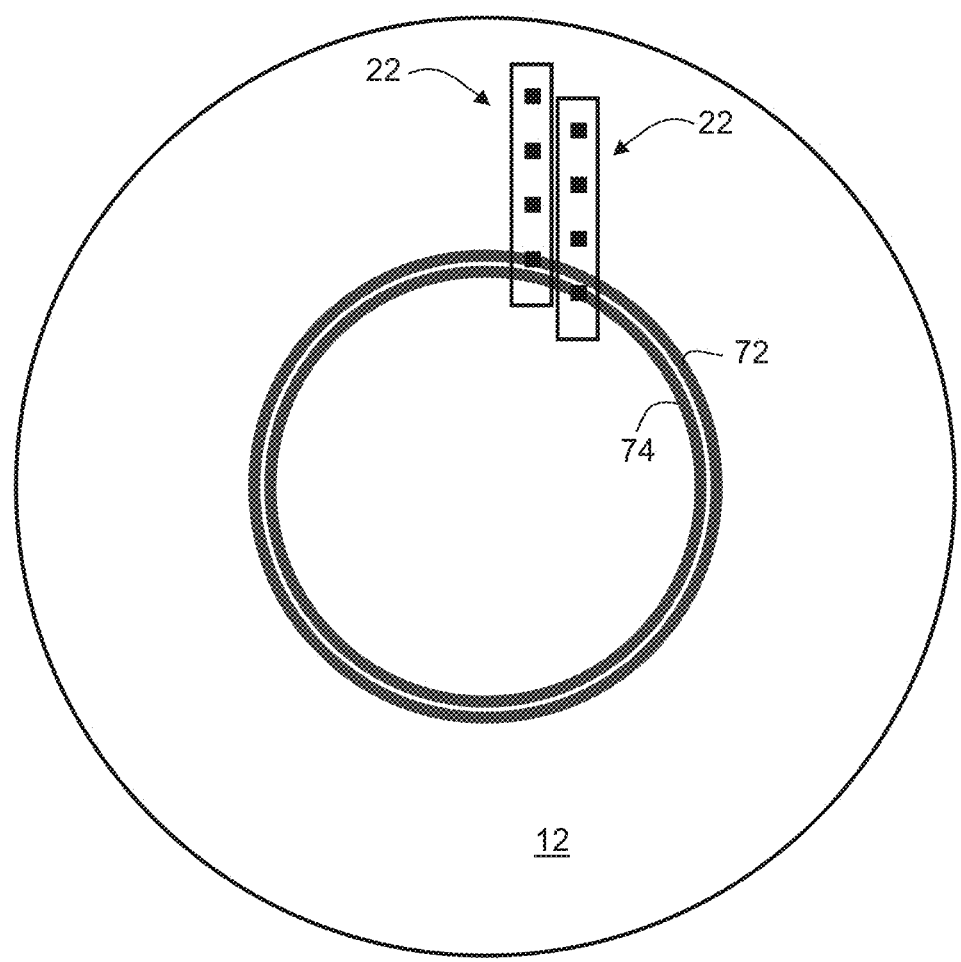
FIG. 7 is a schematic illustration describing interlacing along the radial direction according to some embodiments of the present invention.

When system 10 comprises two or more modeling material printing heads, interlacing along the radial direction can also be achieved by judicious alignment of the printing heads. In these embodiments two or more modeling material printing heads are aligned such that their nozzle arrays are arranged in an interlaced manner. A representative example of these embodiments is illustrated in FIG. 7, which illustrates interlaced dispensing of two circles 72 and 74 on tray 12, using two nozzle arrays, each corresponding to a different inkjet printing head (not shown), wherein the distance between circles 72 and 74 along the radial direction is smaller than the distance between nearest neighbor nozzles in each array.

In some embodiments of the present invention controller 20 ceases the dispensing during the reciprocal motion of the printing heads along the radial direction. After the printing head becomes stationary at a new radial position, controller 20 controls the printing head to resume dispensing. This can be done in more than one way.

In some embodiments, controller 20 resumes the dispensing at the same azimuthal coordinate at which the dispensing was ceased. In these embodiments, the time period during which the dispensing is ceased equals the rotation period of tray 12 or an integer multiplication thereof. Thus, the dispensing protocol is such that after the printing head becomes stationary at a new radial position, controller 20 waits until the same azimuthal location is directly below the printing heads and then resumes the printing.

In some embodiments, controller 20 resumes the dispensing at an azimuthal coordinate which is offset relative to an azimuthal coordinate at which dispensing was ceased. This can be done in more than one way, as will now be explained with reference to FIGS. 5A-F.

Figure 5A:
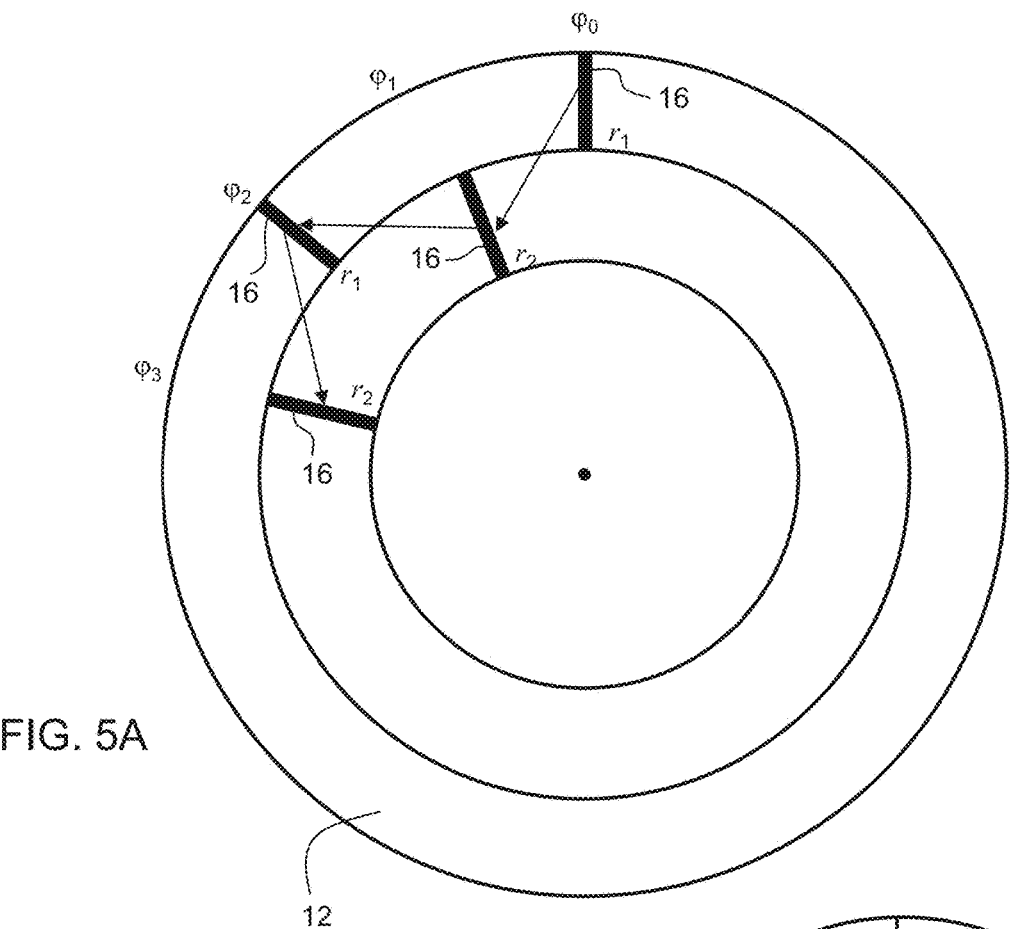
FIGS. 5A-5H are a schematic illustrations describing radial motion of the printing head(s) according to some embodiments of the present invention.

FIG. 5A illustrates a situation in which printing head 16 (shown for simplicity as a black bar) reciprocally moves between a first radial position $r_1$ and a second radial position $r_2$. During the reciprocal motion along the radial direction, tray 12 continues to rotate, so that tray 12 assumes different azimuthal orientations. In the representative illustration, head 16 is at first radial position $r_1$ when tray 12 assumes azimuthal orientation denoted $\varphi_0$ and $\varphi_2$, and at second radial position $r_2$ when tray 12 assumes azimuthal orientations denoted $\varphi_1$ and $\varphi_3$. Each azimuthal orientation corresponds to an azimuthal position of the tray below head 16. According to the present embodiments, when head 16 arrives to $r_2$ in the first time it resumes the dispensing at azimuthal position $\varphi_1$ which is offset relative to $\varphi_0$, when head 16 returns to $r_1$, it resumes the dispensing at azimuthal position $\varphi_2$ which is offset relative to $\varphi_1$, and when head 16 arrives to $r_2$ in the second time, it resumes the dispensing at azimuthal position $\varphi_3$ which is offset relative to $\varphi_2$.

Figure 5B:
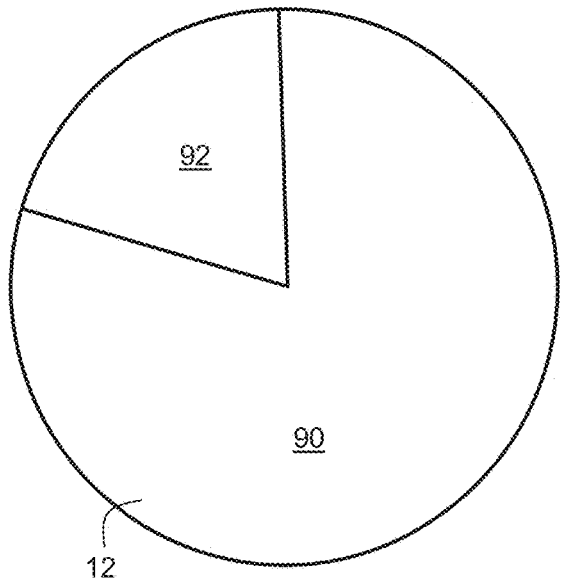

FIG. 5B illustrates a preferred embodiment in which the objects are printed to occupy a predetermined range of azimuthal angles over tray 12. The predetermined range is preferably of at least 5° but less than 350° or less than 340° or less than 330° or less than 320° or less than 310° or less than 300° or less than 290° or less than 280°, e.g., 270°. Shown in FIG. 5B is a first region 90 and a second region 92 on tray 12, where region 90 represents the predetermined range of azimuthal angles at which objects are printed. Each of regions 90 and 92 has a shape of a circular sector. Preferably, the arc length of region 92 is shorter than the arc length of region 90. Thus, one or more objects are printed on region 90 of tray 12 and region 92 remains devoid of printed objects thereon, preferably at all times. Region 90 is referred to as the occupied region and region 92 is referred to as the unoccupied region. Use of an occupied region and an unoccupied region as is useful for timing the motion of heads 16 along the radial direction. In these embodiments, controller 20 signals heads 16 to move of along the radial direction only when they are above the unoccupied region, e.g., region 92.

FIGS. 5C-5F illustrate a dispensing protocol in which heads 16 move radially only when they are above the unoccupied region. In FIGS. 5C-5F, solid arced arrows represent trajectories along which heads 16 are allowed to dispense building material, while there is no relative motion of heads 16 relative to tray 12 along the radial direction. Solid circles mark different swaths of trajectories. The motions of head 16 along the radial position, while tray 12 rotates, are illustrated by dotted arrows. The azimuthal coordinates corresponding to region 92 (and consequently also to region 90) are denoted $\varphi_1$ and $\varphi_2$.

Shown in FIGS. 5C-F are 6 trajectories, denoted 94a through 98b. Each trajectory within the same swath can correspond to a different nozzle of head 16 or to the same nozzle, but shifted along the radial direction to effect interlaced dispensing along the radial direction as further detailed hereinabove. Thus, when interlaced dispensing along the radial direction is employed, the difference between the radial positions of adjacent trajectories within the same swath (trajectories 94a and 94b, trajectories 96a and 96b, and trajectories 98a and 98b, in the present example) can be the diameter of one dispensed droplets, and when interlaced dispensing along the radial direction is not employed, the difference between the radial positions of adjacent trajectories within the same swath can be the distance between adjacent nozzles of the array.

Different swaths of trajectories typically correspond to radial displacements of head 16 by an amount that is integer multiplication of the length of the nozzle array. Thus, the difference between the radial positions of corresponding trajectories at two adjacent swaths (e.g., between trajectories 94a and 96a, trajectories 96a and 98a, trajectories 94b and 96b, trajectories 96b and 98b, in the present example) can be, but is not necessarily, the length of the nozzle array of head 16.

It is to be understood that the number of trajectories has been reduced in FIGS. 5C-F and that it is not intended to limit the scope of the present invention to 6 trajectories. Generally, the number of swaths of trajectories is at most W/L, where W is the width along the radial direction of the working area 26 on tray 12, and L is the length of the nozzle array of head 16. When interlaced dispensing along the radial direction is employed, the total number of trajectories is preferably at most W/D, and the number of trajectories in each swath is preferably about L/D, where D is the characteristic diameter of one dispensed droplets. When interlaced dispensing along the radial direction is not employed, the number of trajectories in each swath preferably equals at most the number of nozzles in the array. Preferably, there are at least two or at least three swaths of trajectories, and at least two or at least three or at least four trajectories in each swath.

Figure 5C:
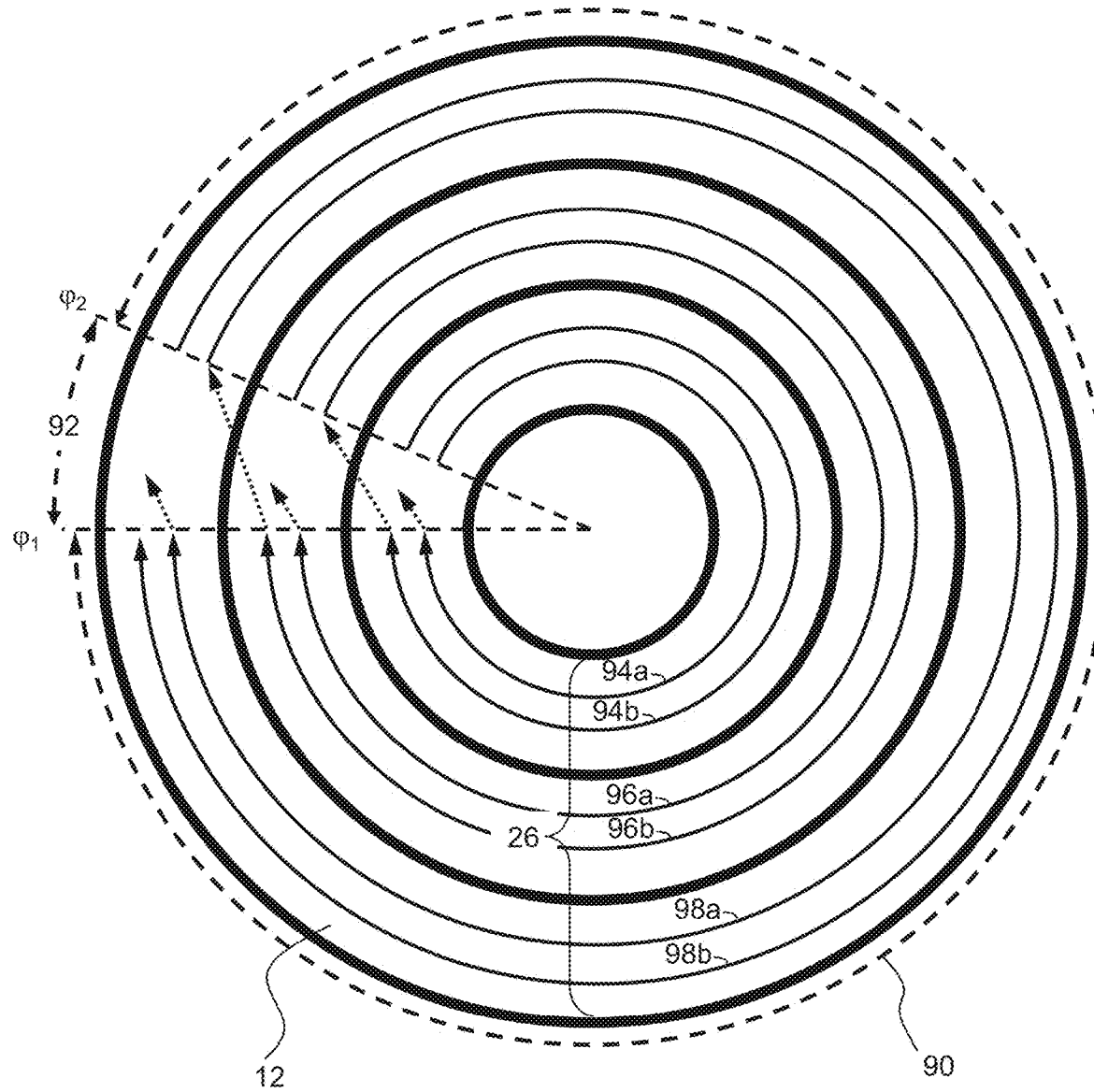
Figure 5D:
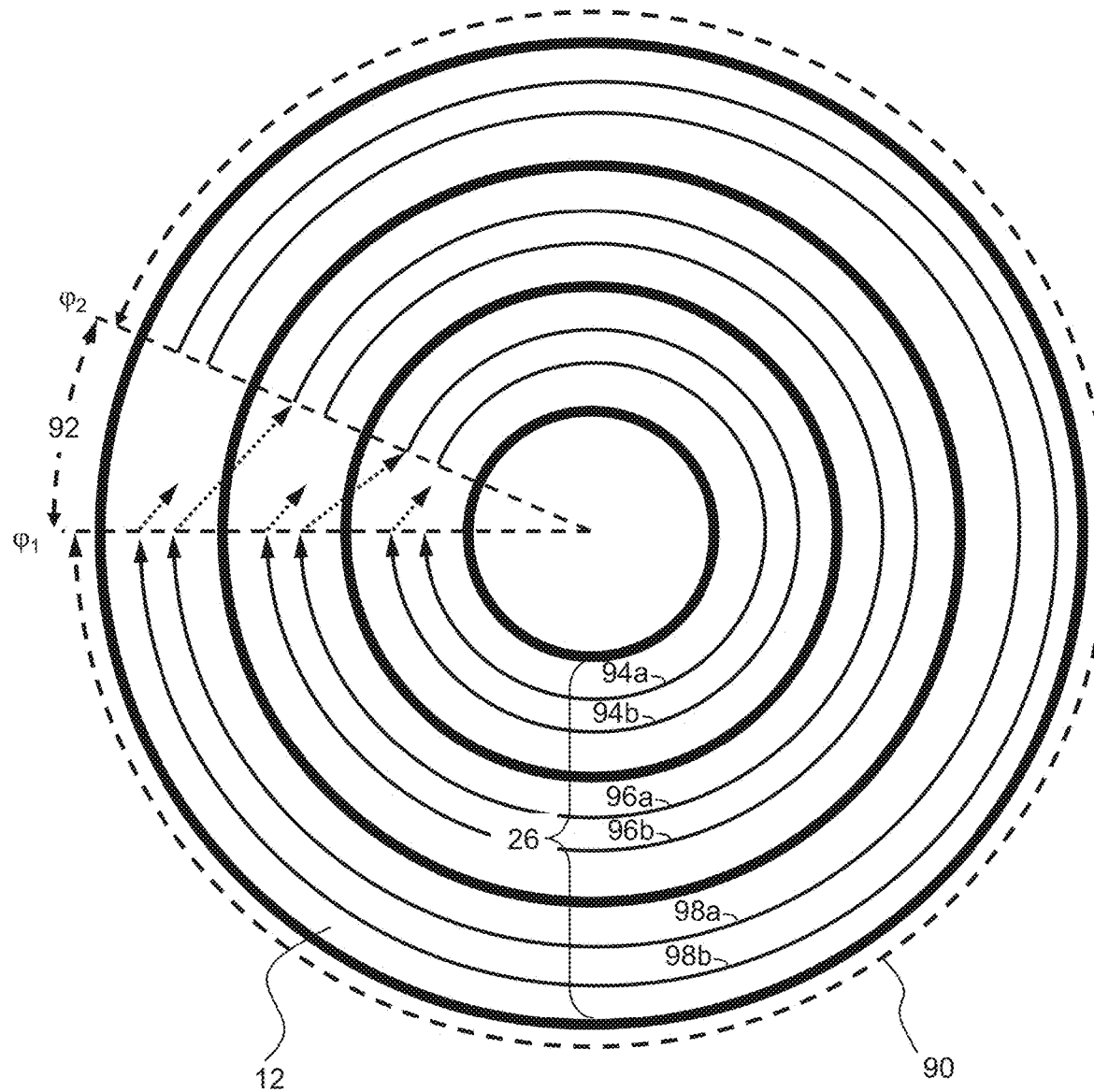

FIGS. 5C and 5D describe a dispensing protocol in which an interlaced dispensing along the radial direction is employed. Referring to FIG. 5C, head 16 dispenses building material at a radial position corresponding to trajectory 94a. When the tray arrives at azimuthal position $\varphi_1$, head 16 is above region 92, and dispensing is temporarily ceased. While head 16 is still above region 92, head 16 moves outwardly to a radial position corresponding to trajectory 94b. Head 16 does not resume the dispensing at least until the tray arrives at azimuthal position $\varphi_2$, namely when head 16 is above region 90. The process continues until the heads visits all or some of the trajectories at swath 94. The radial motion from one swath to the other is also executed during the time period at which head 16 is above region 92, as illustrated, for example, by the dotted arrows representing the radial motion of head 16 from the radial position corresponding to trajectory 94b to the radial position corresponding to trajectory 96a, and the radial motion of head 16 from the radial position corresponding to trajectory 96b to the radial position corresponding to trajectory 98a.

Figure 5E:
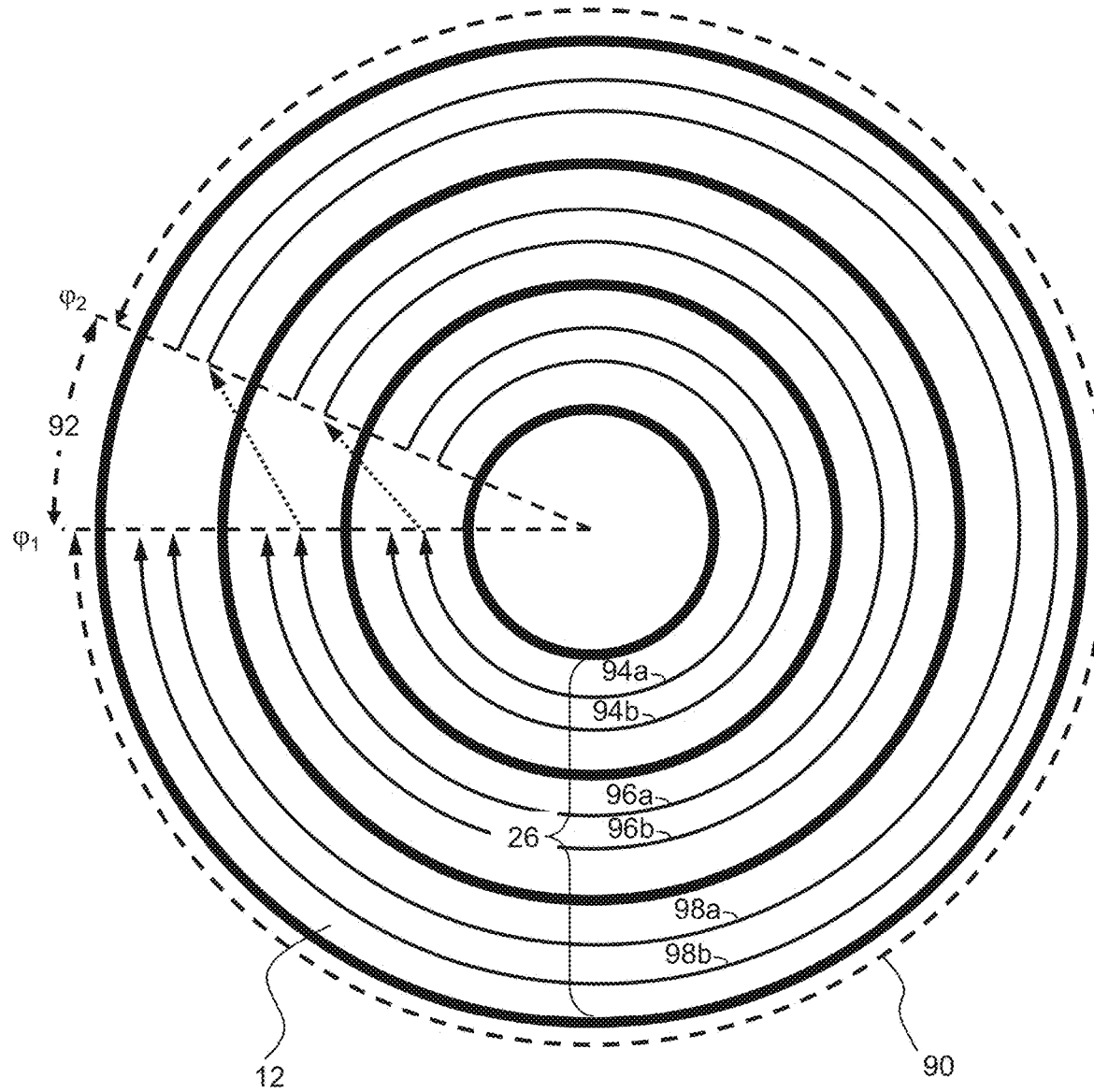
Figure 5F:
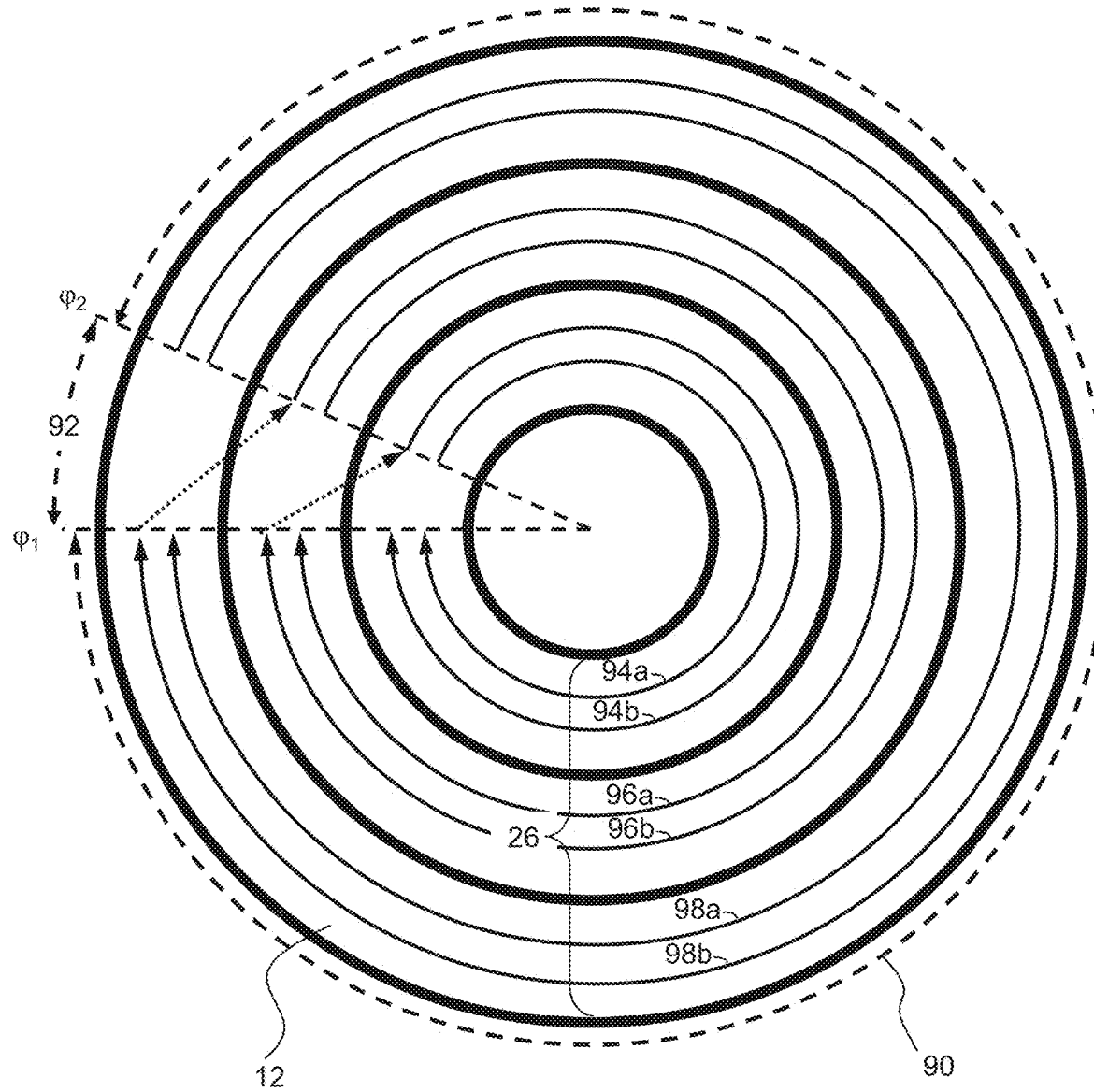

When interlaced dispensing along the radial direction is not employed, the dispensing protocol does not include radial displacements at an amount that equals the difference between the radial positions of adjacent trajectories within the same swath. In these embodiments, the radial displacements at an amount that equals the length of the nozzle array of head 16. These embodiments are illustrated in FIGS. 5E and 5F. Referring to FIG. 5E, head 16 dispenses building material at a radial position corresponding to trajectories 94a and 94b from two different nozzles. When the tray arrives at azimuthal position $\varphi_1$, head 16 is above region 92, and dispensing is temporarily ceased. While head 16 is still above region 92, head 16 moves outwardly to a radial position corresponding to trajectory 96a. Head 16 does not resume the dispensing at least until the tray arrives at azimuthal position $\varphi_2$, namely when head 16 is above region 90. The process continues to swath 96 and swath 98.

FIGS. 5D and 5F describe dispensing protocols which are similar to FIGS. 5C and 5E, respectively, except the head moves inwardly over region 92. Combinations of the protocols described in FIGS. 5C and 5D, or the protocols described in FIGS. 5E and 5F are also contemplated. For example, these protocols can be executed alternately.

Also contemplated, are embodiments in which controller 20 resumes the dispensing at an azimuthal coordinate which is substantially the same (e.g., within less than 1° or less than 0.1° or less than 0.01°) as the azimuthal coordinate at which dispensing was ceased.

Figure 5G:
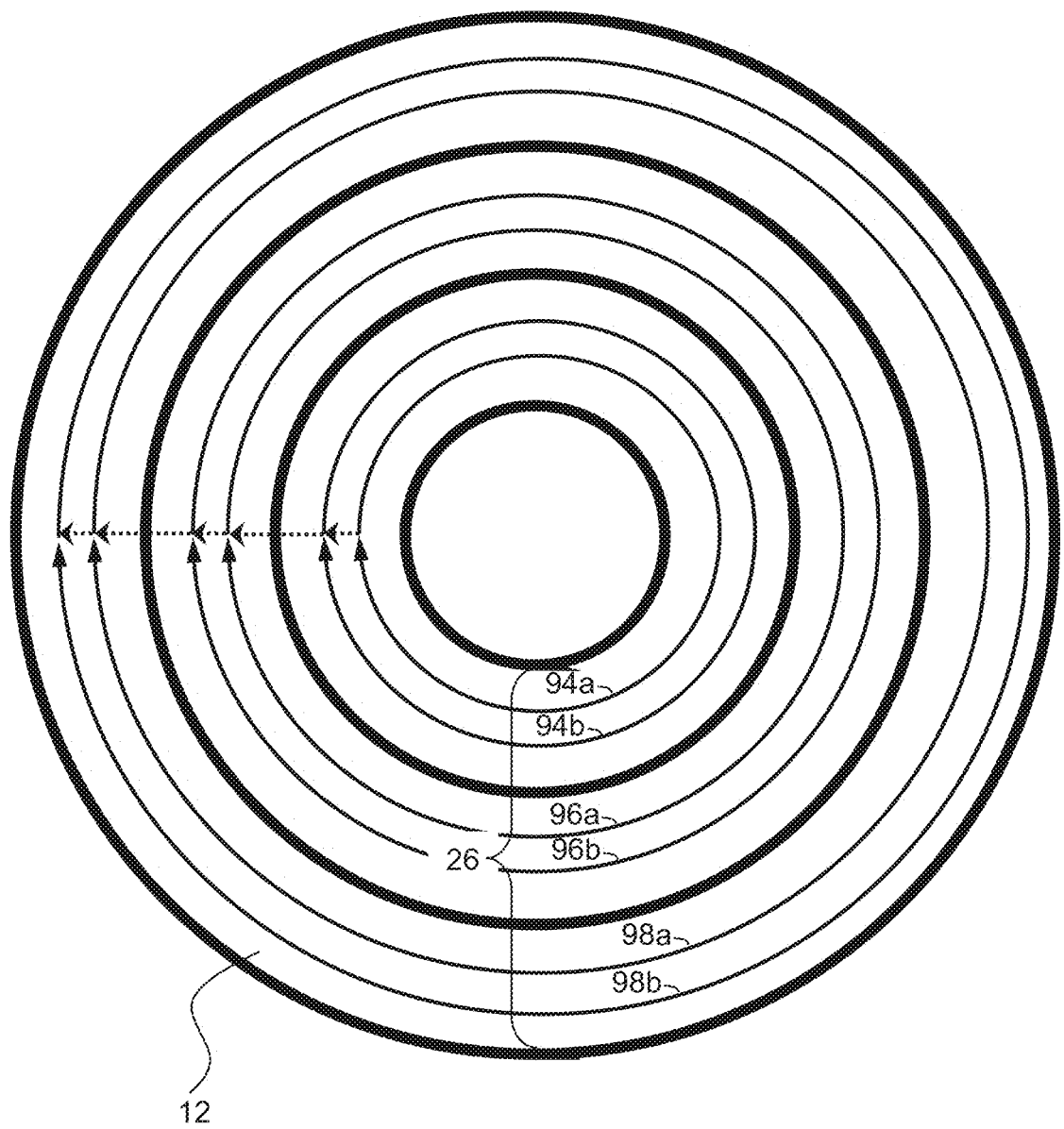
Figure 5H:
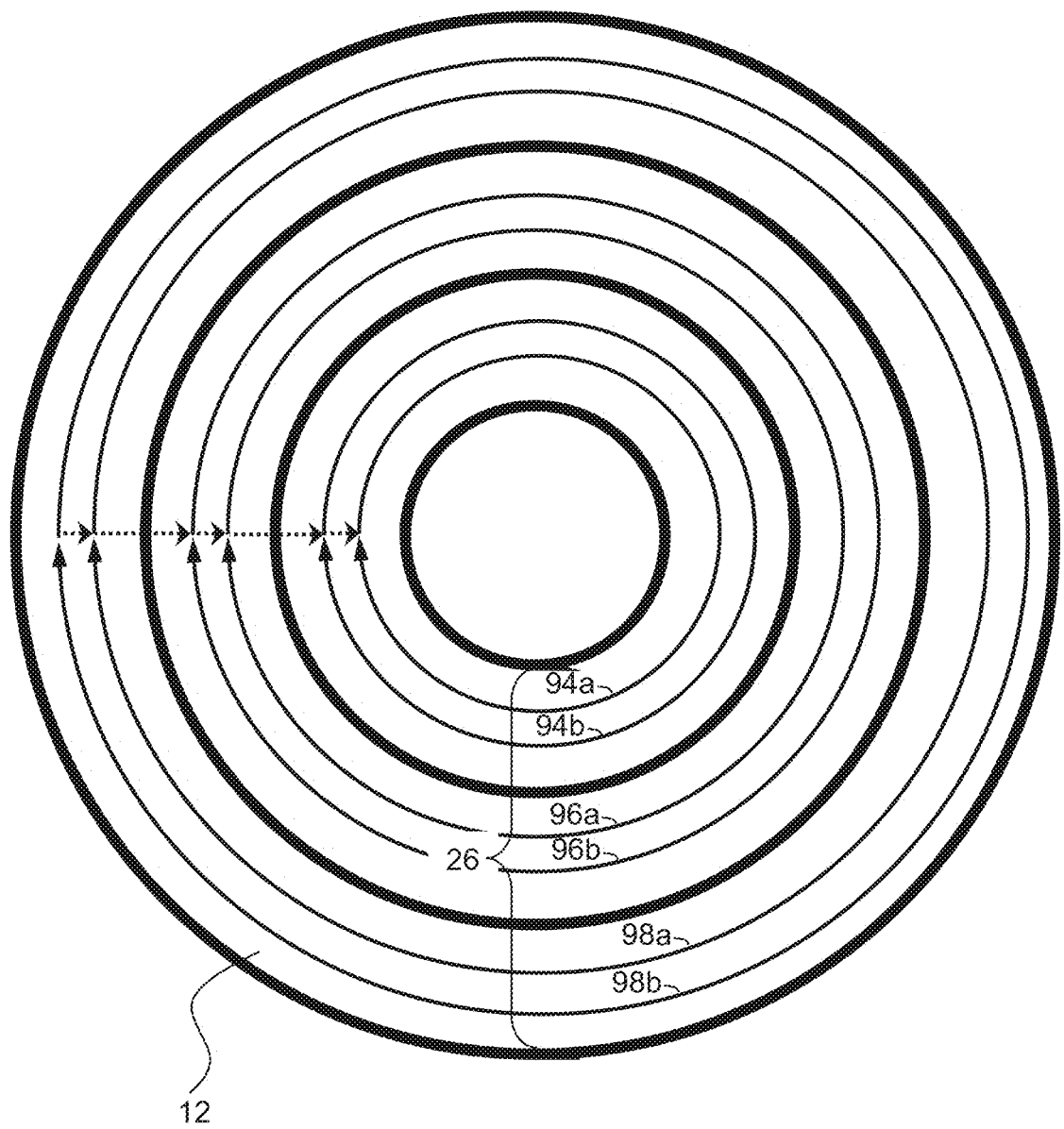

FIGS. 5G and 5H illustrate dispensing protocols in which the dispensing is resumed at the same azimuthal coordinate at which the dispensing was ceased, as further detailed hereinabove. FIG. 5G describes a dispensing protocol in which the head moves outwardly, and FIG. 5H describes a dispensing protocol in which the head moves inwardly. Combinations of the protocols described in FIGS. 5G and 5H are also contemplated. For example, these protocols can be executed alternately. The notations in FIGS. 5G and 5H are the same as in FIGS. 5C-E above.

In the embodiments in which controller 20 resumes the dispensing at an offset azimuthal coordinate, the printing data are adjusted such that the corresponding polar coordinates of different portions of the object that corresponds to different radial positions are also offset. Such arrangement of the data can be done by controller 20 or computer 24.

A dispensing protocol according to the teachings shown in FIG. 5A is preferred over the dispensing protocols according to the teachings shown in FIGS. 5B-H from the stand point of printing throughput. A dispensing protocol according to the teachings shown in FIGS. 5B-5F is preferred over the dispensing protocols according to the teachings shown in FIG. 5A from the standpoint of data manipulation simplicity. A dispensing protocol according to the teachings shown in FIGS. 5G-H is preferred over the dispensing protocols according to the teachings shown in FIGS. 5A-F from the standpoint of data manipulation simplicity.

The present Inventors additionally contemplate embodiments in which controller 20 continues the dispensing of building material also during the reciprocal motion. In these embodiments the printing data are adjusted responsively to the reciprocal motion of the head. Such dispensing protocol allows dispensing droplets along non-circular segments.

As stated, the vertical distance between tray 12 and heads 16 can vary to allow forming a three-dimensional object in a layerwise manner. In some embodiments, controller 20 ceases the dispensing of building material during the vertical motion. These embodiments are preferred from the standpoint of simplicity of the dispensing protocol.

It was found by the Inventors that the timing of the vertical motion has an effect on the quality of the printed object. The present inventors have therefore devised a three-dimensional printing protocol that improves the quality of the printed object. Generally, there are several operations that are executed by system 10 during the fabrication of a layer. These include, for example, the dispensing of building materials by heads 16, the leveling of the newly printed layer by leveling device 32 and the curing of the layer by the radiation sources 18. These operations are typically executed at different azimuthal locations on tray 12 and are therefore sequential for a given object. In some embodiments of the present invention the timing of the vertical motion is synchronized with the timings of these sequential operations. For example, the vertical motion can be initiated after the last operation applied to the newly formed layer (for example, after the curing of the layer by radiation sources 18) and before the subsequent layer is dispensed.

In some embodiments of the present invention, the vertical motion is initiated immediately (e.g., within less than 1 second) when a newly formed layer arrives at leveling device 32. Alternatively, the vertical motion can be initiated such that the vertical motion is completed immediately (e.g., within less than 1 second) when a newly formed layer arrives at leveling device 32. These embodiments are particularly useful in printing scenarios in which it is not desired to reserve an unoccupied region on tray 12 (for example, when the area of the layers of an object to be printed is larger than the area of region 90 of FIG. 5B).

In embodiments in which the objects are printed to occupy a predetermined range of azimuthal angles over tray 12, wherein predetermined occupied and unoccupied regions are defined on tray 12 (see FIG. 5B), the vertical motion is optionally and preferably executed while region 90 is beneath leveling device 32 or beneath heads 16 or beneath radiation source 18, most preferably beneath leveling device 32.

In some embodiments of the present invention, controller 20 continues dispensing the building material also during the motion of heads 16 and/or tray 12 along the vertical direction. The heads continue to dispense building material during the vertical motion. The advantage of these embodiments is that it reduces the overall printing time because there is less time during which the system does not dispense material. In embodiments in which the dispensing continues, the transformation of coordinate preferably includes transforming the coordinates of at least a portion of the computer object data into a helical coordinate system.

The motion along the vertical direction is optionally and preferably executed such that while printing heads 16 dispense the building materials, tray 12 and printing heads 16 experience at least two different vertical distances therebetween during a single rotation of tray. In some embodiments of the present invention the motion along the vertical direction is executed such during a single rotation of tray 12, the vertical distance is increased by an amount that approximately equals a characteristic thickness of a single layer of building material. For example, when the thickness of a single layer is t microns and the angular speed of rotation of tray 12 is $\omega$ radians per second, the vertical distance can be increased at a rate of $t \times \omega/2\pi$ microns per second, which is equivalent to t/360 microns per degree of rotation of tray 12. The motion along the vertical direction can be continuous or intermittent, as desired.

When system 10 comprises two or more printing heads 16 for dispensing modeling materials, these heads can be arranged over tray 12 in accordance with the printing mode. For example, when the same modeling material is dispensed from two or more modeling material heads, these heads can be arranged at different radial position, e.g., radial positions $r_1$, $r_2$ and $r_3$ as illustrated in FIG. 6 for the case of three modeling material printing heads 16a, 16b and 16c, thereby reducing the need to move these heads along the radial direction. The number of modeling material heads can be selected such that when they are deployed at different radial positions, they cover the entire width of working area 26 along the radial direction.

When the two or more different modeling material heads dispense two or more different modeling materials, the radial positions of these heads are controlled independently by controller 20, depending on the locations on tray at which the different modeling materials are to be dispensed.

Figure 10:
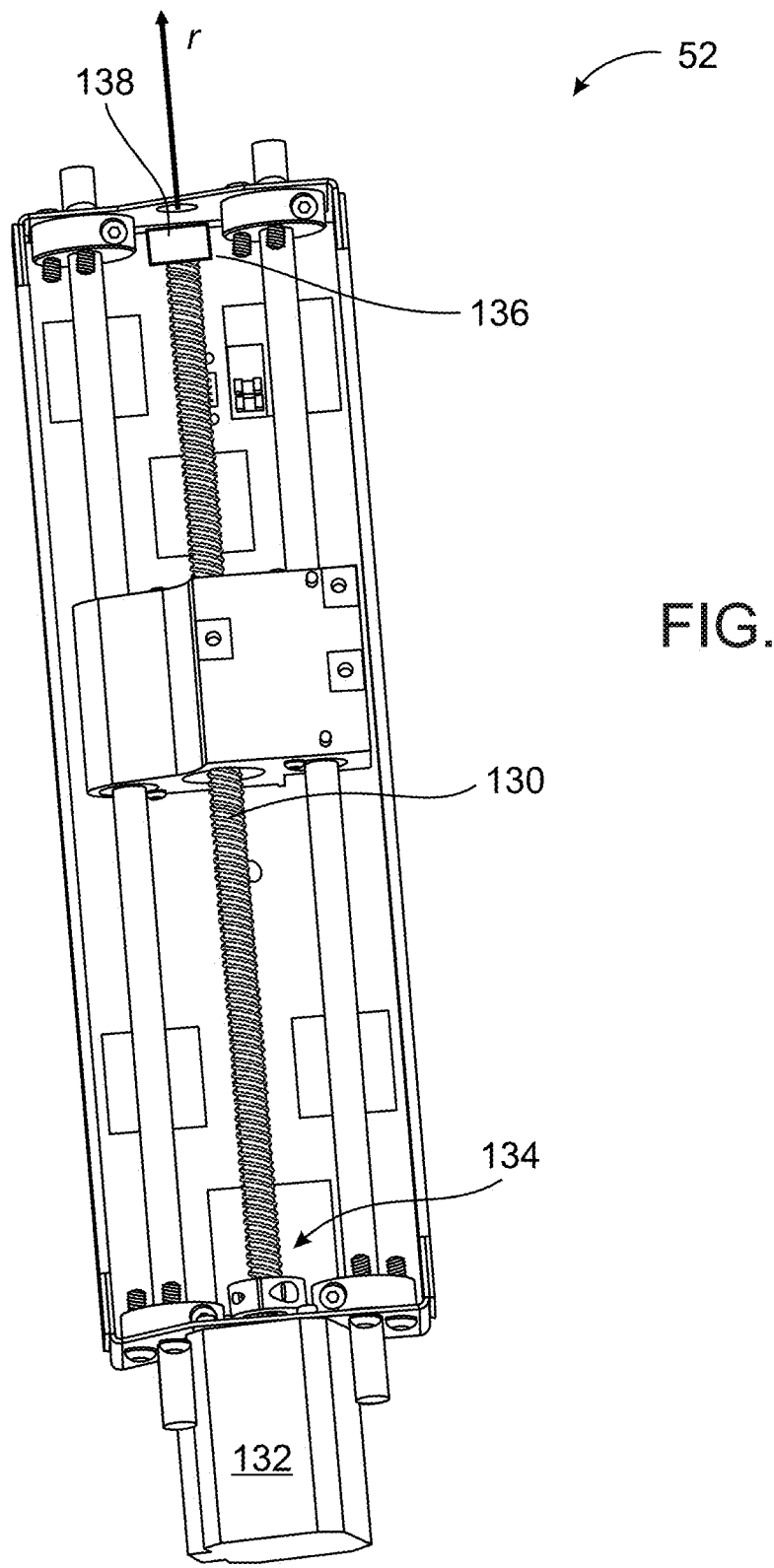
FIG. 10 is a schematic illustration of a stage having a screw useful for establishing reciprocal motion of a printing head, according to some embodiments of the present invention.

As indicated above, in some embodiments heads 16 reciprocally move relative to tray along the radial direction r by means of a stage arranged to establish reciprocal motion of heads 16 along the radial direction. A representative example of stage 52 suitable for the present embodiment is illustrated in FIG. 10. In the present example, the radial motion of heads 16 is effected by a screw 130 which is brought into rotational motion by a motor 132. Motor 132 is optionally and preferably mounted at an end of stage 52 that is closest to axis 14 (not shown, see, e.g., FIG. 1D). One end 134 of screw 130 is connected to motor 132. The other end 136 may be unsupported, in which case screw 130 serves as a cantilever screw, or supported by a screw support structure 138.

It was found by the present Inventors that when head 16 moves along stage 52, particularly by means of a rotating screw, the radial position of head is susceptible to inaccuracies that vary as a function of radial position. The inaccuracies are interchangeably referred to herein as errors.

According to some embodiments of the present invention a compensation function is applied to at least partially compensate for the variation of the inaccuracies as a function of the radial position. Preferably, the compensation function is selected to at least partially compensate for non-oscillatory variations of the inaccuracy. The compensation function can be applied by controller 20, wherein for any displacement of head 16 from one radial position to the other, controller 20 calculates, based on the compensation function, the inaccuracy that is expected at the destination point and re-calculates the radial position of the destination point so as to compensate for the calculated inaccuracy. Controller 20 then moves head 16 to the re-calculated radial position. For example, when head 16 is to move from radial position $r_1$ to radial position $r_2$, controller 20 calculates uses the compensation function to calculate the inaccuracy $\Delta r_2$ that is expected at $r_2$ and moves head 16 to radial position $r_2-\Delta r_2$, wherein $\Delta r_2$ can be positive, zero or negative.

The compensation function typically depends on the mechanical properties of screw 130 and on the rigidity of the connection between screw 130 and stage 52.

Figure 11A:
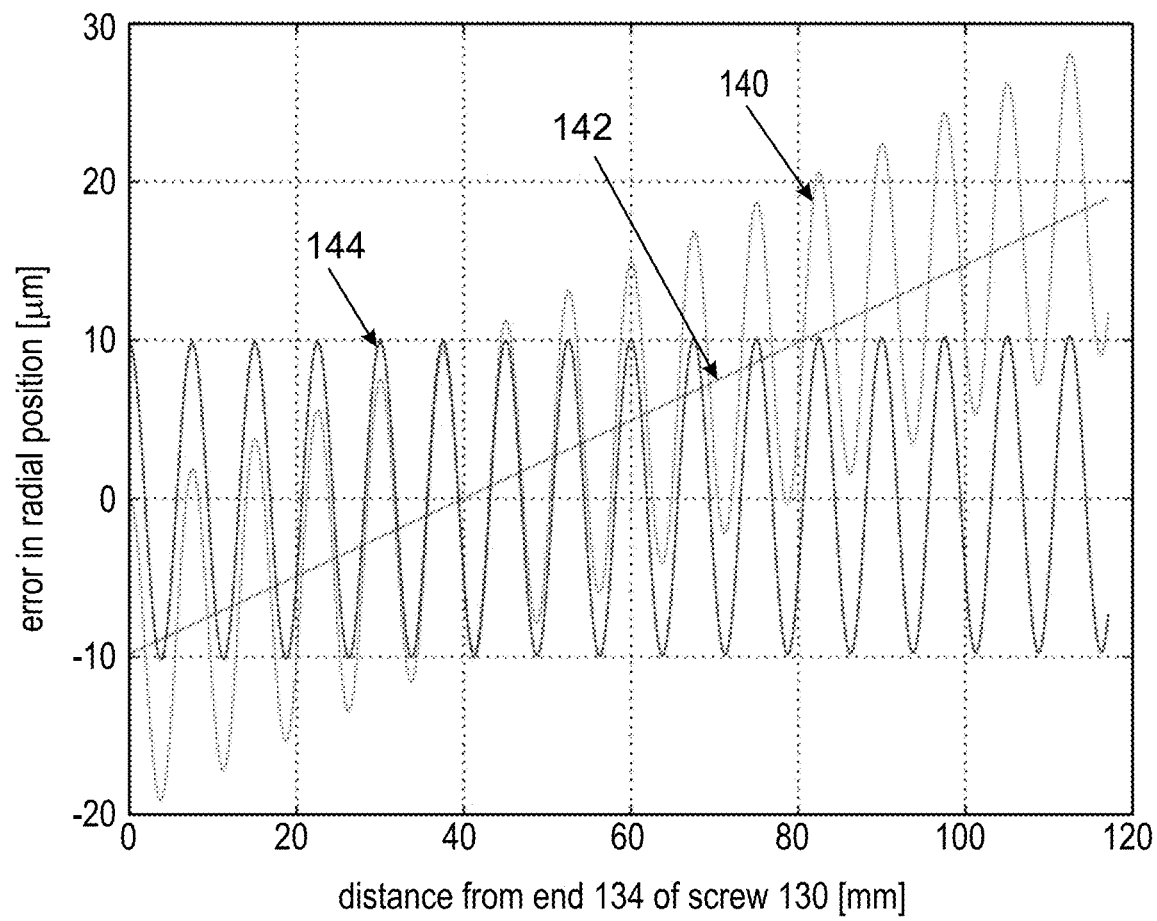
FIGS. 11A-11C show errors in radial position of a printing head as obtained from calculations and experiments performed according to some embodiments of the present invention.

FIG. 11A shows expected inaccuracies as a function of the distance from end 134 when end 136 of screw 130 is supported by support structure. In FIG. 11A, the graph 140 describes the variation of the error in radial position as a function of the distance from end 134. As shown, the error exhibits an oscillatory behavior with an average that increases with the distance from end 134. The change of the average is approximately linear. Thus, in these embodiments, controller 20 employs a generally linear (e.g., with deviation from linearity of less than 20% or less than 10% or less than 5% or less than 1%) compensation function. The slope and intersection of the linear function can be calculated based on the mechanical properties of screw 130, for example, its modulus of elasticity and its second moment of area. Alternatively, the slope and intersection can be calculated by measuring the error as a function of the radial position to experimentally obtain line 140, and fitting the average of the experimentally obtained line to a linear function. A representative example of a compensation function suitable for the present embodiments is shown at 142, and the result of the compensation is shown at 144 (FIG. 11A). As shown, the error is still oscillatory but the average error is substantially zero.

Figure 11B:
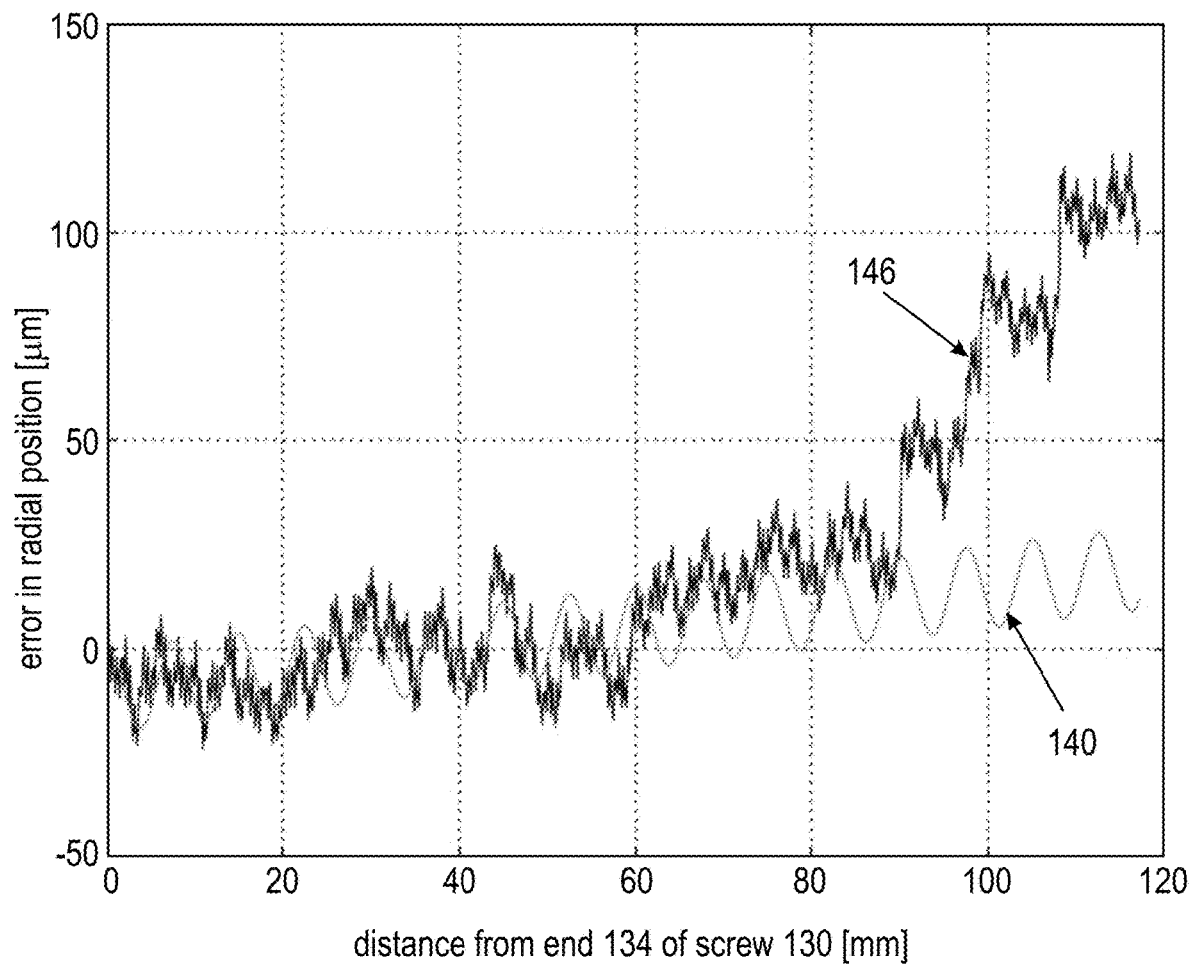

FIG. 11B shows expected inaccuracies 146 as a function of the distance from end 134 when screw 130 is a cantilever screw, namely when end 136 is unsupported. Also shown, for comparison, the expected inaccuracies 140 when end 136 is supported. As shown, the average of inaccuracies 146 increases non-linearly as a function of the distance from end 134, and is significantly higher compared to the average of inaccuracies 140 near end 136. In these embodiments, controller 20 preferably employs a non-linear compensation function. The non-linear compensation function can comprise a polynomial function of degree n, where n>1. The coefficients of the polynomial function can be calculated by measuring the error as a function of the radial position to experimentally obtain line 146, and fitting the average of the experimentally obtained line to a polynomial function of degree n.

Theoretically, when a one-dimensional beam along a direction x, is supported at x=0 and subjected to a concentrated load P at its free end at x=L, the beam exhibits a curved shape that can be approximated as a third degree polynomial given by $y=Px^2(3L-x)/(6EI)$, where E and I are the beam's modulus of elasticity and second moment of area, respectively, and y is measured perpendicularly to x. Thus, the non-linear compensation function preferably comprises a third degree polynomial.

Figure 11C:
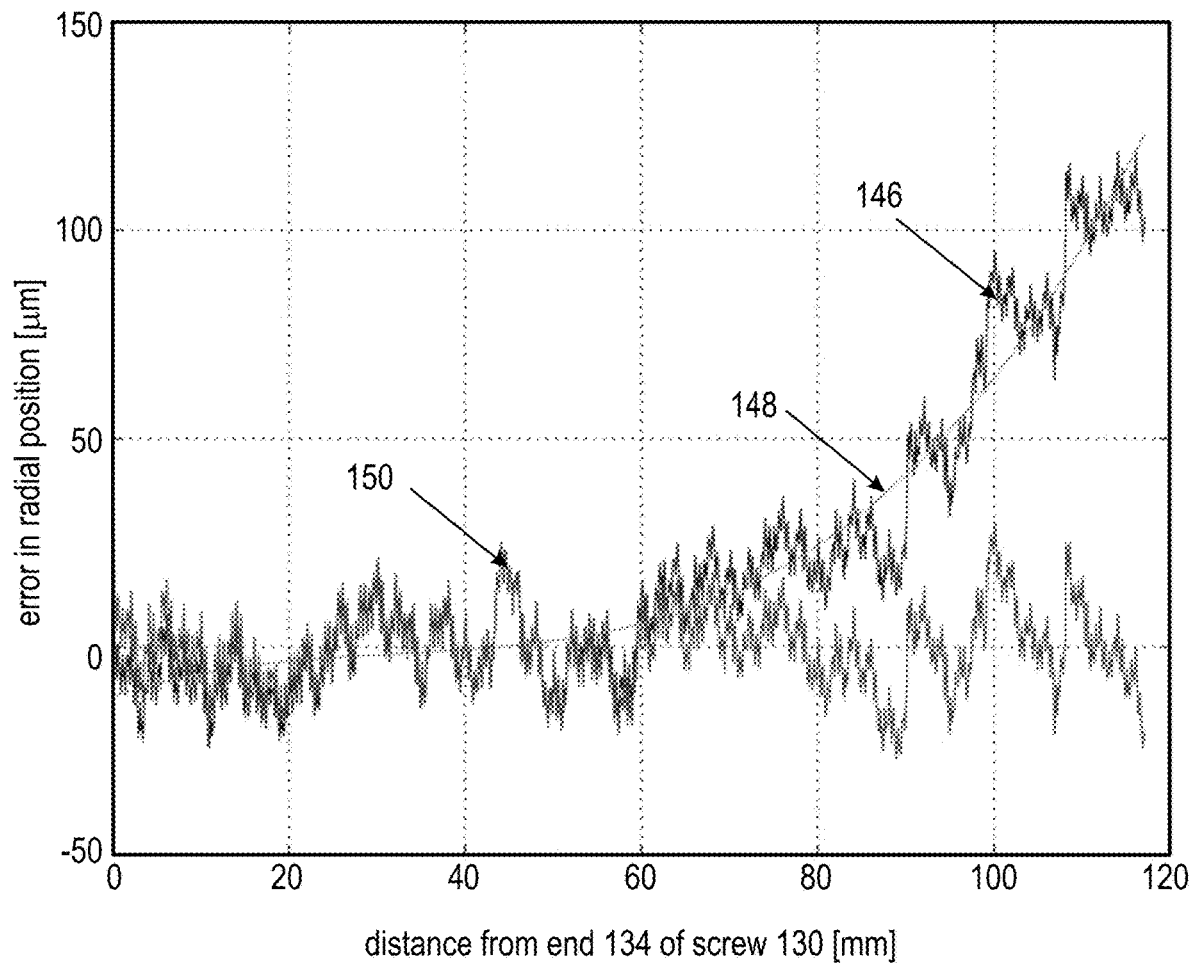

A representative example of a third degree polynomial compensation function suitable for the present embodiments is shown in FIG. 11C at 148. The result of the compensation is shown at 150. As shown, the error is still oscillatory but the average error is close to zero. In experiments performed by the present inventors, the maximal error in the absence of compensation (line 146) was about 119 µm, and the maximal error following compensation (line 150) was about 30 µm.

Typically, building material is supplied to an AM system, such as, but not limited to, system 10, with cartridges that are prefilled. The cartridges are installed in the AM system and connected to a delivery system through which the building material is deposited for printing. The cartridges are replaced once the supply of building material is close to exhaustion. It is desired that the removal and installation of the cartridges can be performed easily and without additional tools.

Typically, the cartridges are disposable but are required to be emptied prior to discarding for safe disposal. It is typically challenging to exhaust the entire content of the cartridges during operation without impeding the manufacturing process. However, full or near full exhaustion of the cartridges is desirable because it maximizes printing capacity for the cartridge and minimizes waste of expensive building material.

According to some embodiments of the present invention, a plurality of cartridges are installed in a cartridge nest at an angle that provides for promoting flow of the contents toward a fluidic connection used for delivering the building material during additive manufacturing, e.g., printing. In some exemplary embodiments, the cartridge is formed with a well, or a recession in a wall of the cartridge at or near the lowest area of the cartridge so that an outlet of the building material is proximal to the lowest area, e.g. lowest with respect to gravity. Optionally, an angle of 2-10 degrees or 2-5 degrees is sufficient to promote flow toward the well. Optionally, the nest houses 4-10, e.g. 6 cartridges and is constructed so that it can be easily pulled out of the printer to allow access for servicing the building material delivery system that is otherwise connected to the cartridges during operation of the AM system, e.g., system 10. According to some embodiments of the present invention, each of the cartridges is installed with a spring lock that holds the cartridge in place after installation and is easily released when the cartridge needs to be replaced.

Figure 16:
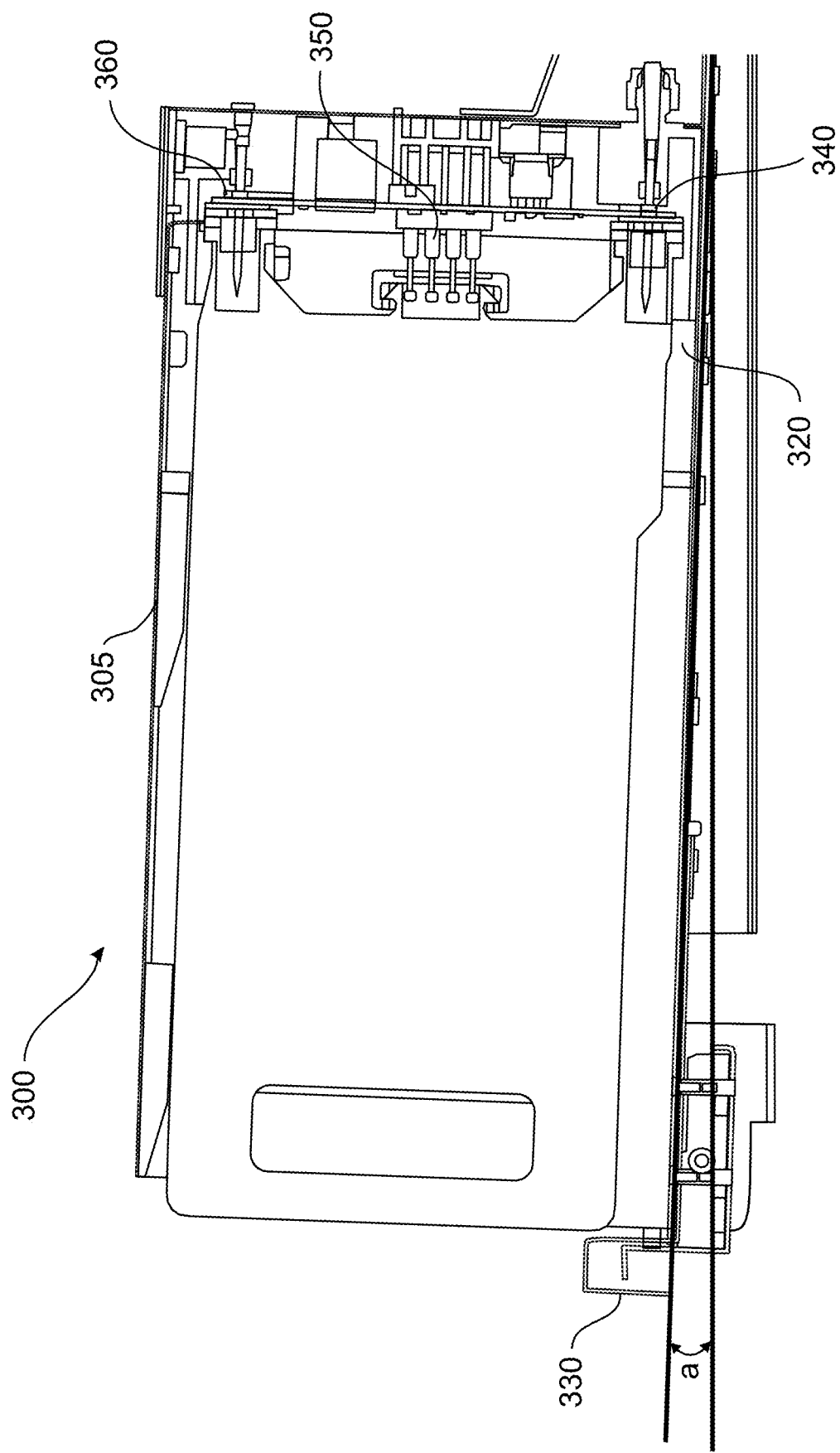
FIG. 16 is an exemplary cartridge in accordance with some embodiments of the present invention.

Reference is now made to FIG. 16 showing an exemplary cartridge in accordance with some embodiments of the present invention. According to some embodiments of the present invention, a cartridge 300 for an AM system, such as, but not limited to, system 10, includes a housing 305 for storing building material, e.g. building material, a fluidic connection 340 for connecting cartridge 300 to a delivery unit of the AM system, one or more sensors 350 for sensing presence of content in cartridge 300 and/or for identifying the contents, and a vent 360 to the atmosphere. According to some embodiments of the present invention, cartridge 300 additionally includes a lock spring with a handle 330 for locking cartridge in the AM system so that a stable connection can be established between the cartridge and a dispensing unit of the AM system. According to some embodiments of the present invention, cartridge 300 is angled with an angle 'a' when installed in the AM system. Angling cartridge 300 promotes flow of the contents toward fluidic connection 340. Optionally, angle 'a' is between 2-10 degrees, e.g. 2 degrees. According to some embodiments of the present invention, housing 305 is formed with a well or recession 320 at the lowest point of the cartridge and an output through fluidic connection 340 is aligned proximal to well 320 so that content can accumulate near the outlet.

Figure 17:
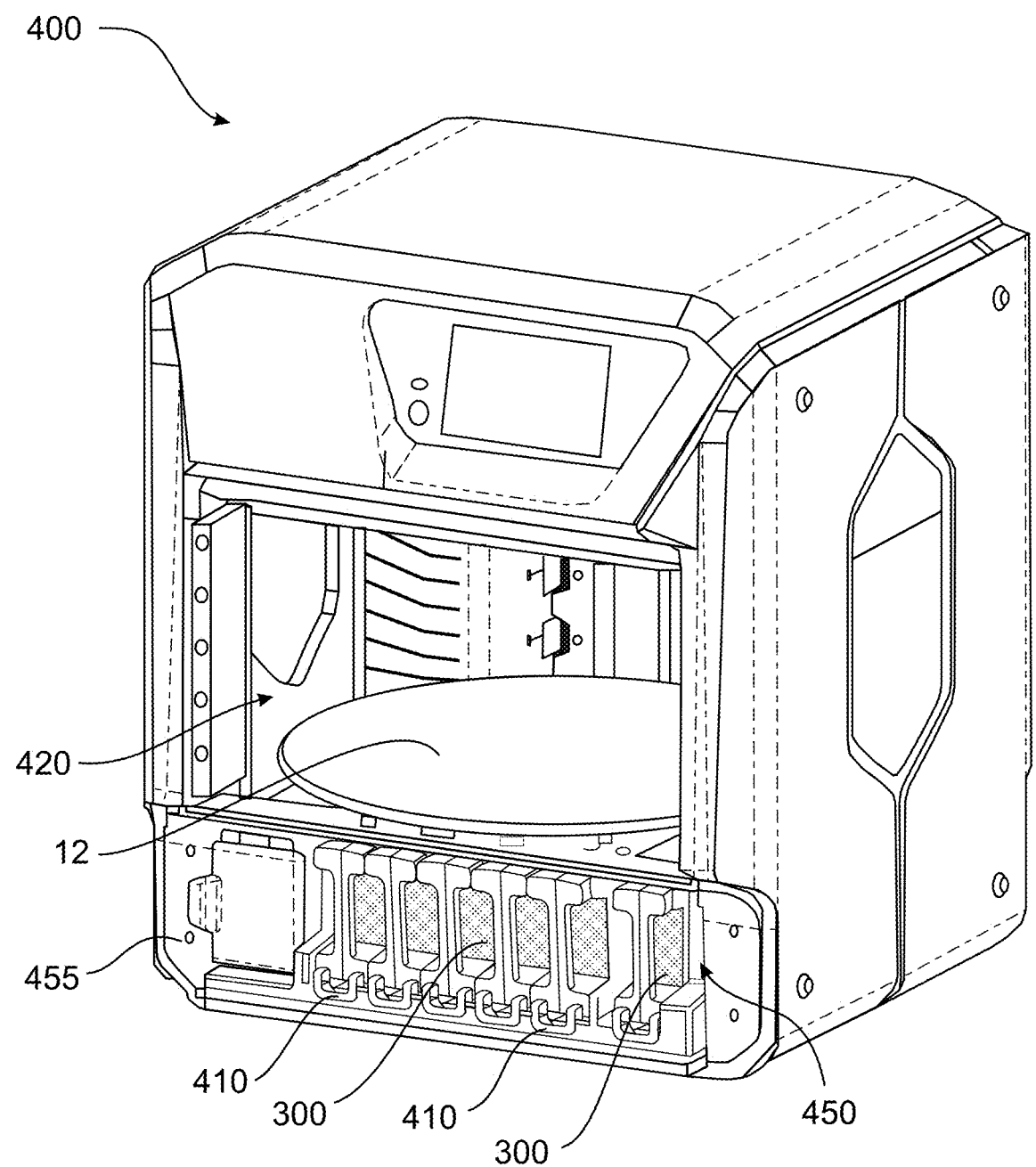
FIG. 17 is an exemplary rotating 3D printing system including cartridges in accordance with some embodiments of the present invention.
Figure 18:
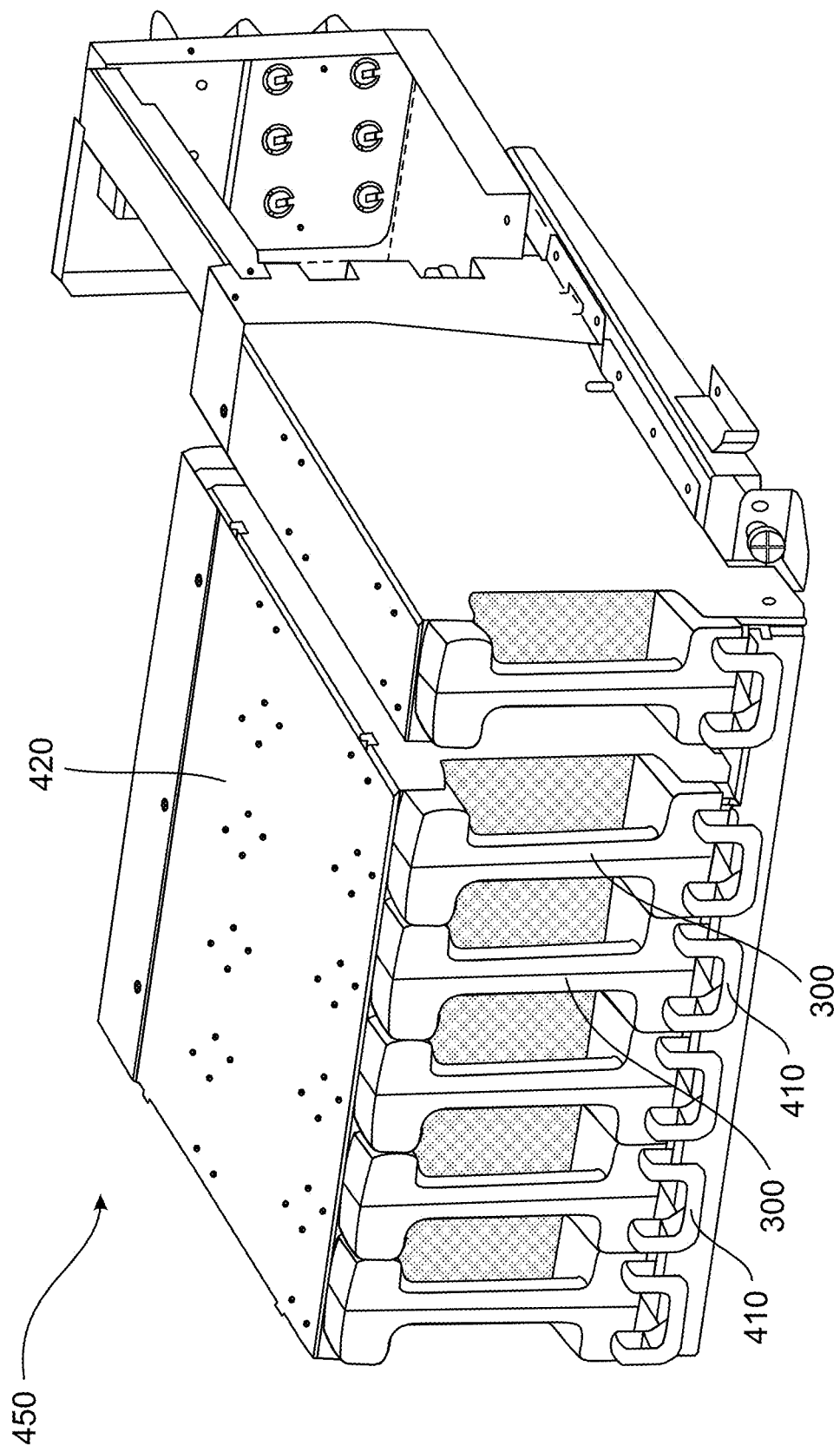
FIG. 18 is an exemplary cartridge nest with cartridges in accordance with some embodiments of the present invention.

Reference is now made to FIG. 17 showing an exemplary rotating 3D printing system with cartridges and to FIG. 18 showing an exemplary cartridge nest in accordance with some embodiments of the present invention. In some exemplary embodiments, cartridges 300 are installed in a rotating AM system 400. The principles and operations of system 400 can be similar to the principles and operations of system 10, with the addition of the cartridge and cartridge nest as desired below. Alternatively, cartridge 300 can be used in other AM systems, e.g. linear AM systems. Typically, rotating AM system 400 includes a printing chamber 420 in which an object is manufactured by dispensing material over building tray 12 in a layer-wise manner and a cartridge chamber 455 for housing one or more cartridges 300.

Typically, cartridges 300 are connected to a dispensing unit for selectively dispensing material over tray 12, while tray 12 rotates. According to some embodiments of the present invention, a plurality of cartridges, e.g. 4-10 cartridges are housed in a cartridge nest 420 and locked into place by a lock spring 410. Referring back to FIG. 16, lock spring 410 is forced down by the cartridge body as it is installed into nest 420. When the cartridge is fully installed, the lock springs up behind the cartridge to lock it in place. This allows one-handed installation of the cartridge into the printer. To release the lock, the lock spring can be pressed down the cartridge pulled out of nest 420. Each of the cartridges can be replaced independently from the others. Locking a cartridge 300 into place establishes fluid connection between the cartridge 300 and the dispensing heads of the AM system (e.g., heads 16).

Following are several printing modes contemplated in any of the above embodiments.

As used herein "azimuthal scan" refers to a printing mode in which the relative motion between head 16 and tray 12 is always parallel to the azimuthal direction. In this scanning mode, the building material is preferably dispensed only during the relative motion along a path that is equidistant from axis 14. Such a path is referred to herein as a circular arc.

A representative example of an azimuthal scan is as follows. While the head is static and the tray rotates. While the tray is rotating, each nozzle visits a plurality of target locations on a previously formed layer or the surface of the tray along a circular arc. The controller decides, for each target location or a group of target locations, whether or not the target location or group of target locations is to be occupied by building material, and which type of building material is to be delivered thereto. The decision is made according to a computer image of the surface. Optionally, the dispensing head then moves in the radial direction without dispensing building material.

As used herein "vector scan" refers to a scanning mode in which the relative motion between head(s) 16 and tray is along a path which is selected dynamically by a controller according to the computer image of the layer. Optionally, the path is other than a circular arc. Optionally, at least part of the path is not parallel to the boundaries of the working surface onto which the dispensing occurs.

Thus, unlike azimuthal scan in which any motion of the head is parallel to the r or φ directions, the motion in vector scan can be along any path, not necessarily parallel to the r or φ directions.

In some embodiments of the present invention the controller selects the scanning mode based on the two-dimensional position data corresponding to the layer being built. In vector scan, the throughput of a given layer is governed by the area size to be covered by supporting or building materials, and therefore non-bulky objects are built faster than bulky ones. In azimuthal scan, on the other hand, throughput is not governed necessarily by the area where material needs to be deposited, but it is governed by the number of scanning passes that the head is required to do in order to deposit those materials. As a matter of example, building a bar with axis parallel to Z axis takes the same time as building a pipe of the same length and diameter, if printed using azimuthal scanning mode; while building the same bar takes much longer than building the same pipe if a vector scanning mode is used.

Thus in some embodiments, azimuthal scanning is employed when the throughput obtained is similar or greater than the throughput obtained alternatively by vector scanning. This depends on system characteristics such as rotation speed, speed of radial motion, layer thickness, etc.

In some embodiments, azimuthal deposition is employed for depositing one or more materials and vector deposition is employed for deposition of one or more different materials, according to the properties or attributes of the materials being deposited and/or of the properties or attributes desired to be manifested in the final object, by usage and/or specific location of the particular materials selected for deposition.

Vector scanning is advantageous for printing conductive "tracks", such as continuous elongated structures, as the vector deposition head may continuously deposit conductive material in its movement parallel to the tray. The vector scan is optionally and preferably along a path selected to form at least one structure in the layer. The structure can be for example, an elongated structure.

The term "elongated structure" refers to a three-dimensional body in which one of its dimensions is at least 2 times, more preferably at least 10 times, more preferably at least 100 times, e.g., at least 500 times larger than any of the other two dimensions. The largest dimension of the elongated solid structure is referred to herein as the longitudinal dimension, and the dimensions are referred to herein as the transverse dimensions.

Figure 15A:
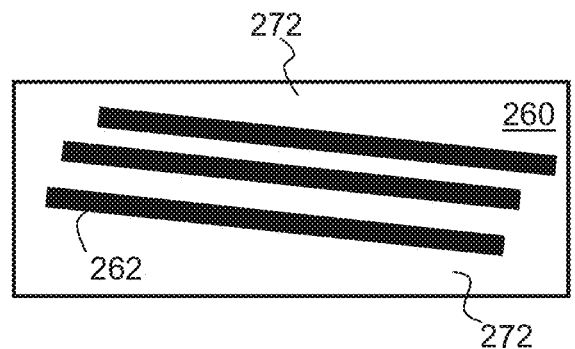
FIGS. 15A-15D are schematic illustrations of structures formed in a layer by vector scans according to some embodiments of the present invention.
Figure 15B:
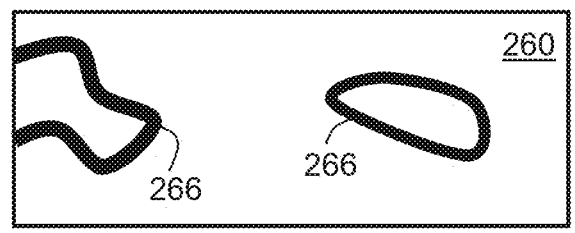
Figure 15C:
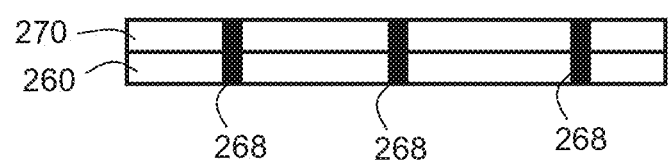
Figure 15D:

A representative example of a plurality of elongated structures 262 formed in a layer 260 by vector scans are illustrated in FIG. 15A. The structure can also be a boundary structure at least partially surrounding an area filled with the first building material. A representative example of a boundary structure 266 formed in layer 260 by a vector scans is illustrated in FIG. 15B. The structure can also be an inter-layer connecting structure. In these embodiments, the structure is preferably small (e.g., less than 1%) relative to the overall size of the layer. A representative example of inter-layer structure 268 connecting two layers 260 and 270 is illustrated in FIG. 15C. The structure can also be embedded within an area formed by the azimuthal scan. For example, referring again to FIG. 15A, the major area 272 of layer 260 can be formed by azimuthal scan wherein structures 262 can be embedded within area 272. The structure can also be peripheral with respect to a layer. This embodiment is illustrated in FIG. 15D showing layer 260 and structure 274 at its periphery.

The combination of azimuthal and vector scans can be in any of the layers forming the object. Specifically, in some embodiments the combination of azimuthal and vector scans is performed for an inner layer within a plurality of layers, in some embodiments the combination of azimuthal and vector scans is performed for a topmost layer, and in some embodiments the combination of azimuthal and vector scans is performed for a bottommost layer. The combination of azimuthal and vector scans can also be performed in a plurality of layers, as desired.

It was found by the present inventor that it is problematic to expose low viscosity solvents to high temperatures due to premature solvent evaporation while the building material is still in the dispensing heads. It was also found by the present inventors that high temperatures may also damage the substrate on which the object is built, for example, when the substrate is a polymer.

The present inventors has therefore realized that it is problematic to dispense at the same temperature both UV curable materials which are too viscous at low temperatures and building materials which include volatile solvents.

The above problem has been inventively solved by a technique in which one building material is dispensed at a high temperature (e.g., above 60° C. or above 65° C. or above 70° C. or above 75° C. or at least 80° C.) and the other building material is dispensed at a low temperature (e.g., below 40° C. or below 35° C. or below 30° C.).

This can be done by individually controlling the temperature of each building material while being loaded to the respective dispensing head. Thus, in various exemplary embodiments of the invention the controller maintains at least two dispensing heads at different temperatures. Optionally and preferably, the controller effects azimuthal scans for the dispensing of building materials at higher temperatures, and vector scans for the dispensing of building materials at lower temperatures.

The present inventors found that some modeling materials, particularly UV polymerizable materials, exhibit undesired deformation such as curling during the fabrication of the object. Such curling tendency was found to be the result of material shrinkage during phase transition from liquid to solid.

The extent of curling is a measurable quantity. A suitable process for measuring the extent of curling can include fabrication of an object of a predetermined shape, e.g., an elongated bar having a rectangular or square cross section, on a flat and horizontal surface, applying a predetermined load on one end of the object, and measuring the elevation of the opposite end above the surface.

In a search made by the inventors of the present invention for a solution to the problem of curling, it was found that the extent of curling is proportional to the extent of volumetric shrinkage that the material undergoes during the polymerization process and the temperature difference between the Heat Distortion Temperature (HDT) of the material and the temperature within the system during fabrication. The present inventors found that the curling is particularly noticeable for materials with relatively high volumetric shrinkage and relatively high HDT (e.g., within the range of the polymerization temperature). The present inventors further found that there is a monotonic relation between the HDT and tendency for curling. Without wishing to be bound to any theory, it is postulated that materials that develop during curing HDT which is close to the temperature within the system during fabrication can undergo stress relaxation or plastic deformation during the AM process, more easily than materials with similar shrinkage but which develop higher HDT.

As used herein, the term "heat distortion temperature" (HDT) refers to a temperature at which the respective material or combination of materials deforms under a predetermined load at some certain temperature. Suitable test procedures for determining the HDT of a material or combination of materials are the ASTM D-648 series, particularly the ASTM D-648-06 and ASTM D-648-07 methods.

For example, in PolyJet™ systems, marketed by Stratasys Ltd., Israel, formulations which upon UV irradiation produce a cross-linked polymer material are used. Objects manufactured with these materials have relatively high rigidity with HDT higher than room temperature, e.g., about 50° C. or higher. Such elevated HDT values was found to provide low dimensional accuracy (high curling effect). Thus, it was discovered that high HDT and low curling are conflicting properties. The present inventors have conducted an experimental research, inter alia, for the purpose of providing a technique for the additive manufacturing of a three-dimensional object which enjoys both high dimensional accuracy (low curling effect) and high HDT immediately after the manufacturing is complete.

It was found by the present inventors, that the existence of curling effect or lack thereof depends on the elapsed time between curing of successive layers. Specifically, it was found that the curling effect of the final object can be reduced or eliminated by setting a sufficiently prolonged time interval between the initiations of curing of successive layers.

In various exemplary embodiments of the invention controller 20 is configured for operating head(s) 16 and radiation source 18 such that for at least one, or at least two, or at least three of the layers forming the object, e.g., most or all the layers, the curing of the respective layer is initiated at least t seconds after commencement of curing of a layer immediately preceding that respective layer. Typically, but not necessarily, the respective layer has a thickness which is about 15 microns. In some embodiments, the respective layer has a thickness of at least 5 microns, e.g., about 5 microns, or about 10 microns, or about 15 microns or about 30 microns. Other thicknesses are not excluded from the scope of the present invention.

In various exemplary embodiments of the invention t is longer than the overall time in which a single layer is formed, including the dispensing and curing times taken in aggregate. For example, when the overall formation time of a given layer is 5 seconds, t is longer than 5. The difference between the overall formation time and t is defined as the "delay". Thus, unlike conventional systems in which each layer is deposited and cured immediately following the curing of the previous layer, controller 20 delays the deposition and/or curing of the layer until the elapsed time from the initiation of the curing of the immediate previous layer is t or more seconds.

Typical values for t include, without limitation, at least 6, or at least 7, or at least 8, or at least 9, or at least 10. In some embodiments of the present invention t is at most 25. In some embodiments of the invention, t is less than 6.

The value of t can also depend on the properties of the respective materials used for manufacturing the object and optionally also on the temperature at which the object is being manufactured.

In some embodiments of the present invention controller 20 receives HDT data which characterizes the building material being used. The HDT data typically corresponds to the HDT that the material acquires once cured. Such data can be provided, for example, by the operator by means of data processor 24. It is to be understood that it is not necessary for the operator to literally enter the HDT data (although this is also contemplated). In some embodiments of the present invention the controller or data processor access a database of HDT values which can be stored in a memory medium (not shown) and select the HDT value based on other types of input made by the operator. For example, such a database can include a plurality of entries each having a building material type and a corresponding HDT value. In these embodiments, the operator can enter the type of building material or select it from a list of options, and the controller or data processor obtains the respective HDT value from the database. Also contemplated are embodiments in which the controller or data processor obtains the respective HDT value from the database based on the type(s) of building materials loaded into supply system 42.

Once the controller receives the HDT data it optionally selects the value of t responsively to the HDT. This can be done in more than one way. In some embodiments, a lookup table is used. Such a lookup table can be stored in a memory medium accessible by the controller. The lookup table can include a plurality of entries each having an HDT value and a corresponding t value. The controller can search the table for an entry that best matches the received HDT value and select the respective t value or approximate the t value based on the best matched entry or entries. In some embodiments, the controller can employ a preprogrammed function t(HDT) for determining the value of t for a given value of HDT. Such function is preferably a monotonically increasing function (e.g., a linear function having a positive slope) of HDT. Preferably, the returned value of the function for HDT=50° C. is at least 6.

It is to be understood that it is not necessary for controller 20 to select the value of t based the value of HDT. In some embodiments of the present invention controller 20 selects the value of t directly from the type of building material being used for manufacturing the object. This is typically performed by a lookup table which in some embodiments of the present invention is stored in a memory medium accessible by controller 20. Such a lookup table can include a plurality of entries each having a building material type or a building material family type and a corresponding t value. Controller 20 can search the table for an entry that best matches the type of building material or the family type of the building material, and select the respective t value.

Also contemplated are embodiments in which the value of t is also based on the operational temperature of the manufacturing process, preferably, but not necessarily, on the difference between the HDT value and the operational temperature.

The value of t can optionally and preferably be based, at least in part on the energy dose delivered to the most recently formed layer. The energy dose per unit volume depends, in principle, on the intensity of the radiation emitted by radiation source 18, and on the rate at which the material is dispensed. The dispensing rate, in turn, depends on the relative rotation speed tray 12 and on the flow of building material out of the nozzles of head 16. For example, for a given modeling material, a given flow of building material out of the nozzles and a given radiation intensity, the rotation speed results in a lower polymerization extent per layer in the formation process, with the layers continuing to polymerize during the curing of subsequent layers above them. It was found by the present inventors that such polymerization of previously formed layers increases the curling effect.

Thus, in various exemplary embodiments of the invention the value of t is calculated based on one or more of the following parameters: (i) layer thickness, (ii) dispensing rate, (iii) radiation intensity, (iv) polymerization rate per unit energy dose, and (v) the HDT of the material being cured. In some embodiments, the value of t is calculated based on at least two of the above parameters, in some embodiments of the present invention the value of t is calculated based on at least three of the above parameters, and in some embodiments of the present invention the value of t is calculated based on all the above parameters.

The method and system of the present embodiments can utilize many types of building materials. Representative examples include, without limitation, building materials for which the post curing HDT at a pressure of about 0.45 MPa, as measured by one or more of the ASTM D-648 series of procedures, particularly the ASTM D-648-06 and ASTM D-648-07 methods, and optionally both the ASTM D-648-06 and ASTM D-648-07 methods, is higher than the temperature of layers while being formed, preferably HDT about 50° C. or higher.

Suitable building materials can include compositions which comprise acrylic or methacrylic functionalities, which are UV polymerizable by radical mechanism, e.g., the addition reaction of acrylic functional groups. Further examples include, without limitation, UV polymerizable compositions that comprise at least 30% by weight of a mono acrylic or mono methacrylic functional monomer, wherein the respective polymer of the monomer has a Glass Transition Temperature (Tg) higher than about 50° C. In some embodiment, Tg is higher than 60° C. or higher than 70° C.

Herein, "Tg" refers to glass transition temperature defined as the location of the local maximum of the E" curve, where E" is the loss modulus of the material as a function of the temperature.

Some representative types of materials suitable for the present embodiments include Objet® VeroBlue RGD840, Objet® VeroGrey RGD850, Objet® VeroBlack RGD870 and Objet® RGD525 which are commercially available modeling materials of Stratasys Ltd.

As used herein the term "about" refers to ±10% and the symbol "≈" denotes equality with a tolerance of at most 10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Figure 13:
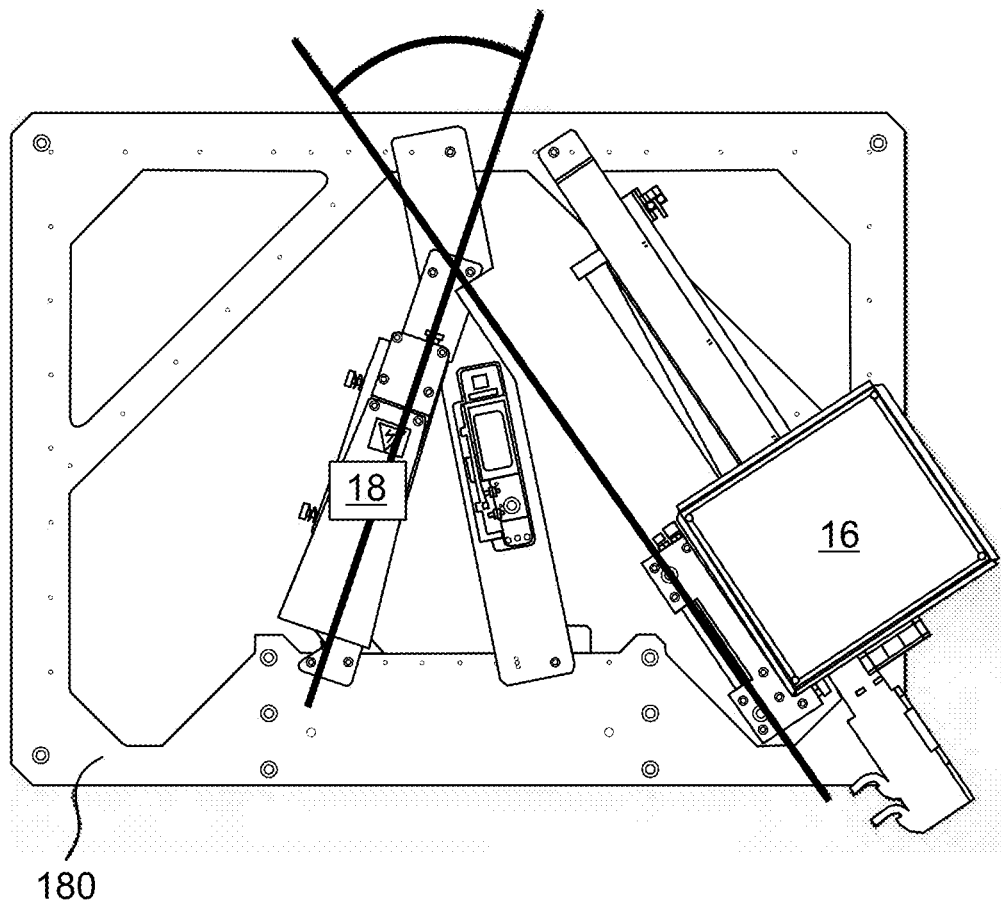
FIG. 13 shows an experimental set up used in experiments performed according to some embodiments of the present invention.

Experiments were conducted to determine a preferred geometrical arrangement of the radiation source and the printing head(s). The experimental set up is illustrated in FIG. 13, showing head 16 and radiation source 18 mounted on a frame 180. The radiation source was a UV lamp.

A printing process was executed at a diameter of 352.8 mm, which allowed for an angular speed of about 100 deg/s. The angular separation between the radiation source and the head was about 52°, and the corresponding time interval from material dispensing to curing was about 0.52 seconds.

Figure 14A:
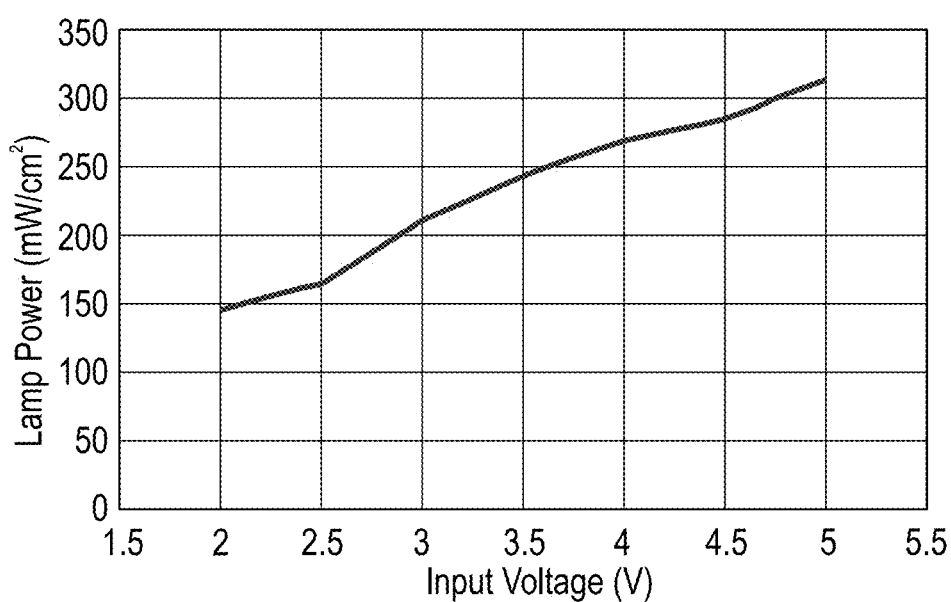

Baseline testing was done at different power levels. A UV Radiometer was used to measure the power output of the lamp at different voltage inputs to the ballast. The lamp power as a function of the applied voltage is shown in FIG. 14A, and images of the resulting printed pattern for input voltages of 2.2 V, 3.2 V and 4.5 V are shown in FIGS. 14B, 14C and 14D, respectively. The radiometer confirmed power output increase. The effect of the power on the fill level of the printed pattern was not significant.

Another printing process was executed at a diameter of 497.8 mm, which allowed for an angular speed of about 80 deg/s. The angular separation between the radiation source and the head was about 180°, and the corresponding time interval from material dispensing to curing was about 2.25 seconds. The fill level of the obtained printed pattern was significantly higher compared to the baselines shown in FIGS. 14B-D. The surface finish of the model was affected significantly. The edges and corners were not sharp and produced a waving finish. The dimensional accuracy was also reduced with approximately a 2% error nominal dimension. Images of the resulting printed pattern for these experiments are shown in FIGS. 14E and 14F.

To confirm that the print quality was not affected by moving to the larger diameter, the lamp was moved to alternate locations around the tray. FIGS. 14G and 14H show images of the resulting printed pattern for angular separation between the radiation source and the head of about 80° and about 60°. As shown, as the lamp was moved closer to the print head, the fill level decreased.

In another printing process, the dot gain was increased. The surface finish was and dimensional accuracy were improved. The dimensional error was reduced to less than 0.5% of the nominal dimension. A representative image of the resulting printed pattern for angular separation of 80° is shown in FIG. 14I. This print quality was consistent with the smaller diameter printing done for the baseline.

To confirm that fill level was less affected by the lamp power, additional experiments were performed at different power levels at larger print diameters. No significant variations of the fill level and dimensional accuracy were observed (data not shown).

Table 1 summarizes the parameters and results of the experiments.

TABLE 1

| Print Diameter (mm) | 352.8 | 352.8 | 352.8 | 497.8 | 497.8 | 497.8 | 497.8 |
|---|---|---|---|---|---|---|---|
| Angular Separation (deg) | 52 | 52 | 52 | 180 | 80 | 60 | 60 |
| Lamp Power (Volts) | 2.2 | 3.2 | 4.5 | 4.5 | 4.5 | 4.5 | 2.5 |
| Print Resolution (DPI at Print Diameter) | 1833 | 1833 | 1833 | 1797 | 1797 | 1797 | 1797 |
| Tray Speed (deg/s) | 100 | 100 | 100 | 80 | 80 | 80 | 80 |
| Time to Cure (s) | 0.52 | 0.52 | 0.52 | 2.25 | 1.00 | 0.75 | 0.75 |
| Representative FIGS. showing results | 14B | 14C | 14D | 14E-F | 14G | 14H | — |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for three-dimensional printing, comprising:
a rotary tray configured to rotate about a vertical axis;
a printing head, having a plurality of separated nozzles and being configured to reciprocally move relative to said tray along a radial direction; and
a controller configured for:
obtaining a radial position of the printing head, controlling said printing head to dispense, during said rotation, droplets of building material in layers, to print a three-dimensional object on said tray, and to vary a rotation speed of said tray responsively to the radial position of said printing head.

2. The system according to claim 1, further comprising a radiation source configured to irradiate said layers such that energy at different rates is delivered to locations that are at difference distances from a center of said tray.

3. The system according to claim 2, wherein said radiation source is configured to reciprocally move relative to said tray along a radial direction, non-simultaneously with said printing head.

4. The system according to claim 1, wherein different nozzles are at different distances from said axis and dispense said building material at different dispensing rates.

5. The system according to claim 1, comprising at least two printing heads, wherein for each printing head, said reciprocal motion along said radial direction is independent and at a different azimuthal angle.

6. The system according to claim 1, wherein said controller is configured to control said printing head to dispense said droplets such that an azimuthal distance between sequentially dispensed droplets varies as a function of a position of said printing head along said radial direction.

7. The system according to claim 1, wherein said controller is configured to access a computer readable medium storing a bitmap mask, and to obtain printing data pertaining to a shape of the object only for locations on said tray that are not masked by said bitmap mask.

8. The system of claim 1, wherein said controller is configured to increase said rotation speed when said printing head is relocated to be closer to said vertical axis, and reduce said rotation speed when said printing head is relocated to be farther from said vertical axis.

9. A system for three-dimensional printing, comprising:
a rotary tray configured to rotate about a vertical axis;
an inkjet printing head, having a plurality of separated nozzles;
a controller configured for controlling said inkjet printing head to dispense, during said rotation, droplets of building material in layers, to print a three-dimensional object on said tray; and
a radiation source configured to irradiate said layers, wherein the controller is configured to control the radiation source such that energy at different rates is delivered to locations that are at difference distances from a center of said tray wherein a rate at which energy is delivered decreases with the distance from said axis.

10. The system according to claim 9, wherein different nozzles are at different distances from said axis and dispense said building material at different dispensing rates.

11. The system according to claim 9, comprising at least two inkjet printing heads, wherein for each printing head, said reciprocal motion along said radial direction is independent and at a different azimuthal angle.

12. The system according to claim 11, wherein said controller is configured to control at least one of said inkjet printing heads to dispense said droplets such that an azimuthal distance between sequentially dispensed droplets varies as a function of a position of said inkjet printing head along said radial direction.

13. The system of claim 12, wherein said variation of azimuthal distance is based on a probabilistic function of said position along said radial direction.

14. The system according to claim 12, wherein said controller is configured to execute interlaced dispensing of said droplets during at least one rotation of said tray.

15. The system according to claim 14, wherein an interlace level of said interlaced dispensing varies as a function of a position of said inkjet printing head along said radial direction.

16. The system according to claim 9, wherein said controller is configured to access a computer readable medium storing a bitmap mask, and to obtain printing data pertaining to a shape of the object only for locations on said tray that are not masked by said bitmap mask.

17. The system according to claim 9, further comprising a pre-heater element for heating said building material before entering said inkjet printing head.

18. The system according to claim 17, wherein said pre-heater element is spaced apart from said head, and is in fluid communication with said head via a conduit.

19. The system according to claim 9, wherein said radiation source is configured to reciprocally move relative to said tray along a radial direction, and wherein said inkjet printing head is also configured to reciprocally move relative to said tray along said radial direction, non-simultaneously with said radiation source.

* * * * *